(12) United States Patent
Priest

(10) Patent No.: US 11,781,931 B2
(45) Date of Patent: *Oct. 10, 2023

(54) CENTER OF GRAVITY BASED POSITIONING OF ITEMS WITHIN A DRONE

(71) Applicant: Metal Raptor, LLC, Raleigh, NC (US)

(72) Inventor: Lee Priest, Charlotte, NC (US)

(73) Assignee: Metal Raptor, LLC, Raleigh, NC (US)

( * ) Notice: Subject to any disclaimer, the term of this patent is extended or adjusted under 35 U.S.C. 154(b) by 554 days.

This patent is subject to a terminal disclaimer.

(21) Appl. No.: 16/942,969

(22) Filed: Jul. 30, 2020

(65) Prior Publication Data
US 2020/0355572 A1 Nov. 12, 2020

Related U.S. Application Data

(63) Continuation-in-part of application No. 16/752,849, filed on Jan. 27, 2020, and a continuation-in-part of
(Continued)

(51) Int. Cl.
*G01M 1/12* (2006.01)
*B64C 39/02* (2023.01)
(Continued)

(52) U.S. Cl.
CPC ........... *G01M 1/125* (2013.01); *B64C 39/024* (2013.01); *B64D 9/00* (2013.01); *G08G 5/0069* (2013.01); *B64U 2101/60* (2023.01)

(58) Field of Classification Search
CPC ........ G01M 1/125; B64C 39/024; B64D 9/00; G08G 5/0069; G08G 5/0026;
(Continued)

(56) References Cited

U.S. PATENT DOCUMENTS 2,446,441 A * 8/1948 Taylor ..................... B64C 1/22
244/119
6,308,131 B1 * 10/2001 Fox ........................ G01G 19/07
177/136

(Continued)

OTHER PUBLICATIONS

Technology and the Future Evolution of the ATC System, Chapter 5, Airport and Air Traffic Control System, pp. 67-98.
(Continued)

*Primary Examiner* — Russell Frejd
(74) *Attorney, Agent, or Firm* — Baratta Law PLLC; Lawrence A. Baratta, Jr.; Ryan Odessa

(57) ABSTRACT

A method for loading an Unmanned Aerial Vehicle with one or more items is disclosed. The method includes positioning one or more items in specific positions within one of the Unmanned Aerial Vehicle and a container configured to be carried by the Unmanned Aerial Vehicle based on a Center of Gravity of each of the one or more items. The method also includes securing the one or more items in the specific positions within the one of the Unmanned Aerial Vehicle and the container to prevent the one or more items from shifting and changing a combined Center of Gravity of the one or more items combined with the one of the Unmanned Aerial Vehicle and the container during a flight of the Unmanned Aerial Vehicle.

10 Claims, 32 Drawing Sheets

Related U.S. Application Data application No. 16/100,296, filed on Aug. 10, 2018, now Pat. No. 11,355,020, and a continuation-in-part of application No. 16/000,950, filed on Jun. 6, 2018, now Pat. No. 10,720,066, and a continuation-in-part of application No. 15/985,996, filed on May 22, 2018, now Pat. No. 10,789,853, and a continuation-in-part of application No. 15/800,574, filed on Nov. 1, 2017, now Pat. No. 10,723,483, and a continuation-in-part of application No. 15/338,559, filed on Oct. 31, 2016, now Pat. No. 10,157,548, and a continuation-in-part of application No. 15/292,782, filed on Oct. 13, 2016, now Pat. No. 10,713,961, and a continuation-in-part of application No. 15/268,831, filed on Sep. 19, 2016, now Pat. No. 10,089,888, and a continuation-in-part of application No. 15/255,672, filed on Sep. 2, 2016, now Pat. No. 10,198,953, and a continuation-in-part of application No. 15/217,135, filed on Jul. 22, 2016, now Pat. No. 9,959,772, and a continuation-in-part of application No. 15/244,023, filed on Aug. 23, 2016, now Pat. No. 10,109,205, and a continuation-in-part of application No. 15/193,488, filed on Jun. 27, 2016, now Pat. No. 10,510,260, and a continuation-in-part of application No. 15/185,598, filed on Jun. 17, 2016, now Pat. No. 10,019,906, and a continuation-in-part of application No. 15/179,188, filed on Jun. 10, 2016, now Pat. No. 9,928,750.

(51) Int. Cl.
  *G08G 5/00* (2006.01)
  *B64D 9/00* (2006.01)
  *B64U 101/60* (2023.01)

(58) Field of Classification Search
  CPC .... G08G 5/0039; G08G 5/0043; G08G 5/045; G08G 5/0013; B64U 10/13; B64U 2101/60
  See application file for complete search history.

(56) References Cited

U.S. PATENT DOCUMENTS

| | | | |
|---|---|---|---|
| 9,211,959 B2* | 12/2015 | Teller | B64F 1/10 |
| 9,487,356 B1 | 11/2016 | Aggarwal | |
| 9,545,995 B1 | 1/2017 | Chau et al. | |
| 9,650,136 B1 | 5/2017 | Haskin et al. | |
| 9,671,791 B1 | 6/2017 | Paczan | |
| 9,701,408 B1 | 7/2017 | Willison | |
| 9,714,089 B1 | 7/2017 | Louw et al. | |
| 9,959,772 B2 | 5/2018 | Priest | |
| 10,183,424 B1* | 1/2019 | Lisso | B65B 55/20 |
| 2006/0038077 A1* | 2/2006 | Olin | G06Q 10/08 |
| | | | 244/137.1 |
| 2007/0284474 A1 | 12/2007 | Olson et al. | |
| 2009/0114773 A1* | 5/2009 | Helou, Jr. | B64C 17/08 |
| | | | 414/800 |
| 2011/0290937 A1* | 12/2011 | Salkeld | B64C 39/024 |
| | | | 348/E7.085 |
| 2014/0267810 A1* | 9/2014 | Webb | H04N 23/6812 |
| | | | 348/208.6 |
| 2015/0210392 A1* | 7/2015 | Hodge | B64D 9/00 |
| | | | 244/118.1 |
| 2015/0336667 A1 | 11/2015 | Srivastava et al. | |
| 2016/0201847 A1* | 7/2016 | Firchau | B60R 11/04 |
| | | | 224/567 |
| 2016/0272319 A1* | 9/2016 | Hodge | B64D 7/00 |
| 2016/0327394 A1* | 11/2016 | Al-Rawashdeh | G01M 1/127 |
| 2016/0337562 A1* | 11/2016 | Kang | H04N 7/183 |
| 2016/0371985 A1 | 12/2016 | Kotecha | |
| 2017/0142595 A1 | 5/2017 | Ljung et al. | |
| 2017/0274988 A1* | 9/2017 | Nguyen | B64C 25/32 |
| 2017/0336805 A1 | 11/2017 | Luo et al. | |
| 2017/0045894 A1 | 12/2017 | Canoy et al. | |
| 2017/0350959 A1 | 12/2017 | Yaqub et al. | |
| 2018/0350243 A1 | 12/2018 | Priest | |

OTHER PUBLICATIONS

Operator Benefits of Future Air Navigation System, The Boeing Company, pp. 1-4.
What are the essential elements of a control tower?, Aviation Stack Exchange is a question and answer site for aircraft pilots, mechanics, and enthusiasts, pp. 1-2.

* cited by examiner

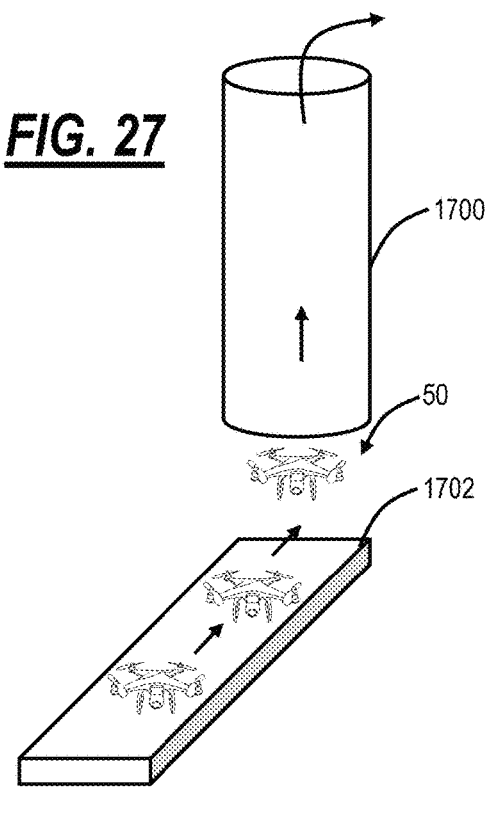
FIG. 27
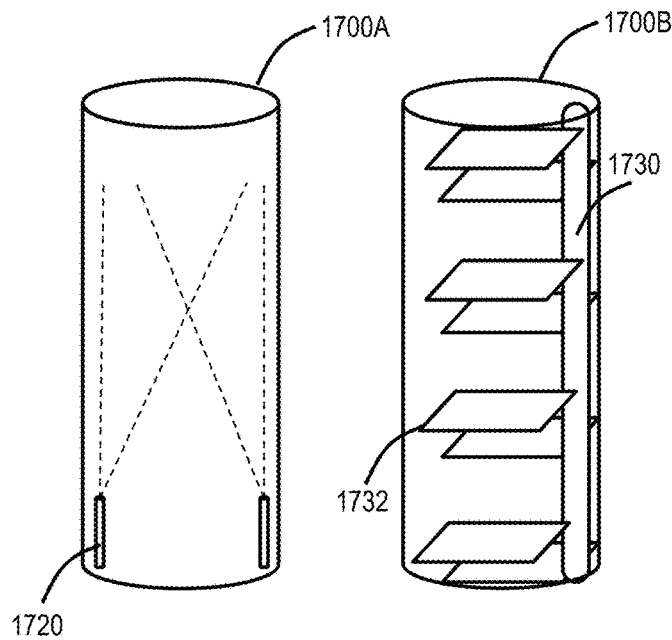
FIG. 29  FIG. 30
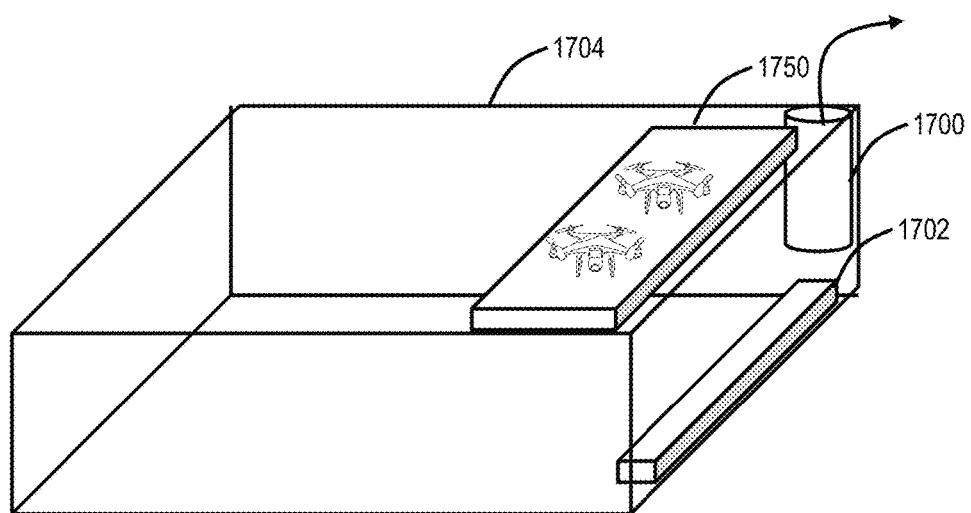
FIG. 28

CENTER OF GRAVITY BASED POSITIONING OF ITEMS WITHIN A DRONE

CROSS-REFERENCE TO RELATED APPLICATION(S)

The present patent/application is continuation-in-part of, and the content of each is incorporated by reference herein

| Filing Date | Ser. No. | Title |
| --- | --- | --- |
| Jan. 27, 2020 | 16/752,849 | Drone Air Traffic Control over wireless networks for urgent package pickup and delivery |
| Aug. 10, 2018 | 16/100,296 | Drone Air Traffic Control over wireless networks for package pickup and delivery |
| Jun. 6, 2018 | 16/000,950 | Flying Lane Management with Lateral Separations between Drones |
| May 22, 2018 | 15/985,996 | Drone collision avoidance via Air Traffic Control over wireless networks |
| Nov. 1, 2017 | 15/800,574 | Elevator or tube lift for drone takeoff and control thereof via air traffic control systems |
| Oct. 31, 2016 | 15/338,559 | Waypoint directory in air traffic control systems for unmanned aerial vehicles |
| Oct. 13, 2016 | 15/292,782 | Managing dynamic obstructions in air traffic control systems for unmanned aerial vehicles |
| Sep. 19, 2016 | 15/268,831 | Managing detected obstructions in air traffic control systems for unmanned aerial vehicles |
| Sep. 2, 2016 | 15/255,672 | Obstruction detection in air traffic control systems for unmanned aerial vehicles |
| Jul. 22, 2016 | 15/217,135 | Flying lane management systems and methods for unmanned aerial vehicles |
| Aug. 23, 2016 | 15/244,023 | Air traffic control monitoring systems and methods for unmanned aerial vehicles |
| Jun. 27, 2016 | 15/193,488 | Air traffic control of unmanned aerial vehicles for delivery applications |
| Jun. 17, 2016 | 15/185,598 | Air traffic control of unmanned aerial vehicles concurrently using a plurality of wireless networks |
| Jun. 10, 2016 | 15/179,188 | Air traffic control of unmanned aerial vehicles via wireless networks |

FIELD OF THE DISCLOSURE

The present disclosure relates generally to drone or Unmanned Aerial Vehicles (UAVs) or drones. More particularly, the present disclosure relates to systems and methods for Drone Air Traffic Control (ATC) over wireless networks for package pickup, including loading of the UAVs and positioning the packages within the UAVs based on the center of gravity of the packages, and delivery.

BACKGROUND OF THE DISCLOSURE

Use of Unmanned Aerial Vehicles (UAVs or "drones") is proliferating. UAVs are used for a variety of applications such as search and rescue, inspections, security, surveillance, scientific research, aerial photography and video, surveying, cargo delivery, and the like. With the proliferation, the Federal Aviation Administration (FAA) is providing regulations associated with the use of UAVs. Existing air traffic control in the United States is performed through a dedicated air traffic control network, i.e., the National Airspace System (NAS). However, it is impractical to use the existing air traffic control network for UAVs because of the sheer quantity of UAVs. Also, it is expected that UAVs will be autonomous, requiring communication for flight control as well. There will be a need for systems and methods to provide air traffic control and communication to UAVs.

There is a great deal of discussion and anticipation for using drones for applications such as package delivery. For example, online stores, brick & mortar stores, restaurants, etc. can use drones to provide delivery to end consumers. As the number of applications increases and the number of UAVs concurrently in flight also increases, there are various issues that have to be addressed relative to air traffic control.

Operation of the UAVs can be dangerous. Particularly when the UAVs are imbalanced or carrying too heavy of a load, which can prevent UAVs from lifting off, cause UAVs to drift, cause UAVs to spin, and prevent proper navigation thereof. There is a need for systems and methods for balancing the loads of UAVs.

BRIEF SUMMARY OF THE DISCLOSURE

In one embodiment, a method for loading an Unmanned Aerial Vehicle with one or more items is disclosed. The method includes positioning one or more items in specific positions within one of the UAV and a container configured to be carried by the UAV based on a Center of Gravity (COG) of each of the one or more items. The method also includes securing the one or more items in the specific positions within the one of the UAV and the container to prevent the one or more items from shifting and changing a combined COG of the one or more items combined with the one of the UAV and the container during a flight of the UAV.

In some embodiments, the one or more items are secured in specific positions using straps connected to one or more walls of the one of the UAV and the container. In some embodiments, the one or more items are positioned in the specific positions using one or more spacers. Optionally, the one or more spacers include a region for holding a weight used to further balance a combined COG including the COG of the UAV and the COG of the one or more items.

In embodiments, the one or more items are secured in specific positions using an adhesive. Optionally, the adhesive is an adhesive gel.

In some embodiments, the one or more items are secured in specific positions by inserting one or more shelves into the one of the UAV and the container and securing the one or more items to the one or more shelves using at least one of straps, wrapping material, fastening devices, spacers, filler material, adhesive, and cardboard.

In some embodiments, the method further comprises determining the specific positions for each of the one or more items based on a COG of each of the one or more items and a COG of the one of the UAV and the container. Optionally, the specific positions for one or more items being placed in the container is also based on the COG of the UAV selected to transport the container. Optionally, positioning each of the one or more items in the specific positions is also based on a weight of each of the one or more items. And optionally, positioning each of the one or more items in the specific positions is further based on a weight of the one of the UAV and the container.

BRIEF DESCRIPTION OF THE DRAWINGS

The present disclosure is illustrated and described herein with reference to the various drawings, in which like reference numbers are used to denote like system components/method steps, as appropriate, and in which:

FIG. 27 is a diagram of a lift tube and a staging location;

FIG. 28 is a diagram of the lift tube in a location such as a factory, warehouse, distribution center, etc.;

FIG. 29 is a diagram of a pneumatic lift tube;

FIG. 30 is a diagram of an elevator lift tube;

DETAILED DESCRIPTION OF THE DISCLOSURE

Figure 1:
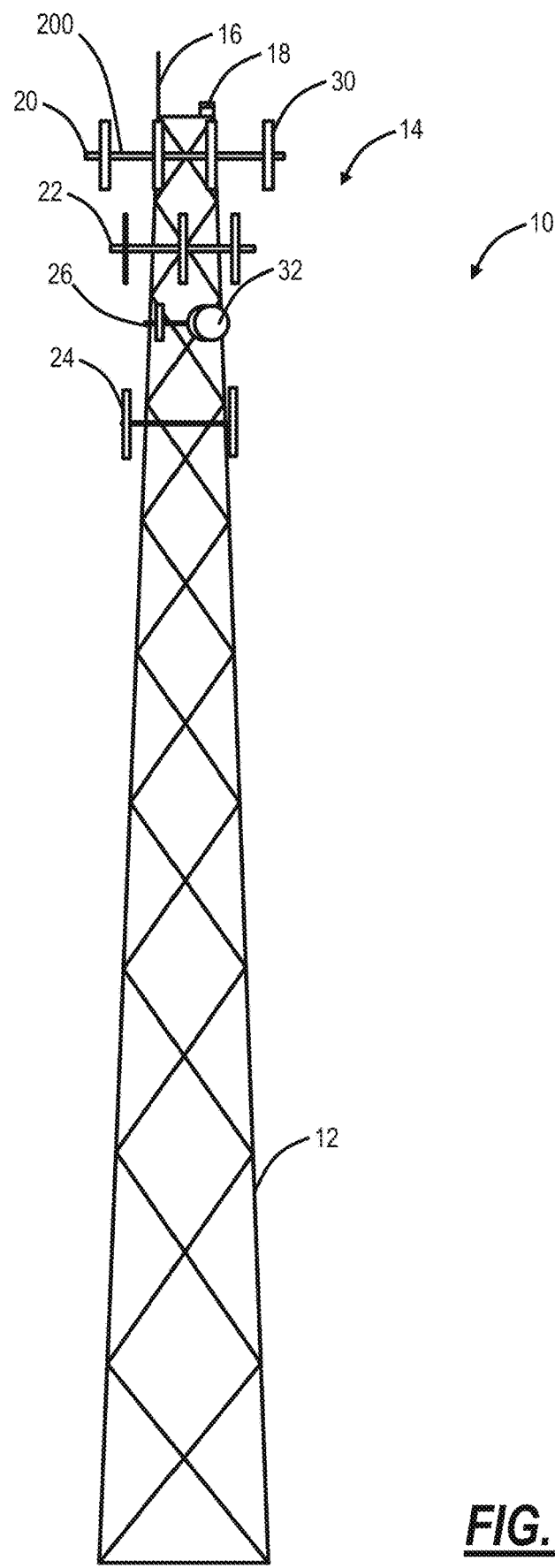
FIG. 1 is a diagram of a side view of an example cell site.

The present disclosure relates to systems and methods for Drone Air Traffic Control (ATC) over wireless networks for package pickup and delivery. Embodiments describe drone service delivery using the ATC over wireless networks. A drone delivery service can manage delivery for a variety of providers enabling drone delivery for smaller providers. Further, the ATC system can be used to schedule, manage, and coordinate pickup, distribution, delivery, and returns.

Further, the present disclosure relates to systems and methods for flying lane management with lateral separation between drones. This disclosure relates to lateral separations between drones (UAV's) operating in the same flying lane or at the same altitude and in the same proximity or geography. Further, the present disclosure relates to systems and methods for drone collision avoidance via an Air Traffic Control System over wireless networks. Specifically, the systems and methods include a modified Inevitable Collision State (ICS) for UAV or drone Air Traffic Control (ATC). A traditional ICS states that no matter what the future trajectory is, a collision with an obstacle eventually occurs. The modified ICS described herein considers various variables to determine if there is a possibility for a future collision. This enables predictions of collision and an ability to react/redirect drones away from areas and objects which could be the cause of a collision.

Further, the present disclosure relates to an elevator or tube lift for drone takeoff and for control thereof via an Air Traffic Control (ATC) system. Specifically, the elevator or tube lift contemplates location in a factory, warehouse, distribution center, etc. such that UAVs can be loaded with products or delivery items and then take off from an elevated position or rooftop without an individual carrying the UAV to the roof or outside.

Further, the present disclosure relates to systems and methods for drone network switchover between wireless networks such as during outages, failures, catastrophes, etc. As described herein, an Air Traffic Control (ATC) system can be used to control UAVs or drones with communication via existing wireless networks. The UAVs can be configured to communicate on multiple different wireless networks, such as a primary and a backup network. The systems and methods herein provide techniques for the switchover from one network to another under certain circumstances. Additionally, emergency instructions can be provided to the UAVs in case of network disturbances, e.g., in the event the UAV cannot reestablish communication with the ATC system.

Further, the present disclosure relates to systems and methods for with a waypoint directory in air traffic control systems for UAVs. A waypoint is a reference point in physical space used for purposes of navigation in the air traffic control systems for UAVs. Variously, the systems and methods describe managing waypoints by an air traffic control system which uses one or more wireless networks and by associated UAVs in communication with the air traffic control system. The waypoints can be defined based on the geography, e.g., different sizes for dense urban areas, suburban metro areas, and rural areas. The air traffic control system can maintain a status of each waypoint, e.g., clear, obstructed, or unknown. The status can be continually updated and managed with the UAVs and used for routing the UAVs.

Further, the present disclosure relates to the present disclosure relates to systems and methods for managing detected obstructions with air traffic control systems for UAVs. Variously, the systems and methods provide a mechanism in the Air Traffic Control (ATC) System to characterize detected obstructions at or near the ground. In an embodiment, the detected obstructions are dynamic obstructions, i.e., moving at or near the ground. Examples of dynamic obstructions can include, without limitation, other UAVs, vehicles on the ground, cranes on the ground, and the like. Generally, dynamic obstruction management includes managing other UAVs at or near the ground and managing objects on the ground which are moving which could either interfere with landing or with low-flying UAVs. In various embodiment, the UAVs are equipped to locally detect and identify dynamic obstructions for avoidance thereof and to notify the ATC system for management thereof.

Further, the detected obstructions are static obstructions, i.e., not moving, which can be temporary or permanent. The ATC system can implement a mechanism to accurately define the location of the detected obstructions, for example, a virtual rectangle, cylinder, etc. defined by location coordinates and altitude. The defined location can be managed and determined between the ATC system and the UAVs as well as communicated to the UAVs for flight avoidance. That is, the defined location can be a "no-fly" zone for the UAVs. Importantly, the defined location can be precise since it is expected there are a significant number of obstructions at or near the ground and the UAVs need to coordinate their flight to avoid these obstructions. In this manner, the systems and methods seek to minimize the no-fly zones.

Further, the present disclosure relates to obstruction detection systems and methods with air traffic control systems for UAVs. Specifically, the systems and methods use a framework of an air traffic control system which uses wireless (cell) networks to communicate with various UAVs. Through such communication, the air traffic control system receives continuous updates related to existing obstructions whether temporary or permanent, maintains a database of present obstructions, and updates the various UAVs with associated obstructions in their flight plan. The systems and methods can further direct UAVs to investigate, capture data, and provide such data for analysis to detect and identify obstructions for addition in the database. The systems and methods can make use of the vast data collection equipment on UAVs, such as cameras, radar, etc. to properly identify and classify obstructions.

Further, the present disclosure relates to air traffic control monitoring systems and methods for UAVs. Conventional FAA Air Traffic Control monitoring approaches are able to track and monitor all airplanes flying in the U.S. concurrently. Such approaches do not scale with UAVs which can exceed airplanes in numbers by several orders of magnitude. The systems and methods provide a hierarchical monitoring approach where zones or geographic regions of coverage are aggregated into a consolidated view for monitoring and control. The zones or geographic regions can provide local monitoring and control while the consolidated view can provide national monitoring and control in addition to local monitoring and control through a drill-down process. A consolidated server can aggregate data from various sources of control for zones or geographic regions. From this consolidated server, monitoring and control can be performed for any UAV communicatively coupled to a wireless network.

Further, flying lane management systems and methods are described for UAVs such as through an air traffic control system that uses one or more wireless networks. As described herein, a flying lane for a UAV represents its path from takeoff to landing at a certain time. The objective of flying lane management is to prevent collisions, congestion, etc. with UAVs in flight. A flying lane can be modeled as a vector which includes coordinates and altitude (i.e., x, y, and z coordinates) at a specified time. The flying lane also can include speed and heading such that the future location can be determined. The flying lane management systems utilize one or more wireless networks to manage UAVs in various applications.

Note, flying lanes for UAVs have significant differences from conventional air traffic control flying lanes for aircraft (i.e., commercial airliners). First, there will be orders of magnitude more UAVs in flight than aircraft. This creates a management and scale issue. Second, air traffic control for UAVs is slightly different than aircraft in that collision avoidance is paramount in aircraft; while still important for UAVs, the objective does not have to be collision avoidance at all costs. It is further noted that this ties into the scale issue where the system for managing UAVs will have to manage so many more UAVs. Collision avoidance in UAVs is about avoiding property damage in the air (deliveries and the UAVs) and on the ground; collision avoidance in commercial aircraft is about safety. Third, UAVs are flying at different altitudes, much closer to the ground, i.e., there may be many more ground-based obstructions. Fourth, UAVs do not have designated takeoff/landing spots, i.e., airports, causing the different flight phases to be intertwined more, again adding to more management complexity.

To address these differences, the flying lane management systems and methods provide an autonomous/semi-autonomous management system, using one or more wireless networks, to control and manage UAVs in flight, in all phases of a flying plane and adaptable based on continuous feedback and ever-changing conditions. Additionally, the present disclosure relates to integrating real-time weather information into flying lane management.

Also, the present disclosure relates to air traffic control of UAVs in delivery applications, i.e., using the drones to deliver packages, etc. to end users. Specifically, an air traffic control system utilizes existing wireless networks, such as wireless networks including wireless provider networks, i.e., cell networks, using Long Term Evolution (LTE) or the like, to provide air traffic control of UAVs. Also, the cell networks can be used in combination with other networks such as the NAS network or the like. Advantageously, cell networks provide high-bandwidth connectivity, low-cost connectivity, and broad geographic coverage. The air traffic control of the UAVs can include, for example, separation assurance between UAVs; navigation assistance; weather and obstacle reporting; monitoring of speed, altitude, location, direction, etc.; traffic management; landing services; and real-time control. The UAV is equipped with a mobile device, such as an embedded mobile device or physical hardware emulating a mobile device. In an embodiment, the UAV can be equipped with hardware to support plural cell networks, to allow for broad coverage support. In another embodiment, UAV flight plans can be constrained based on the availability of wireless cell coverage. In a further embodiment, the air traffic control can use plural wireless networks for different purposes such as using the NAS network for location and traffic management and using the cell network for the other functions.

The present disclosure leverages the existing wireless networks to address various issues associated with specific UAV applications such as delivery and to address the vast number of UAVs concurrently expected in flight relative to air traffic control. In an embodiment, in addition to air traffic control, the air traffic control system also supports package delivery authorization and management, landing authorization and management, separation assurance through altitude and flying lane coordination, and the like. Thus, the air traffic control system, leveraging existing wireless networks, can also provide application-specific support.

Further, the present disclosure relates to the loading of UAVs for delivery of items, such as stand-alone objects and packages with objects contained therein. Loading items in a UAV can significantly alter the Center Of Gravity (COG) of the UAV, which can affect the control of the UAV and the ability of the UAV to follow a flight path. In the present disclosure, the COG for each of the items is obtained. The items are then positioned to match a combined COG with that of the UAV, such as within a predetermined region relative to the COG of the unloaded UAV. While combining multiple items together to match the COG of the multiple items to the COG of the unloaded UAV, the weight and size of each item can be used to determine relative positions of the items to match the COG of the combined items with that of the unloaded UAV.

Due to the imbalance of some items, it may be difficult to match the COG of one or more items with that of the unloaded UAV. In order to overcome these imbalances, weights can be added to an interior or exterior of the UAV to match the combined COG of the weights and the one or more items with that of the unloaded UAV.

The items and weights can be secured in place using restraints, spacers, and the like to ensure that the items do not shift during flight and to ensure that the combined COG of the items remains within the predetermined region during flight.

§ 1.0 Cell Site

FIG. 1 is a diagram of a side view of a cell site 10. The cell site 10 includes a cell tower 12. The cell tower 12 can be any type of elevated structure, such as 100-200 feet/30-60 meters tall. Generally, the cell tower 12 is an elevated structure for holding cell site components 14. The cell tower 12 may also include a lightning rod 16 and a warning light 18. Of course, there may various additional components associated with the cell tower 12 and the cell site 10 which are omitted for illustration purposes. In this embodiment, there are four sets 20, 22, 24, 26 of cell site components 14, such as for four different wireless service providers. In this example, the sets 20, 22, 24 include various antennas 30 for cellular service. The sets 20, 22, 24 are deployed in sectors, e.g., there can be three sectors for the cell site components—alpha, beta, and gamma. The antennas 30 are used to both transmit a radio signal to a mobile device and receive the signal from the mobile device. The antennas 30 are usually deployed as a single, groups of two, three or even four per sector. The higher the frequency of spectrum supported by the antenna 30, the shorter the antenna 30. For example, the antennas 30 may operate around 850 MHz, 1.9 GHz, and the like. The set 26 includes a microwave dish 32 which can be used to provide other types of wireless connectivity, besides cellular service. There may be other embodiments where the cell tower 12 is omitted and replaced with other types of elevated structures such as roofs, water tanks, etc.

§ 1.1 FAA Regulations

The FAA is overwhelmed with applications from companies interested in flying drones, but the FAA is intent on keeping the skies safe. Currently, approved exemptions for flying drones include tight rules. Once approved, there is some level of certification for drone operators along with specific rules such as speed limit of 100 mph, height limitations such as 400 ft, no-fly zones, only day operation, documentation, and restrictions on aerial filming. It is expected that these regulations will loosen as UAV deployments evolve. However, it is expected that the UAV regulations will require flight which would accommodate wireless connectivity to cell towers 12, e.g., less than a few hundred feet.

§ 2.0 Example Hardware

Figure 2:
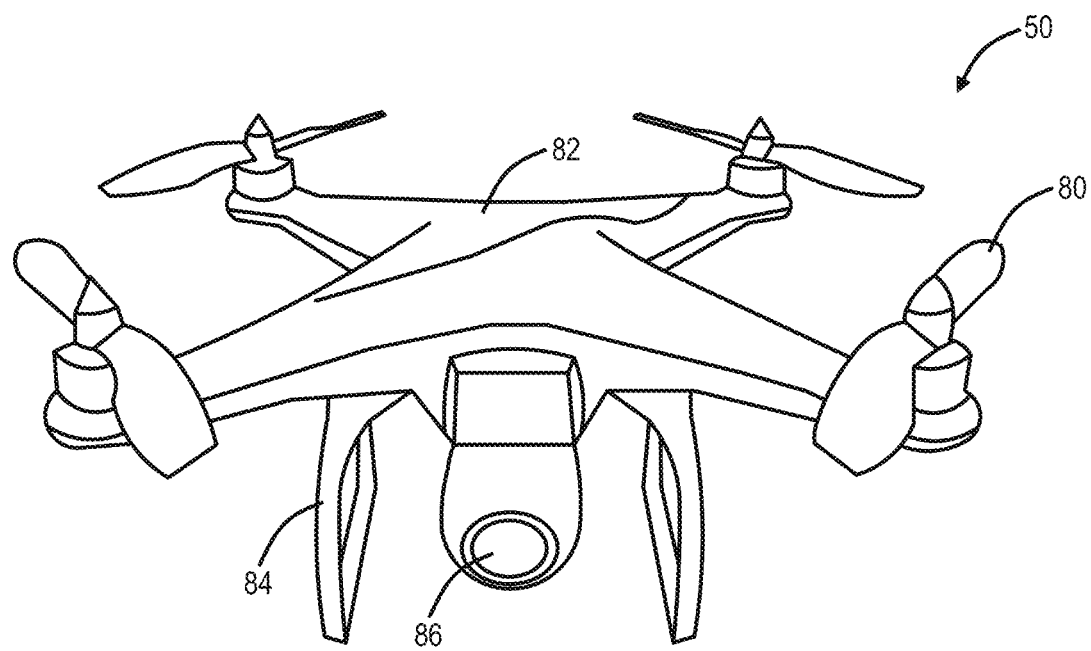
FIG. 2 is a perspective view of a UAV for use with the systems and methods described herein.

FIG. 2 is a perspective view of an example UAV 50 for use with the systems and methods described herein. Again, the UAV 50 may be referred to as a drone or the like. The UAV 50 may be a commercially available UAV platform that has been modified to carry specific electronic components as described herein to implement the various systems and methods. The UAV 50 includes rotors 58 attached to a body 52. A lower frame 54 is located on a bottom portion of the body 52, for landing the UAV 50 to rest on a flat surface and absorb impact during landing. The UAV 50 also includes sensors 56, such as a camera, which are used to take still photographs, video, and the like. Specifically, the sensors 56 are used to provide the real-time display and other information on the screen 62. The UAV 50 includes various electronic components inside the body 52 and/or the camera 56 such as, without limitation, a processor, a data store, memory, a wireless interface, and the like. Also, the UAV 50 can include additional hardware, such as robotic arms or the like that allow the UAV 50 to attach/detach components for the cell site components 14. Specifically, it is expected that the UAV 50 will get bigger and more advanced, capable of carrying significant loads, and not just a wireless camera.

These various components are now described with reference to a mobile device 100 or a processing device 100. Those of ordinary skill in the art will recognize the UAV 50 can include similar components to the mobile device 100. In an embodiment, the UAV 50 can include one or more mobile devices 100 embedded therein, such as for different cellular networks. In another embodiment, the UAV 50 can include hardware which emulates the mobile device 100 including support for multiple different cellular networks. For example, the hardware can include multiple different antennas and unique identifier configurations (e.g., Subscriber Identification Module (SIM) cards). For example, the UAV 50 can include circuitry to communicate with one or more LTE networks with an associated unique identifier, e.g., serial number.

Figure 3:
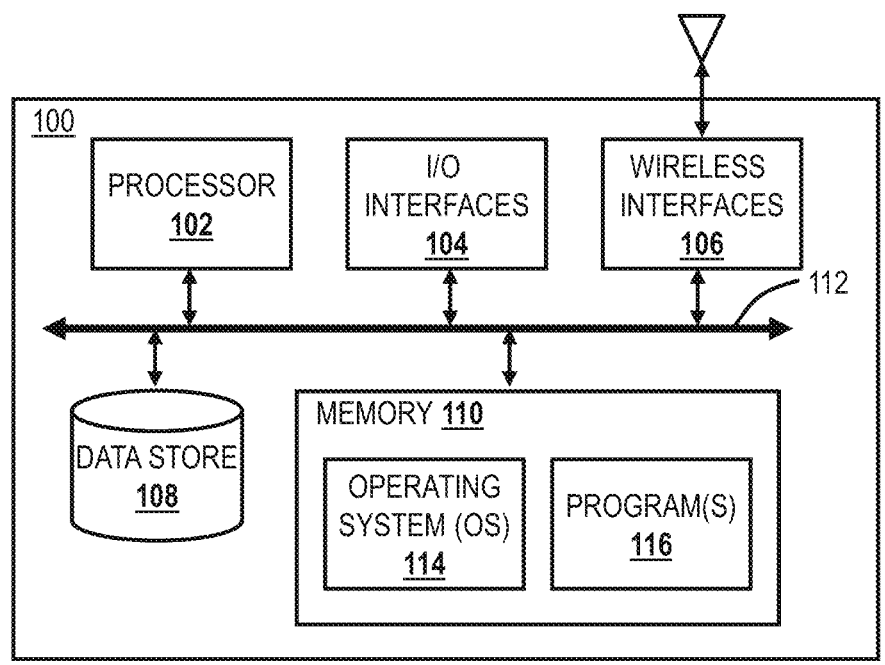
FIG. 3 is a block diagram of a mobile device, which may be embedded or associated with the UAV of FIG. 1.

FIG. 3 is a block diagram of mobile device 100 hardware, which may be embedded or associated with the UAV 50. The mobile device 100 can be a digital device that, in terms of hardware architecture, generally includes a processor 102, input/output (I/O) interfaces 104, wireless interfaces 106, a data store 108, and memory 110. It should be appreciated by those of ordinary skill in the art that FIG. 3 depicts the mobile device 100 in an oversimplified manner, and a practical embodiment may include additional components and suitably configured processing logic to support known or conventional operating features that are not described in detail herein. The components (102, 104, 106, 108, and 102) are communicatively coupled via a local interface 112. The local interface 112 can be, for example, but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the mobile device 100, a semiconductor-based microprocessor (in the form of a microchip or chip set), or generally any device for executing software instructions. When the mobile device 100 is in operation, the processor 102 is configured to execute software stored within the memory 110, to communicate data to and from the memory 110, and to generally control operations of the mobile device 100 pursuant to the software instructions. In an embodiment, the processor 102 may include a mobile-optimized processor such as optimized for power consumption and mobile applications. The I/O interfaces 104 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 104 can also include, for example, a serial port, a parallel port, a small computer system interface (SCSI), an infrared (IR) interface, a radio frequency (RF) interface, a universal serial bus (USB) interface, and the like. The I/O interfaces 104 can include a graphical user interface (GUI) that enables a user to interact with the mobile device 100. Additionally, the I/O interfaces 104 may further include an imaging device, i.e., camera, video camera, etc.

The wireless interfaces 106 enable wireless communication to an external access device or network. Any number of suitable wireless data communication protocols, techniques, or methodologies can be supported by the wireless interfaces 106, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The wireless interfaces 106 can be used to communicate with the UAV 50 for command and control as well as to relay data. Again, the wireless interfaces 106 can be configured to communicate on a specific cell network or on a plurality of cellular networks. The wireless interfaces 106 include hardware, wireless antennas, etc. enabling the UAV 50 to communicate concurrently with a plurality of wireless networks, such as cellular networks, GPS, GLONASS, WLAN, WiMAX, or the like.

The data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. The memory 110 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 can include one or more software programs, each of which includes an ordered listing of executable instructions for implementing logical functions. In the example of FIG. 3, the software in the memory 110 includes a suitable operating system (O/S) 114 and programs 116. The operating system 114 essentially controls the execution of other computer programs and provides scheduling, input-output control, file and data management, memory management, and communication control and related services. The programs 116 may include various applications, add-ons, etc. configured to provide end-user functionality with the mobile device 100, including performing various aspects of the systems and methods described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

§ 3.0 Example Server

Figure 4:
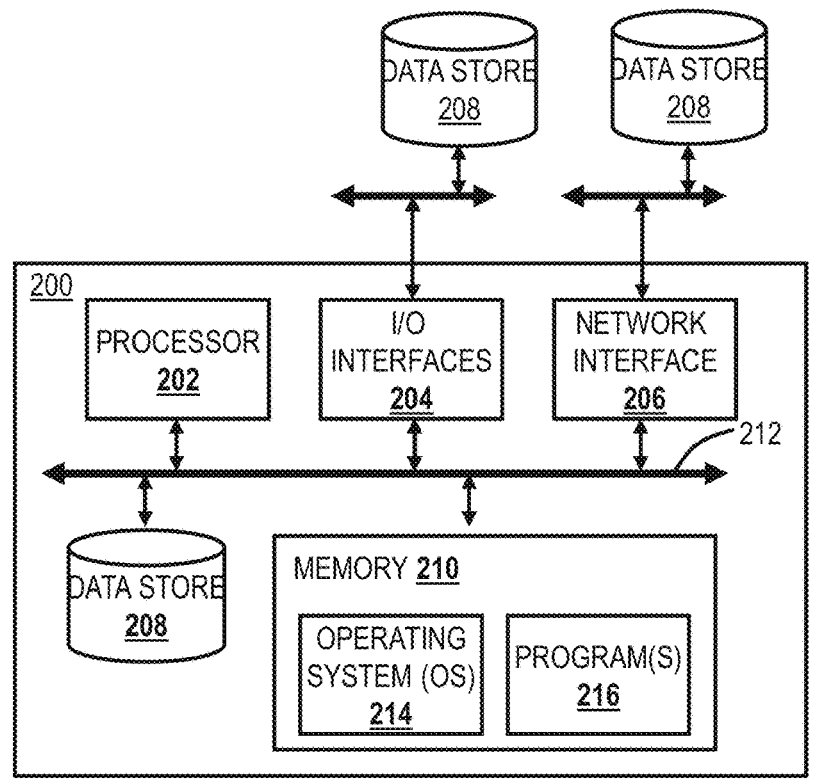
FIG. 4 is a network diagram of various cell sites deployed in a geographic region.

FIG. 4 is a block diagram of a server 200 which may be used for air traffic control of the UAVs 50. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 200 to communicate over a network, such as to a plurality of UAVs 50 over a cell network or the like. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 4.0 UAV Air Traffic Control System

Figure 5:
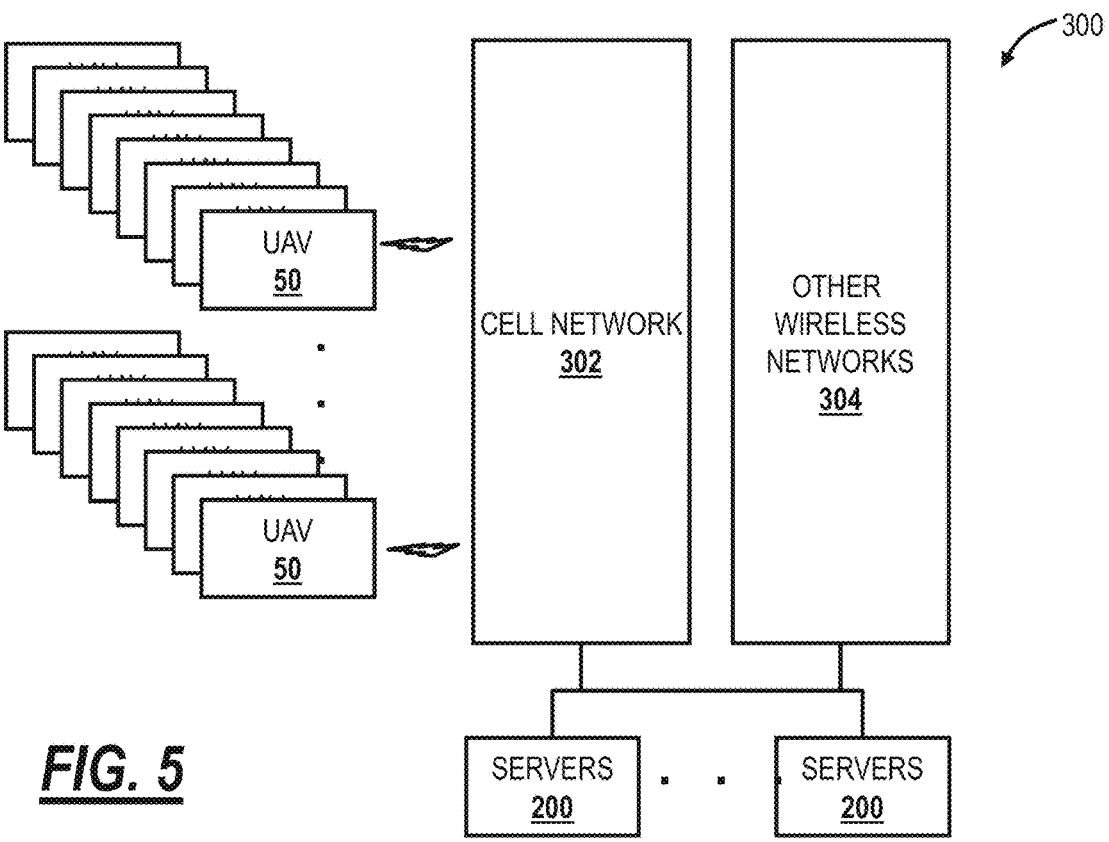
FIG. 5 is a block diagram of functional components of a UAV air traffic control system.

FIG. 5 is a block diagram of functional components of a UAV air traffic control system 300. The UAV air traffic control system 300 includes a cell network 302 and optionally other wireless networks 304 communicatively coupled to one or more servers 200 and to a plurality of UAVs 50. The cell network 302 can actually include a plurality of different provider networks, such as AT&T, Verizon, Sprint, etc. The cell network 302 is formed in part with a plurality of cell towers 12, geographically dispersed and covering the vast majority of the United States. The cell towers 12 are configured to backhaul communications from subscribers. In the UAV air traffic control system 300, the subscribers are the UAVs 50 (in addition to conventional mobile devices), and the communications are between the UAVs 50 and the servers 200. The other wireless networks 304 can include, for example, the NAS network, GPS and/or GLONASS, WLAN networks, private wireless networks, or any other wireless networks.

The servers 200 are configured to provide air traffic control and can be deployed in a control center, at a customer premises, in the cloud, or the like. Generally, the servers 200 are configured to receive communications from the UAVs 50 such as for continuous monitoring and of relevant details of each UAV 50 such as location, altitude, speed, direction, function, etc. The servers 200 are further configured to transmit communications to the UAVs 50 such as for control based on the details, such as to prevent collisions, to enforce policies, to provide navigational control, to actually fly the UAVs 50, to land the UAVs 50, and the like. That is, generally, communications from the UAV 50 to the server 200 are for detailed monitoring and communications to the UAV 50 from the server 200 are for control thereof.

§ 4.1 Data Management

Each UAV 50 is configured with a unique identifier, such as a SIM card or the like. Similar to standard mobile devices 100, each UAV 50 is configured to maintain an association with a plurality of cell towers 12 based on a current geographic location. Using triangulation or other location identification techniques (GPS, GLONASS, etc.), the location, altitude, speed, and direction of each UAV 50 can be continuously monitored and reported back to the servers 200. The servers 200 can implement techniques to manage this data in real-time in an automated fashion to track and control all UAVs 50 in a geographic region. For example, the servers 200 can manage and store the data in the data store 208.

§ 4.2 Air Traffic Control Functions

The servers 200 are configured to perform air traffic control functionality of the UAV air traffic control system 300. Specifically, the servers 200 are configured to perform separation assurance, navigation, traffic management, landing, and general control of the UAVs 50. The separation assurance includes tracking all of the UAVs 50 in flight, based on the monitored data, to ensure adequate separation. The navigation includes maintaining defined airways. The traffic management includes comparing flights plan of UAVs 50 to avoid conflicts and to ensure the smooth and efficient flow of UAVs 50 in flight. The landing includes assisting and control of UAVs 50 at the end of their flight. The general control includes providing real-time data including video and other monitored data and allowing control of the UAV 50 in flight. The general control can also include automated flight of the UAVs 50 through the UAV air traffic control system 300, such as for autonomous UAVs. Generally, the UAV air traffic control system 300 can include routing and algorithms for autonomous operation of the UAVs 50 based on initial flight parameters. The UAV air traffic control system 300 can control speed, flight path, and altitude for a vast number of UAVs 50 simultaneously.

§ 5.0 UAV Flight Plans

Figure 6:
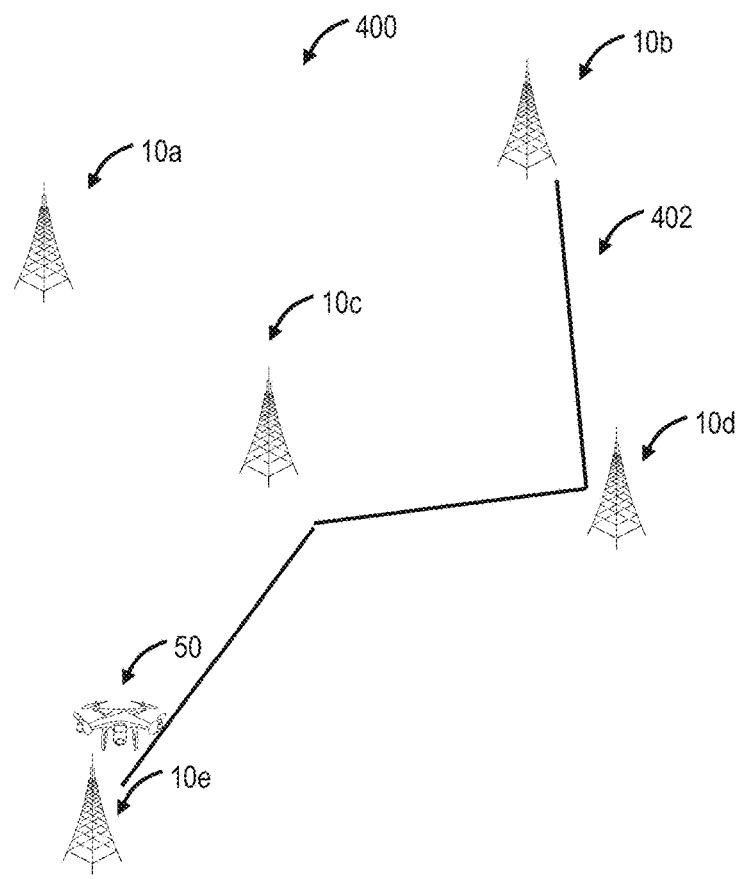
FIG. 6 is a diagram of various cell sites deployed in a geographic region.

FIG. 6 is a network diagram of various cell sites 10a-10e deployed in a geographic region 400. In an embodiment, the UAV 50 is configured to fly a flight plan 402 in the geographic region 400 while maintaining associations with multiple cell sites 10a-10e during the flight plan 402. In an embodiment, the UAV 50 is constrained only to fly in the geographic region 400 where it has cell coverage. This constraint can be preprogrammed based on predetermining cell coverage. Alternatively, the constraint can be dynamically managed by the UAV 50 based on monitoring its cell signal level in the mobile device 100 hardware. Here, the UAV 50 will alter its path whenever it loses or detects signal degradation to ensure it is always active on the cell network 302. During the flight plan 402, the cell sites 10a-10e are configured to report monitored data to the servers 200 periodically to enable real-time air traffic control. Thus, the communication between the UAVs 50 is bidirectional with the servers 200, through the associated cell sites 10.

In an embodiment, the UAV 50 maintains an association with at least three of the cell sites 10 which perform triangulation to determine the location of the UAV 50. In addition to the cell sites 10 on the cell network 302, the UAV 50 can also communicate to the other wireless networks 304. In an embodiment, the UAV 50 can maintain its GPS and/or GLONASS location and report that over the cell network 302. In another embodiment, the other wireless networks 304 can include satellite networks or the like.

§ 5.1 Triangulation

Figure 7:
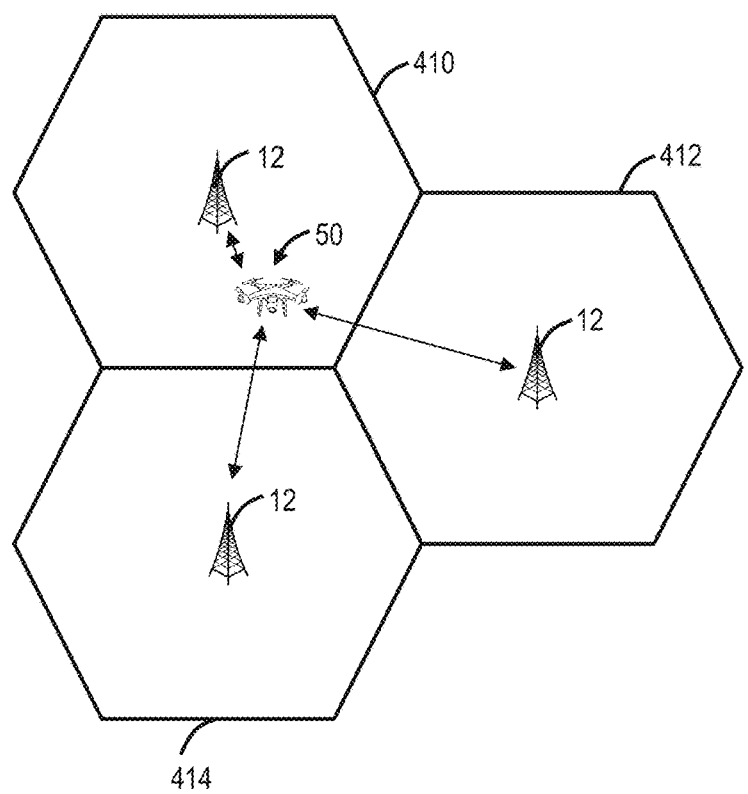
FIG. 7 is a map of three cell towers and associated coverage areas for describing location determination of the UAV.

FIG. 7 is a map of three cell towers 12 and associated coverage areas 410, 412, 414 for describing location determination of the UAV 50. Typically, for a cell site 10, in rural locations, the coverage areas 410, 412, 414 can be about 5 miles in radius whereas, in urban locations, the coverage areas 410, 412, 414 can be about 0.5 to 2 miles in radius. One aspect of the UAV air traffic control system 300 is to maintain a precise location at all time of the UAVs 50. This can be accomplished in a plurality of ways, including a combination. The UAV air traffic control system 300 can use triangulation based on the multiple cell towers 12, location identifiers from GPS/GLONASS transmitted over the cell network 402 by the UAVs 50, sensors in the UAV 50 for determining altitude, speed, etc., and the like.

§ 6.0 UAV Air Traffic Control Method Utilizing Wireless Networks

Figure 8:
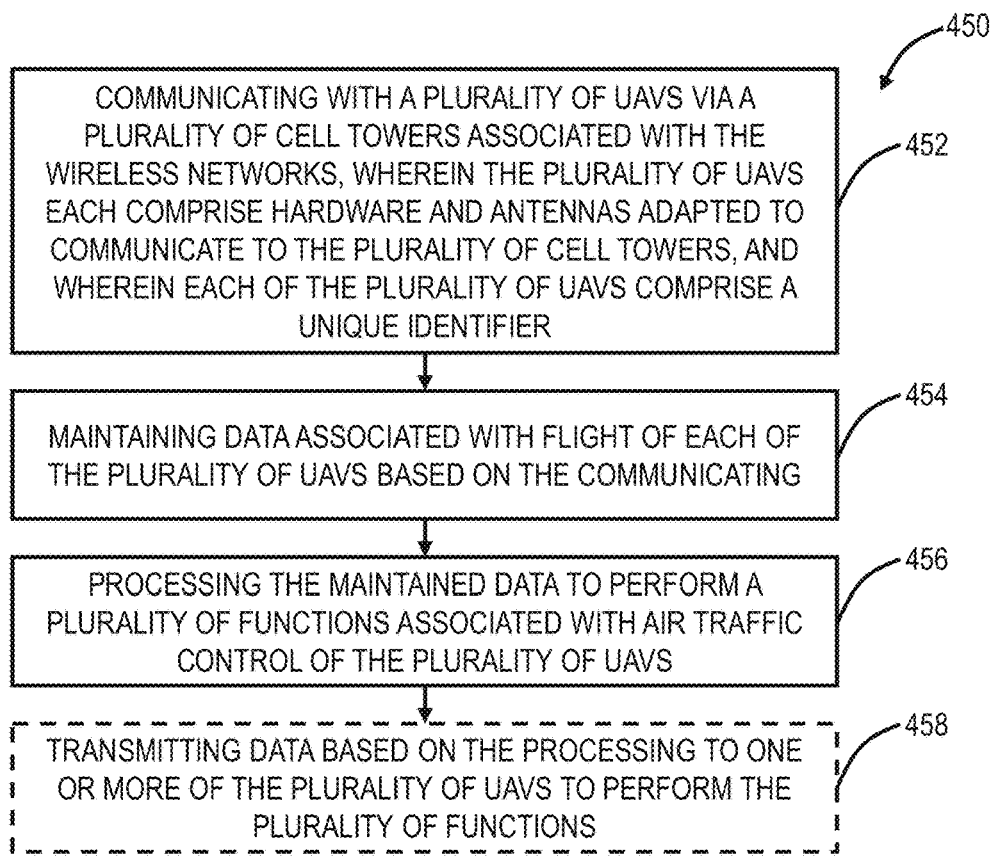
FIG. 8 is a flowchart of a UAV air traffic control method utilizing wireless networks.

FIG. 8 is a flowchart of a UAV air traffic control method 450 utilizing wireless networks. The UAV air traffic control method 450 includes communicating with a plurality of UAVs via a plurality of cell towers associated with the wireless networks, wherein the plurality of UAVs each include hardware and antennas adapted to communicate to the plurality of cell towers, and wherein each of the plurality of UAVs include a unique identifier (step 452); maintaining data associated with flight of each of the plurality of UAVs based on the communicating (step 454); and processing the maintained data to perform a plurality of functions associated with air traffic control of the plurality of UAVs (step 456). The UAV-based method 450 can further include transmitting data based on the processing to one or more of the plurality of UAVs to perform the plurality of functions (step 458). The plurality of UAVs can be configured to constrain flight based on coverage of the plurality of cell towers. The constrained flight can include one or more of pre-configuring the plurality of UAVs to operate only where the coverage exists, monitoring cell signal strength by the plurality of UAVs and adjusting flight based therein, and a combination thereof.

The maintaining data can include the plurality of UAVs and/or the plurality of cell towers providing location, speed, direction, and altitude. The location can be determined based on a combination of triangulation by the plurality of cell towers and a determination by the UAV based on a location identification network. The plurality of function can include one or more of separation assurance between UAVs; navigation assistance; weather and obstacle reporting; monitoring of speed, altitude, location, and direction; traffic management; landing services; and real-time control. One or more of the plurality of UAVs can be configured for autonomous operation through the air traffic control. The plurality of UAVs can be configured with mobile device hardware configured to operate on a plurality of different cellular networks.

Figure 9:
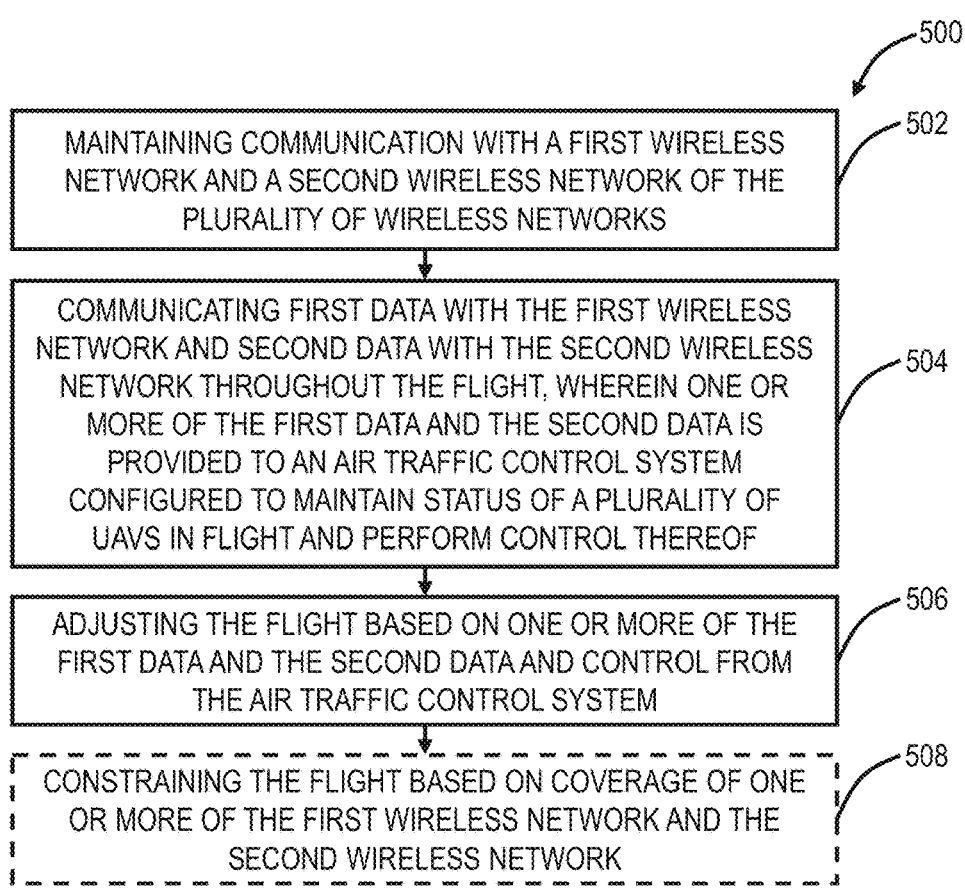
FIG. 9 is a flowchart of a UAV air traffic control method concurrently utilizing a plurality of wireless networks.

§ 7.0 UAV Air Traffic Control Method Concurrently Utilizing a Plurality of Wireless Networks FIG. 9 is a flowchart of an Unmanned Aerial Vehicle (UAV) air traffic control method 500 implemented in the UAV 50 during a flight, for concurrently utilizing a plurality wireless networks for air traffic control. The UAV air traffic control method 500 includes maintaining communication with a first wireless network and a second wireless network of the plurality of wireless networks (step 502); communicating first data with the first wireless network and second data with the second wireless network throughout the flight, wherein one or more of the first data and the second data is provided to an air traffic control system configured to maintain status of a plurality of UAVs in flight and perform control thereof (step 504); and adjusting the flight based on one or more of the first data and the second data and control from the air traffic control system (step 506). The first wireless network can provide bi-directional communication between the UAV and the air traffic control system and the second wireless network can support unidirectional communication to the UAV for status indications. The first wireless network can include one or more cellular networks and the second wireless network can include a location identification network. Both the first wireless network and the second wireless network can provide bi-directional communication between the UAV and the air traffic control system for redundancy with one of the first wireless network and the second wireless network operating as primary and another as a backup. The first wireless network can provide bi-directional communication between the UAV and the air traffic control system and the second wireless network can support unidirectional communication from the UAV for status indications.

The UAV air traffic control method can further include constraining the flight based on coverage of one or more of the first wireless network and the second wireless network (step 508). The constrained flight can include one or more of pre-configuring the UAV to operate only where the coverage exists, monitoring cell signal strength by the UAV and adjusting flight based therein, and a combination thereof. The first data can include location, speed, direction, and altitude for reporting to the air traffic control system. The control from the air traffic control system can include a plurality of functions comprising one or more of separation assurance between UAVs; navigation assistance; weather and obstacle reporting; monitoring of speed, altitude, location, and direction; traffic management; landing services; and real-time control. The UAV can be configured for autonomous operation through the air traffic control system.

In another embodiment, an Unmanned Aerial Vehicle (UAV) adapted for air traffic control via an air traffic control system and via communication to a plurality of wireless networks includes one or more rotors disposed to a body; wireless interfaces including hardware and antennas adapted to communicate with a first wireless network and a second wireless network of the plurality of wireless networks, and wherein the UAV comprises a unique identifier; a processor coupled to the wireless interfaces and the one or more rotors; and memory storing instructions that, when executed, cause the processor to: maintain communication with the first wireless network and the second wireless network via the wireless interfaces; communicate first data with the first wireless network and second data with the second wireless network throughout the flight, wherein one or more of the first data and the second data is provided to an air traffic control system configured to maintain status of a plurality of UAVs in flight and perform control thereof; and adjust the flight based on one or more of the first data and the second data and control from the air traffic control system. The first wireless network can provide bi-directional communication between the UAV and the air traffic control system and the second wireless network can support unidirectional communication to the UAV for status indications. The first wireless network can include one or more cellular networks and the second wireless network can include a location identification network. Both the first wireless network and the second wireless network can provide bi-directional communication between the UAV and the air traffic control system for redundancy with one of the first wireless network and the second wireless network operating as primary and another as a backup.

The first wireless network can provide bi-directional communication between the UAV and the air traffic control system and the second wireless network can support unidirectional communication from the UAV for status indications. The UAV can be configured to constrain the flight based on coverage of one or more of the first wireless network and the second wireless network. The constrained flight can include one or more of pre-configuring the UAV to operate only where the coverage exists, monitoring cell signal strength by the UAV and adjusting flight based therein, and a combination thereof. The first data can include location, speed, direction, and altitude for reporting to the air traffic control system. The control from the air traffic control system can include a plurality of functions comprising one or more of separation assurance between UAVs; navigation assistance; weather and obstacle reporting; monitoring of speed, altitude, location, and direction; traffic management; landing services; and real-time control. The UAV can be configured for autonomous operation through the air traffic control system.

§ 8.0 Package Delivery Authorization and Management

Figure 10:
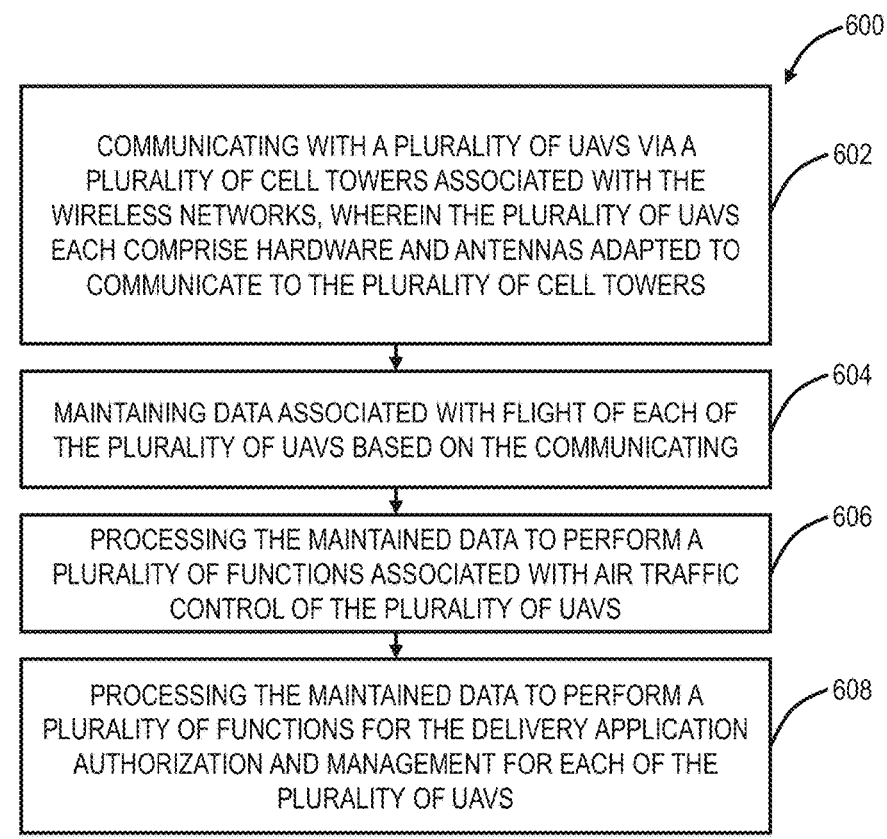
FIG. 10 is a flowchart of a package delivery authorization and management method utilizing the UAV air traffic control system of FIG. 5.

FIG. 10 is a flowchart of a package delivery authorization and management method 600 utilizing the UAV air traffic control system 300. The method 600 includes communicating with a plurality of UAVs via a plurality of cell towers associated with the wireless networks, wherein the plurality of UAVs each comprise hardware and antennas adapted to communicate to the plurality of cell towers (step 602); maintaining data associated with flight of each of the plurality of UAVs based on the communicating (step 604); processing the maintained data to perform a plurality of functions associated with air traffic control of the plurality of UAVs (step 606); and processing the maintained data to perform a plurality of functions for the delivery application authorization and management for each of the plurality of UAVs (step 608). The maintained data can include location information received and updated periodically from each of the plurality of UAVs, and wherein the location information is correlated to coordinates and altitude. The location information can be determined based on a combination of triangulation by the plurality of cell towers and a determination by the UAV based on a location identification network. The processing for the delivery application authorization and management can include checking the coordinates and the altitude based on a flight plan, for each of the plurality of UAVs. The checking the coordinates and the altitude can further include assuring each of the plurality of UAVs is in a specified flying lane.

The maintained data can include current battery and/or fuel status for each of the plurality of UAVs, and wherein the processing for the delivery application authorization and management can include checking the current battery and/or fuel status to ensure sufficiency to provide a current delivery, for each of the plurality of UAVs. The maintained data can include photographs and/or video of a delivery location, and wherein the processing for the delivery application authorization and management can include checking the delivery location is clear for landing and/or dropping a package, for each of the plurality of UAVs. The maintained data can include photographs and/or video of a delivery location, and wherein the processing for the delivery application authorization and management comprises, for each of the plurality of UAVs, checking the delivery location for a delivery technique including one of landing, dropping via a tether, dropping to a doorstep, dropping to a mailbox, dropping to a porch, and dropping to a garage. The plurality of UAVs can be configured to constrain flight based on coverage of the plurality of cell towers. The constrained flight can include one or more of pre-configuring the plurality of UAVs to operate only where the coverage exists, monitoring cell signal strength by the plurality of UAVs and adjusting flight based therein, and a combination thereof.

§ 8.1 Package Delivery Authorization and Management Via the Air Traffic Control System In another embodiment, the air traffic control system 300 utilizing wireless networks and concurrently supporting delivery application authorization and management includes the processor and the network interface communicatively coupled to one another; and the memory storing instructions that, when executed, cause the processor to: communicate, via the network interface, with a plurality of UAVs via a plurality of cell towers associated with the wireless networks, wherein the plurality of UAVs each include hardware and antennas adapted to communicate to the plurality of cell towers; maintain data associated with flight of each of the plurality of UAVs based on the communicating; process the maintained data to perform a plurality of functions associated with air traffic control of the plurality of UAVs; and process the maintained data to perform a plurality of functions for the delivery application authorization and management for each of the plurality of UAVs.

§ 8.2 Landing Authorization and Management

In another aspect, the air traffic control system 300 can be configured to provide landing authorization and management in addition to the aforementioned air traffic control functions and package delivery authorization and management. The landing authorization and management can be at the home base of the UAV, at a delivery location, and/or at a pickup location. The air traffic control system 300 can control and approve the landing. For example, the air traffic control system 300 can receive photographs and/or video from the UAV 50 of the location (home base, delivery location, pickup location). The air traffic control system 300 can make a determination based on the photographs and/or video, as well as other parameters such as wind speed, temperature, etc. to approve the landing.

§ 9.0 Separation Assurance Via the Air Traffic Control System

In another aspect, the air traffic control system 300 can be used to for separation assurance through altitude and flying lane coordination in addition to the aforementioned air traffic control functions, package delivery authorization and management, landing authorization and management, etc. As the air traffic control system 300 has monitored data from various UAVs 50, the air traffic control system 300 can keep track of specific flight plans as well as cause changes in real time to ensure specific altitude and vector headings, i.e., a flight lane. For example, the air traffic control system 300 can include a specific geography of interest, and there can be adjacent air traffic control systems 300 that communicate to one another and share some overlap in the geography for handoffs. The air traffic control systems 300 can make assumptions on future flight behavior based on the current data and then direct UAVs 50 based thereon. The air traffic control system 300 can also communicate with commercial aviation air traffic control systems for limited data exchange to ensure the UAVs 50 does not interfere with commercial aircraft or fly in no-fly zones.

§ 10.0 Flying Lane Management

Figure 11:
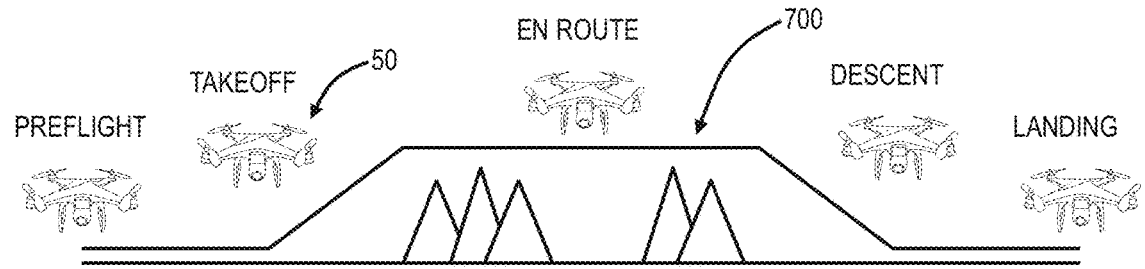
FIG. 11 is a diagram of a flight path of an associated flying lane of a UAV from takeoff to landing.

FIG. 11 is a diagram of a flight path of an associated flying lane 700 of a UAV 50 from takeoff to landing. The flying lane 700 covers all flight phases which include preflight, takeoff, en route, descent, and landing. Again, the flying lane 700 includes coordinates (e.g., GPS, etc.), altitude, speed, and heading at a specified time. As described herein, the UAV 50 is configured to communicate to the air traffic control system 300, during all of the flight phases, such as via the networks 302, 304. The air traffic control system 300 is configured to monitor and manage/control the flying lane 700 as described herein. The objective of this management is to avoid collisions, avoid obstructions, avoid flight in restricted areas or areas with no network 302, 304 coverage, etc.

During preflight, the UAV 50 is configured to communicate with the air traffic control system 300 for approvals (e.g., flight plan, destination, the flying lane 700, etc.) and notification thereof, for verification (e.g., weather, delivery authorization, etc.), and the like. The key aspect of the communication during the preflight is for the air traffic control system 300 to become aware of the flying lane 700, to ensure it is open, and to approve the UAV 50 for takeoff. Other aspects of the preflight can include the air traffic control system 300 coordinating the delivery, coordinating with other systems, etc. Based on the communication from the UAV 50 (as well as an operator, scheduler, etc.), the air traffic control system 300 can perform processing to make sure the flying lane 700 is available and if not, to adjust accordingly.

During takeoff, the UAV 50 is configured to communicate with the air traffic control system 300 for providing feedback from the UAV 50 to the air traffic control system 300. Here, the air traffic control system 300 can store and process the feedback to keep up to date with the current situation in airspace under control, for planning other flying lanes 700, etc. The feedback can include speed, altitude, heading, etc. as well as other pertinent data such as location (e.g., GPS, etc.), temperature, humidity, the wind, and any detected obstructions during takeoff. The detected obstructions can be managed by the air traffic control system 300 as described herein, i.e., temporary obstructions, permanent obstructions, etc.

Once airborne, the UAV is en route to the destination and the air traffic control system 300 is configured to communicate with the air traffic control system 300 for providing feedback from the UAV 50 to the air traffic control system 300. Similar to takeoff, the communication can include the same feedback. Also, the communication can include an update to the flying lane 700 based on current conditions, changes, etc. A key aspect is the UAV 50 is continually in data communication with the air traffic control system 300 via the networks 302, 304.

As the destination is approached, the air traffic control system 300 can authorize/instruct the UAV 50 to begin the descent. Alternatively, the air traffic control system 300 can pre-authorize based on reaching a set point. Similar to takeoff and en route, the communication in the descent can include the same feedback. The feedback can also include information about the landing spot as well as processing by the air traffic control system 300 to change any aspects of the landing based on the feedback. Note, the landing can include a physical landing or hovering and releasing cargo.

In various embodiments, the air traffic control system 300 is expected to operate autonomously or semi-autonomously, i.e., there is not a live human operator monitoring each UAV 50 flight. This is an important distinction between conventional air traffic control for aircraft and the air traffic control system 300 for UAVs 50. Specifically, it would not be feasible to manage UAVs 50 with live operators. Accordingly, the air traffic control system 300 is configured to communicate and manage during all flight phases with a large quantity of UAVs 50 concurrently in an automated manner.

In an embodiment, the objective of the flying lane management through the air traffic control system 300 is to manage deliveries efficiently while secondarily to ensure collision avoidance. Again, this aspect is different from conventional air traffic control which focuses first and foremost of collision avoidance. This is not to say that collision avoidance is minimized, but rather it is less important since the UAVs 50 can themselves maintain a buffer from one another based on the in-flight detection. To achieve the management, the air traffic control system 300 can implement various routing techniques to allows the UAVs 50 to use associated flying lanes 700 to arrive and deliver packages. Thus, one aspect of flying lane management, especially for delivery applications, is efficiency since efficient routing can save time, fuel, etc. which is key for deliveries.

Figure 12:
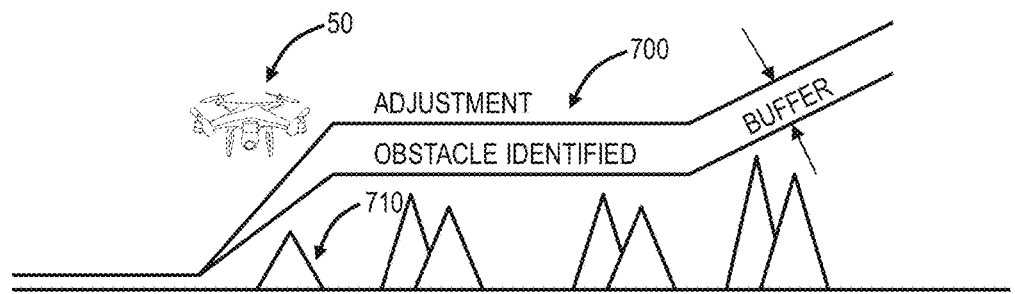
FIG. 12 is a diagram of obstruction detection by the UAV and associated changes to the flying lane.

FIG. 12 is a diagram of obstruction detection by the UAV 50 and associated changes to the flying lane 700. One aspect of flying lane management is detected obstruction management. Here, the UAV 50 has taken off, have the flying lane 700, and is in communication with the air traffic control system 300. During the flight, either the UAV 50 detects an obstacle 710 or the air traffic control system 300 is notified from another source of the obstacle 710 and alerts the UAV 50. Again, the UAVs 50 are flying at lower altitudes, and the obstacle 710 can be virtually anything that is temporary such as a crane, a vehicle, etc. or that is permanent such as a building, tree, etc. The UAV 50 is configured, with assistance and control from the air traffic control system 300 to adjust the flying lane 700 to overcome the obstacle 710 as well as add a buffer amount, such as 35 feet or any other amount for safety.

Figure 13:
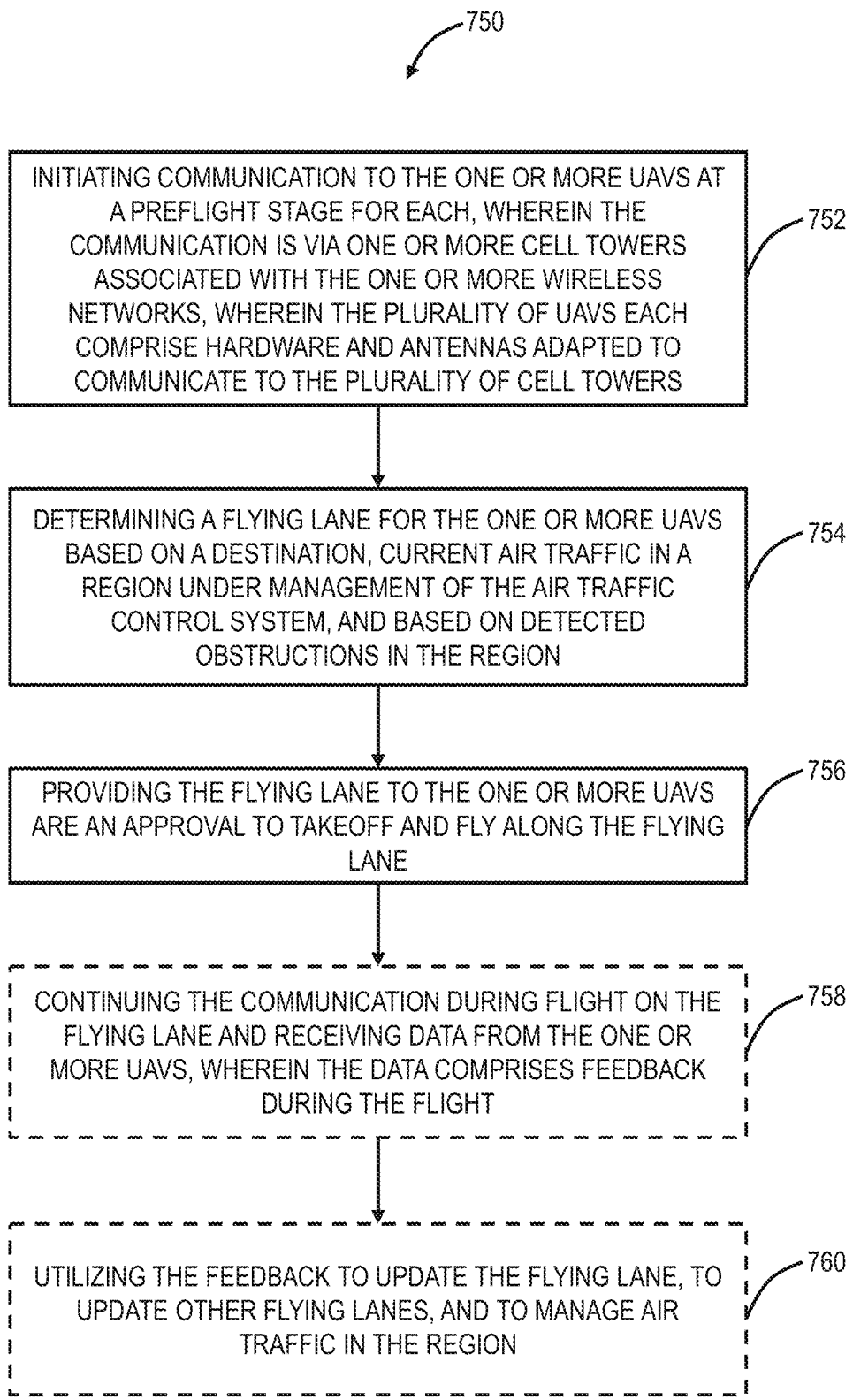
FIG. 13 is a flowchart of a flying lane management method via an air traffic control system communicatively coupled to a UAV via one or more wireless networks.

FIG. 13 is a flowchart of a flying lane management method 750 via an air traffic control system communicatively coupled to a UAV via one or more wireless networks. In an embodiment, the flying lane management method 750 includes initiating communication to the one or more UAVs at a preflight stage for each, wherein the communication is via one or more cell towers associated with the one or more wireless networks, wherein the plurality of UAVs each include hardware and antennas adapted to communicate to the plurality of cell towers (step 752); determining a flying lane for the one or more UAVs based on a destination, current air traffic in a region under management of the air traffic control system, and based on detected obstructions in the region (step 754); and providing the flying lane to the one or more UAVs are an approval to take off and fly along the flying lane (step 756). The flying lane management method 750 can further include continuing the communication during flight on the flying lane and receiving data from the one or more UAVs, wherein the data includes feedback during the flight (step 758); and utilizing the feedback to update the flying lane, to update other flying lanes, and to manage air traffic in the region (step 760). During the flight, the feedback includes speed, altitude, and heading, and the feedback can further include one or more of temperature, humidity, wind, and detected obstructions.

The flying lane management method 750 can further include providing updates to the flying lane based on the feedback and based on feedback from other devices. The flying lane management method 750 can further include, based on the feedback, determining the one or more UAVs at ready to descend or fly to the destination and providing authorization to the one or more UAVs for a descent. The flying lane management method 750 can further include, based on the feedback, detecting a new obstruction; and one of updating the flying lane based on adjustments made by the one or more UAVs due to the new obstruction and providing an updated flying lane due to the new obstruction. The adjustments and/or the updated flying lane can include a buffer distance from the new obstruction. The new obstruction can be detected by the one or more UAVs based on hardware thereon and communicated to the air traffic control system. The air traffic control system can be adapted to operate autonomously.

In another embodiment, an air traffic control system communicatively coupled to one or more Unmanned Aerial Vehicles (UAVs) via one or more wireless networks adapted to perform flying lane management includes a network interface and one or more processors communicatively coupled to one another; and memory storing instructions that, when executed, cause the one or more processors to: initiate communication to the one or more UAVs at a preflight stage for each, wherein the communication is via one or more cell towers associated with the one or more wireless networks, wherein the plurality of UAVs each include hardware and antennas adapted to communicate to the plurality of cell towers; determine a flying lane for the one or more UAVs based on a destination, current air traffic in a region under management of the air traffic control system, and based on detected obstructions in the region; and provide the flying lane to the one or more UAVs are an approval to take off and fly along the flying lane. The instructions, when executed, can further cause the one or more processors to: continue the communication during flight on the flying lane and receiving data from the one or more UAVs, wherein the data include feedback during the flight; and utilize the feedback to update the flying lane, to update other flying lanes, and to manage air traffic in the region.

During the flight, the feedback includes speed, altitude, and heading, and the feedback can further include one or more of temperature, humidity, wind, and detected obstructions. The instructions, when executed, can further cause the one or more processors to: provide updates to the flying lane based on the feedback and based on feedback from other devices. The instructions, when executed, can further cause the one or more processors to based on the feedback, determine the one or more UAVs at ready to descend or fly to the destination and providing authorization to the one or more UAVs for a descent. The instructions, when executed, can further cause the one or more processors to based on the feedback, detect a new obstruction; and one of update the flying lane based on adjustments made by the one or more UAVs due to the new obstruction and provide an updated flying lane due to the new obstruction. The adjustments and/or the updated flying lane can include a buffer distance from the new obstruction. The new obstruction can be detected by the one or more UAVs based on hardware thereon and communicated to the air traffic control system. The air traffic control system can be adapted to operate autonomously.

§ 11.0 Air Traffic Control Monitoring Systems and Methods

Figure 14:
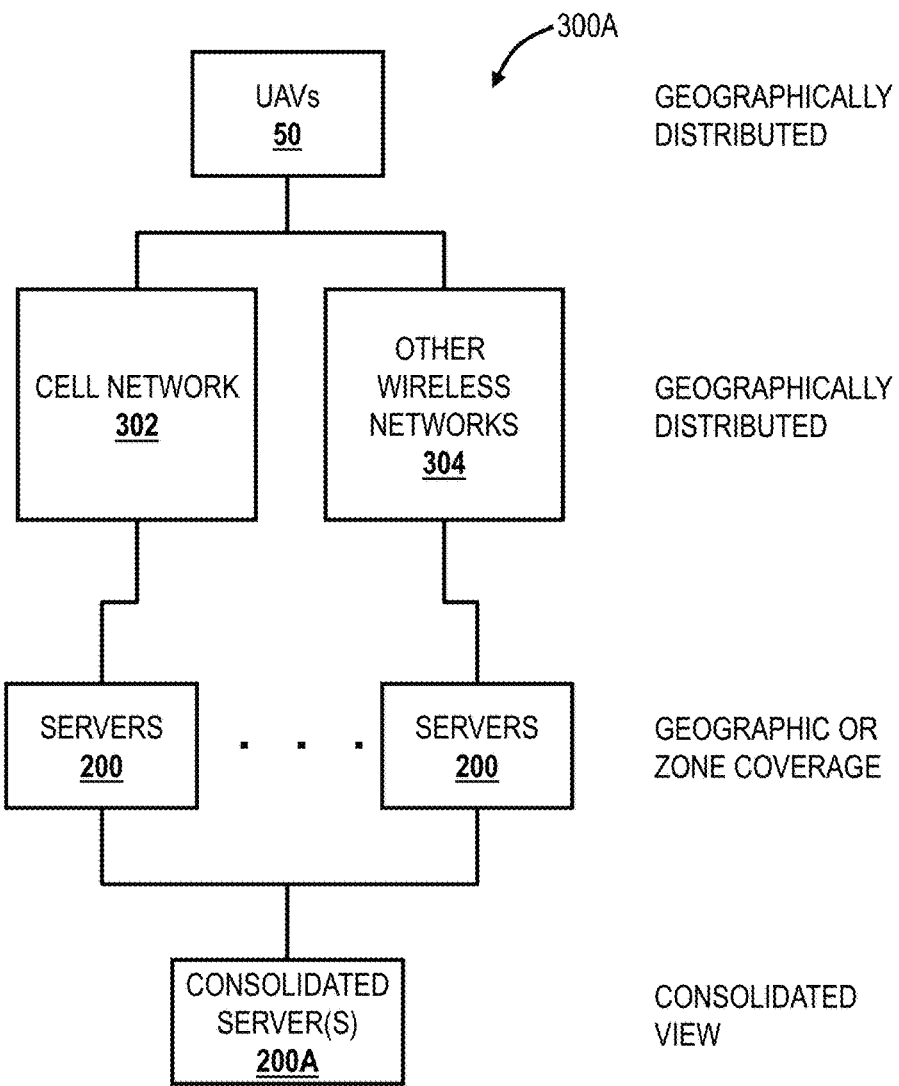
FIG. 14 is a block diagram of functional components of a consolidated UAV air traffic control monitoring system.

FIG. 14 is a block diagram of functional components of a consolidated UAV air traffic control monitoring system 300A. The monitoring system 300A is similar to the UAV air traffic control system 300 described herein. Specifically, the monitoring system 300A includes the cell network 302 (or multiple cell networks 302) as well as the other wireless networks 304. The one or more servers 200 are communicatively coupled to the networks 302, 304 in a similar manner as in the UAV air traffic control system 300 as well as the UAVs 50 communication with the servers 200. Additionally, the monitoring system 300A includes one or more consolidated servers 200A which are communicatively coupled to the servers 200.

The consolidated servers 200A are configured to obtain a consolidated view of all of the UAVs 50. Specifically, the UAVs 50 are geographically distributed as are the networks 302, 304. The servers 200 provide geographic or zone coverage. For example, the servers 200 may be segmented along geographic boundaries, such as different cities, states, etc. The consolidated servers 200A are configured to provide a view of all of the servers 200 and their associated geographic or zone coverage. Specifically, the consolidated servers 200A can be located in a national Air Traffic Control center. From the consolidated servers 200A, any air traffic control functions can be accomplished for the UAVs 50. The consolidated servers 200A can aggregate data on all of the UAVs 50 based on multiple sources, i.e., the servers 200, and from multiple networks 302, 304.

Thus, from the consolidated servers 200A, UAV traffic can be managed from a single point. The consolidated servers 200A can perform any of the air traffic control functions that the servers 200 can perform. For example, the consolidated servers 200A can be used to eliminate accidents, minimize delay and congestion, etc. The consolidate servers 200A can handle connectivity with hundreds or thousands of the servers 200 to manage millions or multiple millions of UAVs 50. Additionally, the consolidated servers 200A can provide an efficient Graphical User Interface (GUI) for air traffic control.

Figure 15:
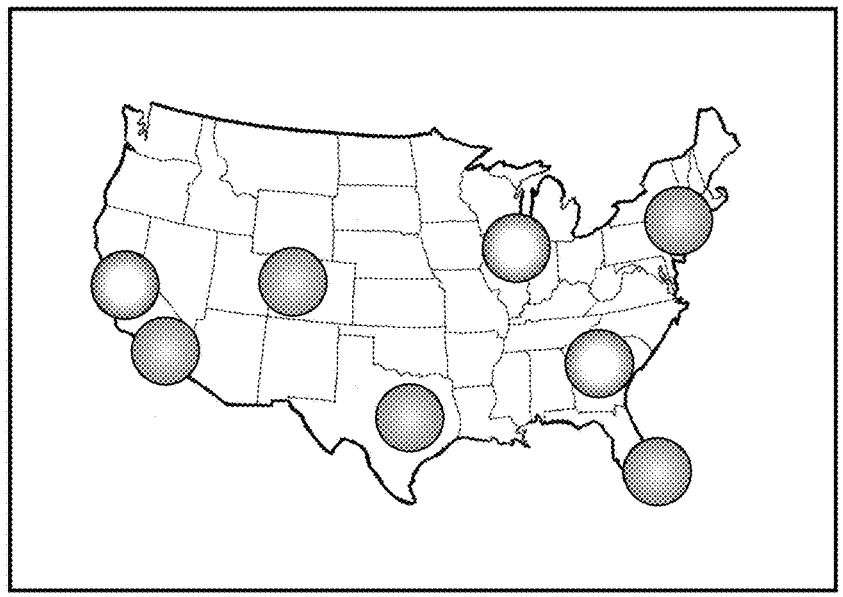
FIG. 15 is a screenshot of a Graphical User Interface (GUI) providing a view of the consolidated UAV air traffic control monitoring system.

FIG. 15 is a screenshot of a Graphical User Interface (GUI) providing a view of the consolidated UAV air traffic control monitoring system. Specifically, the GUI can be provided by the consolidated servers 200A to provide visualization, monitoring, and control of the UAVs 50 across a wide geography, e.g., state, region, or national. In FIG. 15, the GUI provides a map visualization at the national level, consolidating views from multiple servers 200. Various circles are illustrated with shading, gradients, etc. to convey information such as congestion in a local region.

A user can drill-down such as by clicking any of the circles or selecting any geographic region to zoom in. The present disclosure contemplates zooming between the national level down to local or even street levels to view individual UAVs 50. The key aspect of the GUI is the information display is catered to the level of UAV 50 traffic. For example, at the national level, it is not possible to display every UAV 50 since there are orders of magnitude more UAVs 50 than airplanes. Thus, at higher geographic levels, the GUI can provide a heat map or the like to convey levels of UAV 50 congestion. As the user drills-down to local geographies, individual UAVs 50 can be displayed.

Using the GUI, the consolidated servers 200A, and the servers 200, various air traffic control functions can be performed. One aspect is that control can be high-level (coarse) through individual-level (fine) as well as in-between. That is, control can be at a large geographic level (e.g., city or state), at a local level (city or smaller), and at an individual UAV 50 level. The high-level control can be performed via single commands through the consolidated server 200A that is propagated down to the servers 200 and to the UAVs 50. Examples of high-level control include no-fly zones, congestion control, traffic management, holding patterns, and the like. Examples of individual-level control include flight plan management; separation assurance; real-time control; monitoring of speed, altitude, location, and direction; weather and obstacle reporting; landing services; and the like.

In addition to the communication from the consolidated servers 200A to the UAVs 50, such as through the servers 200, for air traffic control functions, there can be two-way communication as well. In an embodiment, the UAVs 50 are configured to provide a first set of data to the servers 200, such as speed, altitude, location, direction, weather and obstacle reporting. The servers 200 are configured to provide a second set of data to the consolidated servers 200A, such as a summary or digest of the first data. This hierarchical data handling enables the consolidated servers 200A to handle nationwide control of millions of UAVs 50.

For example, when there is a view at the national level, the consolidated servers 200A can provide summary information for regions, such as illustrated in FIG. 15. This is based on the second set of data which can provide a summary view of the GUI, such as how many UAVs 50 are in a region. When there is a drill-down to a local level, the consolidated servers 200A can obtain more information from the servers, i.e., the first set of data, allowing the consolidated servers 200A to act in a similar manner as the servers 200 for local control.

Figure 16:
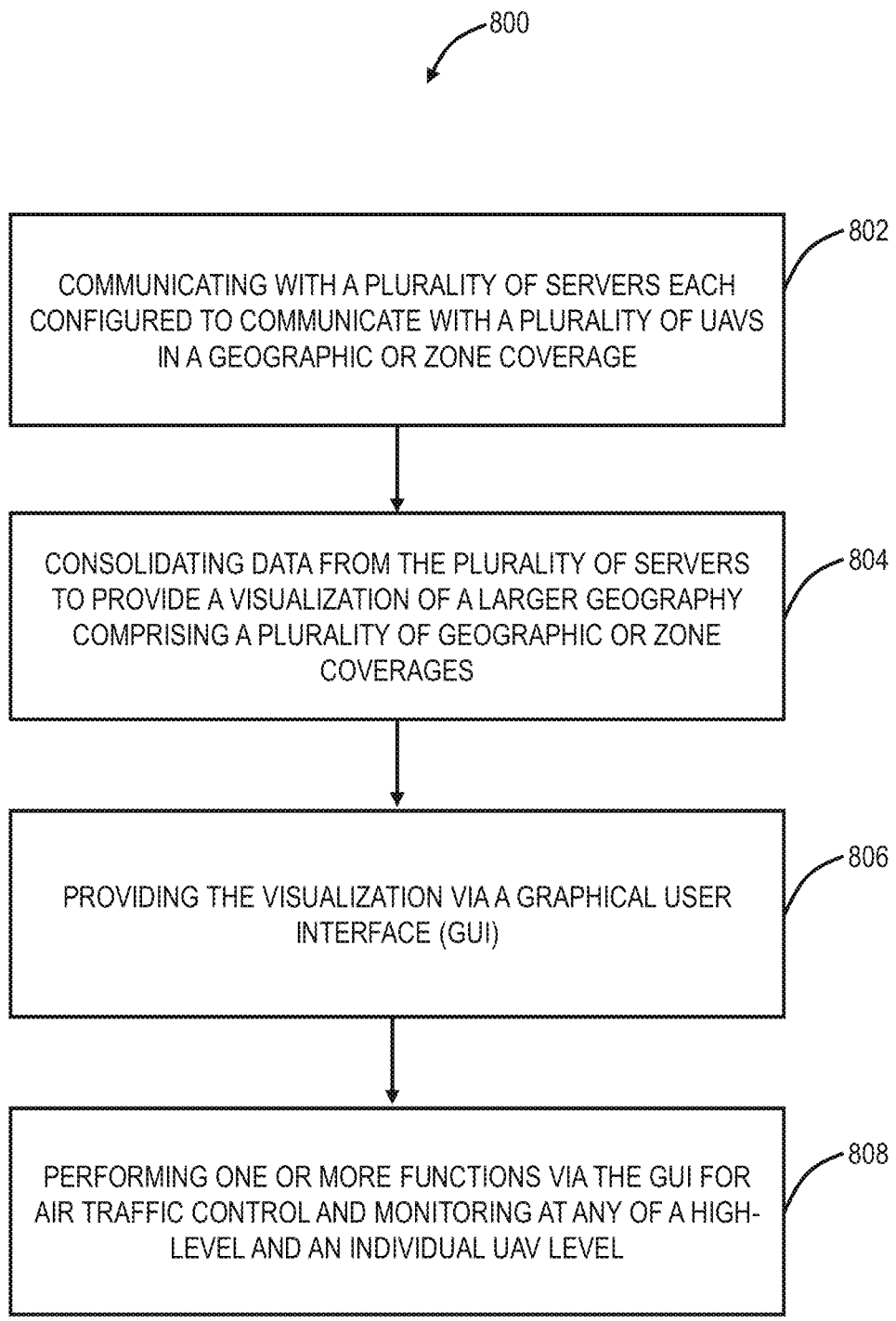
FIG. 16 is a flowchart of a UAV air traffic control and monitor method.

FIG. 16 is a flowchart of a UAV air traffic control and monitor method 800. The method 800 includes communicating with a plurality of servers each configured to communicate with a plurality of UAVs in a geographic or zone coverage (step 802); consolidating data from the plurality of servers to provide a visualization of a larger geography comprising a plurality of geographic or zone coverages (step 804); providing the visualization via a Graphical User Interface (GUI) (step 806); and performing one or more functions via the GUI for air traffic control and monitoring at any of a high-level and an individual UAV level (step 808). The visualization can include a heat map of congestion at the larger geography and a view of individual UAVs via a drill-down. For the individual UAV level, the consolidating the data can include obtaining a first set of data and, for the high-level, the consolidating the data can include obtaining a second set of data which is a summary or digest of the first set of data. The first set of data can include speed, altitude, location, direction, weather and obstacle reporting from individual UAVs.

For the individual UAV level, the air traffic control and monitoring can include any of flight plan management; separation assurance; real-time control; monitoring of speed, altitude, location, and direction; weather and obstacle reporting; landing services, and wherein, for the high-level, the air traffic control and monitoring can include any of no-fly zones, congestion control, traffic management, and hold patterns. The plurality of UAVs can be configured to constrain flight based on coverage of a plurality of cell towers, wherein the constrained flight can include one or more of pre-configuring the plurality of UAVs to operate only where the coverage exists, monitoring cell signal strength by the plurality of UAVs and adjusting flight based therein, and a combination thereof. One or more of the plurality of UAVs are configured for autonomous operation through the air traffic control. The plurality of UAVs each can include circuitry adapted to communicate via a plurality of cellular networks to the plurality of servers. The plurality of cellular networks can include a first wireless network and a second wireless network each provide bi-directional communication between the UAV and the plurality of servers for redundancy with one of the first wireless network and the second wireless network operating as primary and another as a backup.

In another embodiment, an Unmanned Aerial Vehicle (UAV) air traffic control and monitoring system includes a network interface and one or more processors communicatively coupled to one another; and memory storing instructions that, when executed, cause the one or more processors to: communicate with a plurality of servers each configured to communicate with a plurality of UAVs in a geographic or zone coverage; consolidate data from the plurality of servers to provide a visualization of a larger geography comprising a plurality of geographic or zone coverages; provide the visualization via a Graphical User Interface (GUI); and perform one or more functions via the GUI for air traffic control and monitoring at any of a high-level and an individual UAV level.

In a further embodiment, a non-transitory computer-readable medium includes instructions that, when executed, cause one or more processors to perform steps of: communicating with a plurality of servers each configured to communicate with a plurality of UAVs in a geographic or zone coverage; consolidating data from the plurality of servers to provide a visualization of a larger geography comprising a plurality of geographic or zone coverages; providing the visualization via a Graphical User Interface (GUI); and performing one or more functions via the GUI for air traffic control and monitoring at any of a high-level and an individual UAV level.

Figure 17:
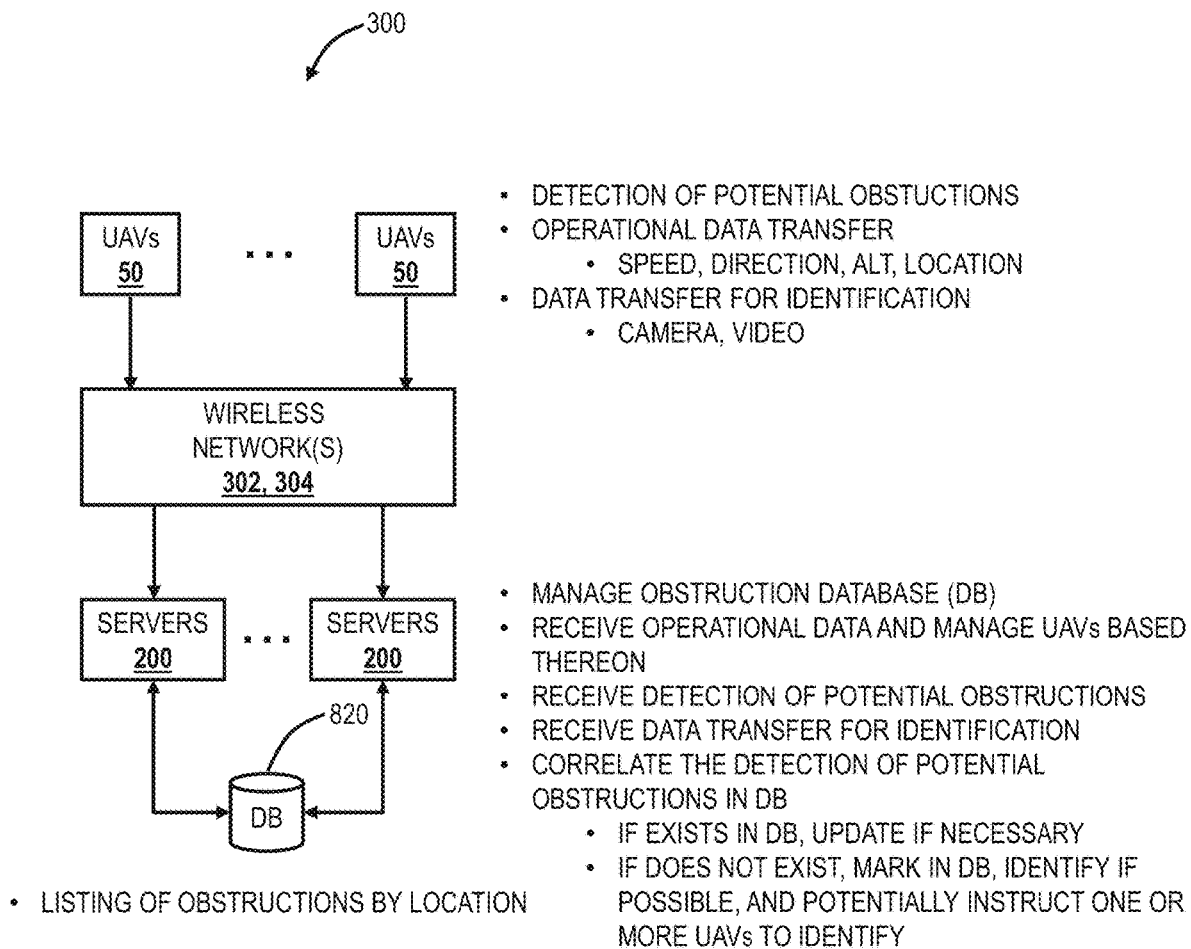
FIGS. 17 and 18 are block diagrams of the UAV air traffic control system describing functionality associated with obstruction detection, identification, and management with FIG. 17 describing data transfer from the UAVs to the servers and FIG. 18 describing data transfer to the UAVs from the servers.
Figure 18:
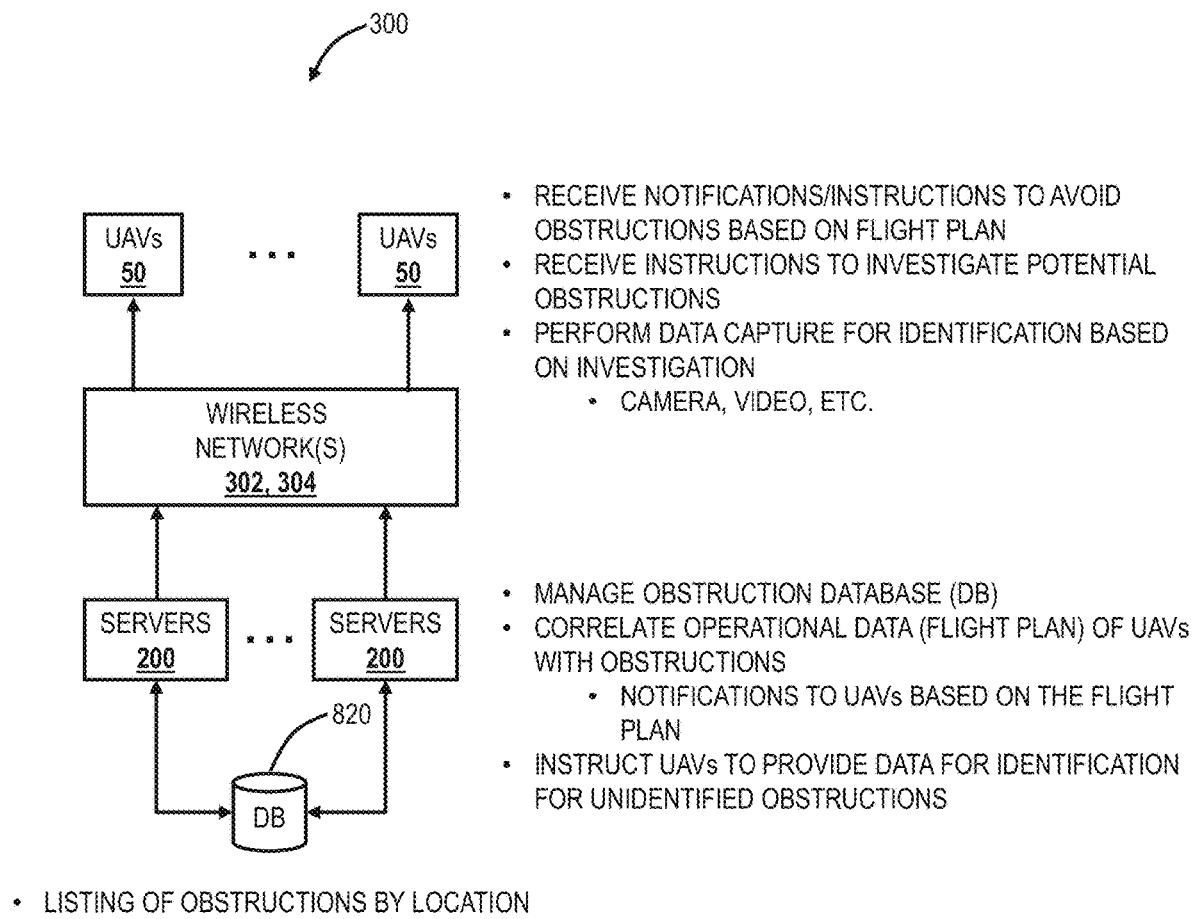

§ 12.0 Obstruction Detection, Identification, and Management Systems and Methods FIGS. 17 and 18 are block diagrams of the UAV air traffic control system 300 describing functionality associated with obstruction detection, identification, and management with FIG. 17 describing data transfer from the UAVs 50 to the servers 200 and FIG. 18 describing data transfer to the UAVs 50 from the servers 200. As described herein, obstructions include, without limitation, other UAVs 50 based on their flight plan and objects at or near the ground at a height above ground of several hundred feet. Again, the UAVs 50 typically fly at low altitudes such as 100'-500' and obstruction management is important based on this low level of flight.

The obstructions can be stored and managed in an obstruction database (DB) 820 communicatively coupled to the servers 200 and part of the UAV air traffic control system 300. Obstructions can be temporary or permanent and managed accordingly. Thus, the DB 820 can include an entry for each obstruction with location (e.g., GPS coordinates), size (height), and permanence. Temporary obstructions can be ones that are transient in nature, such as a scaffold, construction equipment, other UAVs 50 in flight, etc. Permanent obstructions can be buildings, power lines, cell towers, geographic (mountains), etc. For the permanence, each entry in the DB 820 can either be marked as permanent or temporary with a Time to Remove (TTR). The TTR can be how long the entry remains in the DB 820. The permanence is determined by the servers 200 as described herein.

The obstruction detection, identification, and management are performed in the context of the UAV air traffic control system 300 described herein with communication between the UAVs 50 and the servers 200 via the wireless networks 302, 304. FIGS. 17 and 18 illustrate functionality in the UAV air traffic control system 300 with FIGS. 17 and 18 separate to show different data flow and processing.

In FIG. 17, the UAVs 50 communicates to the servers 200 through the wireless networks 302, 304. Again, as described herein, the UAVs 50 have advanced data capture capabilities, such as video, photos, location coordinates, altitude, speed, wind, temperature, etc. Additionally, some UAVs 50 can be equipped with radar to provide radar data surveying proximate landscape. Collectively, the data capture is performed by data capture equipment associated with the UAVs 50.

Through the data capture equipment, the UAVs 50 are adapted to detect potential obstructions and detect operational data (speed, direction, altitude, heading, location, etc.). Based on one or more connections to the wireless networks 302, 304, the UAVs 50 are adapted to transfer the operational data to the servers 200. Note, the UAV 50 can be configured to do some local processing and transmit summaries of the operational data to reduce the transmission load on the wireless networks 302, 304. For example, for speed, heading, etc., the UAVs 50 can transmit delta information such that the servers 200 can track the flight plan. Note, the transmission of the operational data is performed throughout the flight such that the servers 200 can manage and control the UAVs 50.

For obstructions, the UAVs 50 can capture identification data, photos, video, etc. In an embodiment, the UAVs 50 are provided advanced notification of obstructions (in FIG. 18) and capable of local data processing of the identification data to verify the obstructions. If the local data processing determines an obstruction is already known, i.e., provided in a notification from the servers 200, the UAV 50 does not require any further processing or data transfer of the identification data, i.e., this obstruction is already detected. On the other hand, if the UAV 50 detects a potential obstruction, i.e., one that it has not been notified of, based on the local data processing, the UAV 50 can perform data transfer of the identification data to the servers 200.

The servers 200 are configured to manage the obstruction DB 820, namely to update the entries therein. The servers 200 are configured to receive operational data from the UAVs 50 under control for management thereof. Specifically, the servers 200 are configured to manage the flight plans of the UAVs 200, and, in particular with respect to obstructions, for advanced notification of future obstructions in the flight plan.

The servers 200 are configured to receive the detection of potential obstructions. The UAVs 200 can either simply notify the servers 200 of a potential obstruction as well as provide the identification data for the servers 200 to perform identification and analysis. Upon receipt of any data from the UAVs 200 related to obstructions (a mere notification, actual photos, etc.), the servers 200 are configured to correlate this data with the DB 820. If the data correlates to an entry that exists in the DB 820, the servers 200 can update the entry if necessary, e.g., update any information related to the obstruction such as last seen date.

If the servers 200 detect the potential obstruction does not exist in the DB 820, the servers 200 are configured to add an entry in the DB 820, perform identification if possible from the identification data, and potentially instruct a UAV 50 to identify in the future. For example, if the servers 200 can identify the potential obstruction from the identification data, the servers 200 can create the DB 820 entry and populate it with the identified data. The servers 200 can analyze the identification data, as well as request human review, using pattern recognition to identify what the obstruction is, what its characteristics are (height, size, permanency, etc.).

If the servers 200 do not have enough identification data, the servers 200 can instruct the identifying UAV 50 or another UAV 50 in proximity in the future to obtain specific identification data for the purposes of identification.

In FIG. 18, the servers 200 continue to manage the DB 820, both for populating/managing entries as well as to provide notifications of obstructions in the flight plans of each of the UAVs 50. Specifically, the servers 200 are configured to keep track of the flight plans of all of the UAVs 50 under its control. As part of this tracking, the servers 200 are configured to correlate the operational data to derive the flight plan and to determine any obstructions from the DB 820 in the flight plan. The servers 200 are configured to provide notifications and/or instructions to the UAVs 50 based on upcoming obstructions.

Additionally, the servers 200 are configured to provide instructions to UAVs 50 to capture identification data for potential obstructions that are not yet identified. Specifically, the servers 200 can instruct the UAVs 50 on what exact data to obtain, e.g., pictures, video, etc., and from what angle, elevation, direction, location, etc. With the identification data, the servers 200 can perform various processes to pattern match the pictures with known objects for identification. In case an obstruction is not matched, it can be flagged for human review. Also, the human review can be performed based on successful matches to grade the performance and to improve pattern matching techniques further. Identification of the obstruction is important for permanency determinations. For example, a new high-rise building is permanent whereas a construction crane is temporary.

For the TTR, temporary obstructions are automatically removed in the DB 820 based on this entry. In an embodiment, the TTR can be a flag with a specified time. In another embodiment, the TTR can be a flag which requires removal if the next UAV 50 passing near the obstruction fails to detect and report it.

Figure 19:
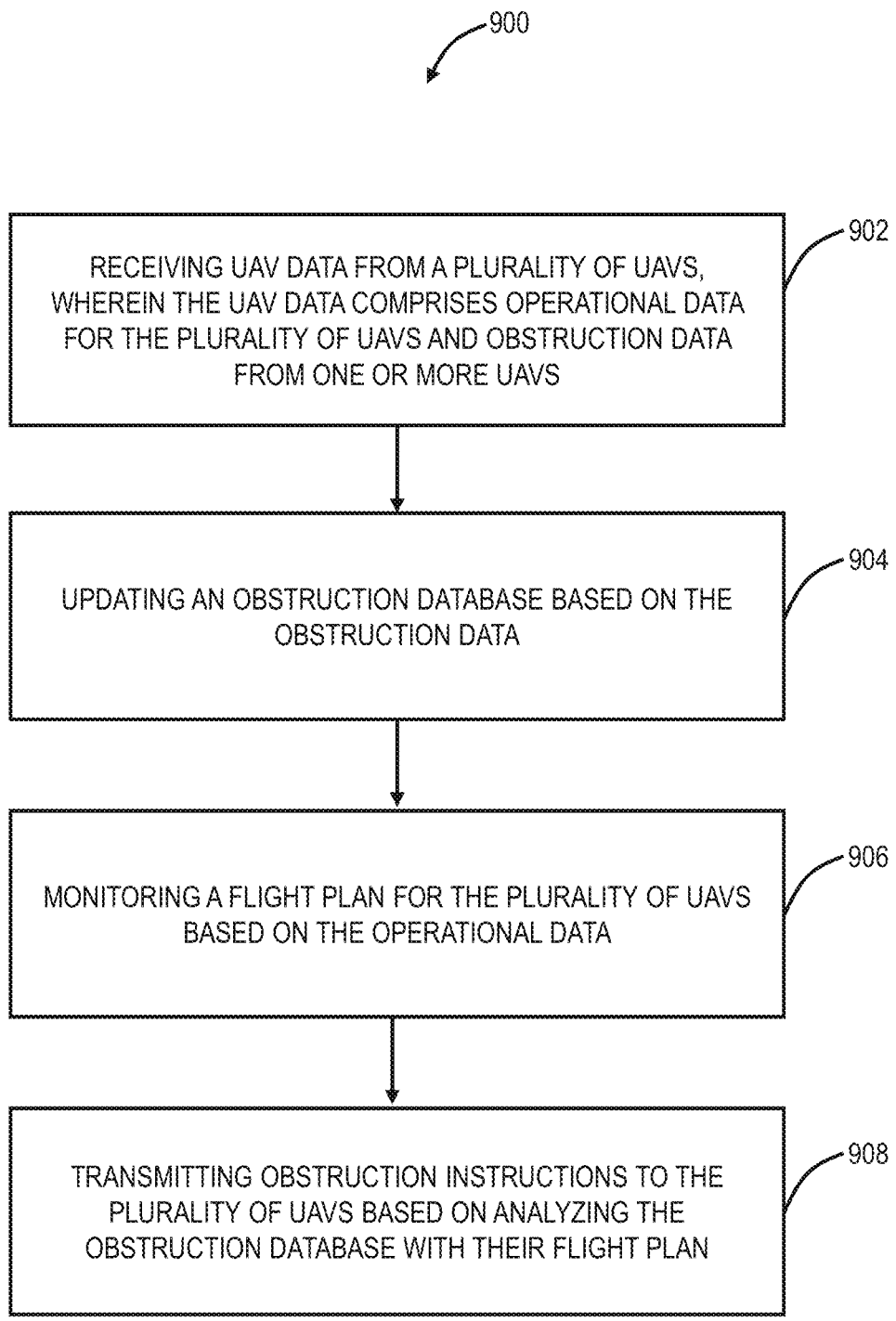
FIG. 19 is a flowchart of an obstruction detection and management method implemented through the UAV air traffic control system for the UAVs.

FIG. 19 is a flowchart of an obstruction detection and management method 900 implemented through the UAV air traffic control system 300 for the UAVs 50. The obstruction detection and management method 900 includes receiving UAV data from a plurality of UAVs, wherein the UAV data comprises operational data for the plurality of UAVs and obstruction data from one or more UAVs (step 902); updating an obstruction database based on the obstruction data (step 904); monitoring a flight plan for the plurality of UAVs based on the operational data (step 906); and transmitting obstruction instructions to the plurality of UAVs based on analyzing the obstruction database with their flight plan (step 908).

The obstruction data can include an indication of a potential obstruction which was not provided to a UAV in the obstruction instructions. The obstruction data can include a confirmation of an obstruction based on the obstruction instructions, and wherein the updating can include noting any changes in the obstruction based on the confirmation. The obstruction instructions can include a request to a UAV to perform data capture of a potential obstruction, wherein the obstruction data can include photos and/or video of the potential obstruction, and wherein the updating can include identifying the potential obstruction based on the obstruction data.

The obstruction database can include entries of obstructions with their height, size, location, and a permanency flag comprising either a temporary obstruction or a permanent obstruction. The permanency flag can include a Time To Remove (TTR) for the temporary obstruction which is a flag with a specified time or a flag which requires removal if the next UAV passing near the temporary obstruction fails to detect and report it. The operational data can include a plurality of speed, location, heading, and altitude, and wherein the flight plan is determined from the operational data. The plurality of UAVs fly under about 1000'.

In another embodiment, an Unmanned Aerial Vehicle (UAV) air traffic control and monitoring system for obstruction detection and management includes a network interface and one or more processors communicatively coupled to one another; and memory storing instructions that, when executed, cause the one or more processors to receive UAV data from a plurality of UAVs, wherein the UAV data includes operational data for the plurality of UAVs and obstruction data from one or more UAVs; update an obstruction database based on the obstruction data; monitor a flight plan for the plurality of UAVs based on the operational data; and transmit obstruction instructions to the plurality of UAVs based on analyzing the obstruction database with their flight plan.

A non-transitory computer-readable medium comprising instructions that, when executed, cause one or more processors to perform steps of: receiving Unmanned Aerial Vehicle (UAV) data from a plurality of UAVs, wherein the UAV data includes operational data for the plurality of UAVs and obstruction data from one or more UAVs; updating an obstruction database based on the obstruction data; monitoring a flight plan for the plurality of UAVs based on the operational data; and transmitting obstruction instructions to the plurality of UAVs based on analyzing the obstruction database with their flight plan.

§ 13.0 Managing Detected Static Obstructions

Figure 20:
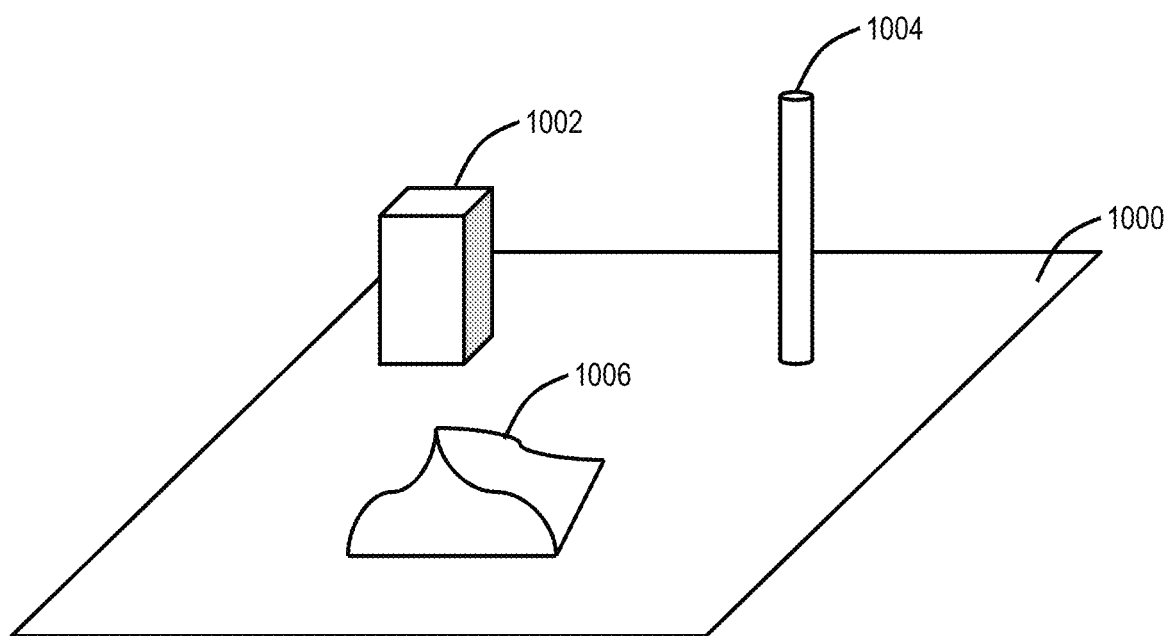
FIG. 20 is a diagram of geographical terrain with static obstructions.

FIG. 20 is a diagram of geographical terrain 1000 with static obstructions 1002, 1004, 1006. As described herein, static obstructions are at or near the ground and can be temporary or permanent. Again, since the UAVs 50 fly much lower than conventional aircraft, these obstructions need to be managed and communicated to the UAVs 50. A dynamic obstruction can include moving objects such as other UAVs 50, vehicles on the ground, etc. Management of dynamic obstructions besides other UAVs 50 is difficult in the UAV air traffic control system 300 due to their transient nature. In an embodiment, the UAVs 50 themselves can include local techniques to avoid detected dynamic obstructions. The UAV air traffic control system 300 can be used to ensure all controlled UAVs 50 know about and avoid other proximate UAVs 50. Static obstructions, on the other hand, can be efficiently managed and avoided through the UAV air traffic control system 300. The UAV air traffic control system 300 can be used to detect the static obstructions through a combination of crowd-sourcing data collection by the UAVs 50, use of external databases (mapping programs, satellite imagery, etc.), and the like. The UAV air traffic control system 300 can also be used to communicate the detected static obstructions to proximate UAVs 50 for avoidance thereof.

Non-limiting examples of static obstructions which are permanent include buildings, mountains, cell towers, utility lines, bridges, etc. Non-limiting examples of static obstructions which are temporary include tents, parked utility vehicles, etc. From the UAV air traffic control system 300, these temporary and permanent static obstructions can be managed the same with the temporary obstructions having a Time To Remove (TTR) parameter which can remove it from the database 820.

The static obstructions can take various forms with different sizes, heights, etc. The static obstruction 1002 is substantially rectangular, e.g., a building or the like. The static obstruction 1004 can be substantially cylindrical, e.g., a cell tower, pole, or the like. The static obstruction 1006 can be irregularly shaped, e.g., a mountain, building, or the like.

Figure 21:
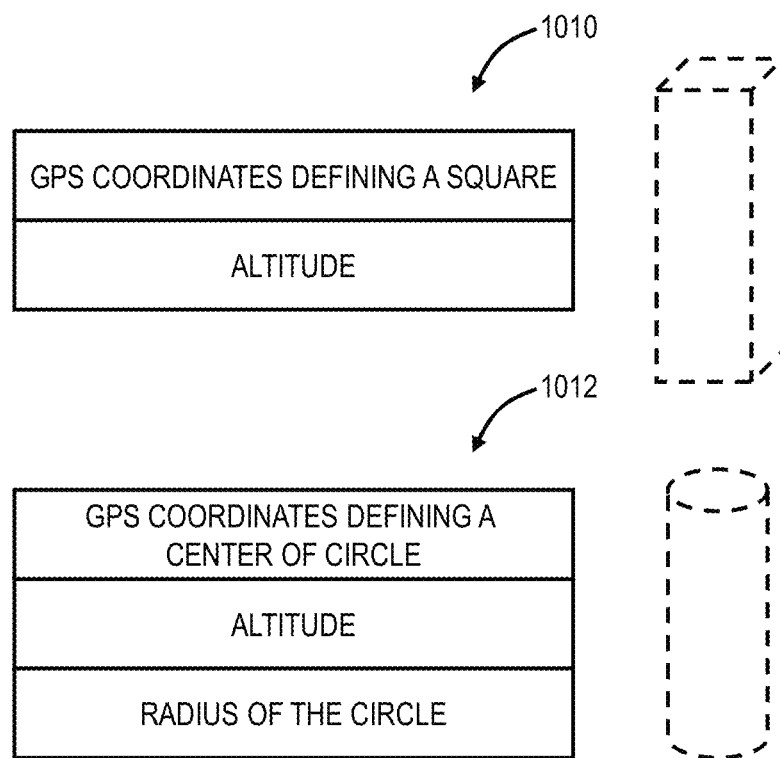
FIG. 21 is diagrams of data structures which can be used to define the exact location of any of the static obstructions.

FIG. 21 is a diagram of data structures 1010, 1012 which can be used to define the exact location of any of the static obstructions 1002, 1004, 1006. The UAV air traffic control system 300 can use these data structures 1010, 1012 to store information in the database 820 regarding the associated static obstructions 1002, 1004, 1006. In an embodiment, the UAV air traffic control system 300 can use one or both of these data structures 1010, 1012 to define a location of the static obstructions 1002, 1004, 1006. This location can be a no-fly zone, i.e., avoided by the UAVs 50. The UAV air traffic control system 300 can use the data structure 1010 for the static obstruction 1002, 1006 and the data structure 1012 for the static obstruction 1004. In this manner, the UAVs 50 can know exactly where the static obstructions 1002, 1004, 1006 are located and fly accordingly.

The data structures 1010, 1012 can be managed by the UAV air traffic control system 300 based on data collection by the UAVs 50 and/or other sources. The data structures 1010, 1012 can be stored in the database 820 along with the TTR parameter for temporary or permanent.

To populate and manage the data structures 1010, 1012, i.e., to identify, characterize, and verify, the UAV air traffic control system 300 communicates with the UAVs 50 and/or with external sources. For the UAVs 50, the UAVs 50 can be configured to detect the static obstructions 1002, 1004, 1006; collect relevant data such as locations, pictures, etc.

for populating the data structures 1010, 1012; collect the relevant data at the direction of the UAV air traffic control system 300; provide verification the static obstructions 1002, 1004, 1006 subsequent to the UAV air traffic control system 300 notifying the UAVs 50 for avoidance/verification; and the like.

In an aspect, the UAVs 50, upon detecting an unidentified static obstruction 1002, 1004, 1006, the UAVs 50 can collect the relevant data and forward to the UAV air traffic control system 300. The UAV air traffic control system 300 can then analyze the relevant data to populate the data structures 1010, 1012. If additional data is required to fully populate the data structures 1010, 1012, the UAV air traffic control system 300 can instruct another UAV 50 at or near the detected static obstruction 1002, 1004, 1006 to collect additional data. For example, assume a first UAV 50 detects the static obstruction 1002, 1004, 1006 from the east, collects the relevant data, but this is not enough for the UAV air traffic control system 300 to fully populate the data structures 1010, 1012, the UAV air traffic control system 300 can instruct a second UAV 50 to approach and collect data from the west.

The UAVs 50 with communication between the UAV air traffic control system 300 can perform real-time detection of the static obstructions 1002, 1004, 1006. Additionally, the UAV air traffic control system 300 can utilize external sources for offline detection of the static obstructions 1002, 1004, 1006. For example, the external sources can include map data, public record data, satellite imagery, and the like. The UAV air traffic control system 300 can parse and analyze this external data offline to both populate the data structures 1010, 1012 as well as very the integrity of existing data in the data structures 1010, 1012.

Once the data structures 1010, 1012 are populated in the database 820, the UAV air traffic control system 300 can use this data to coordinate flights with the UAVs 50. The UAV air traffic control system 300 can provide relevant no-fly zone data to UAVs 50 based on their location. The UAV air traffic control system 300 can also manage UAV landing zones based on this data, keeping emergency landing zones in different locations based on the static obstructions 1002, 1004, 1006; managing recharging locations in different locations based on the static obstructions 1002, 1004, 1006; and managing landing locations based on the static obstructions 1002, 1004, 1006.

Figure 22:
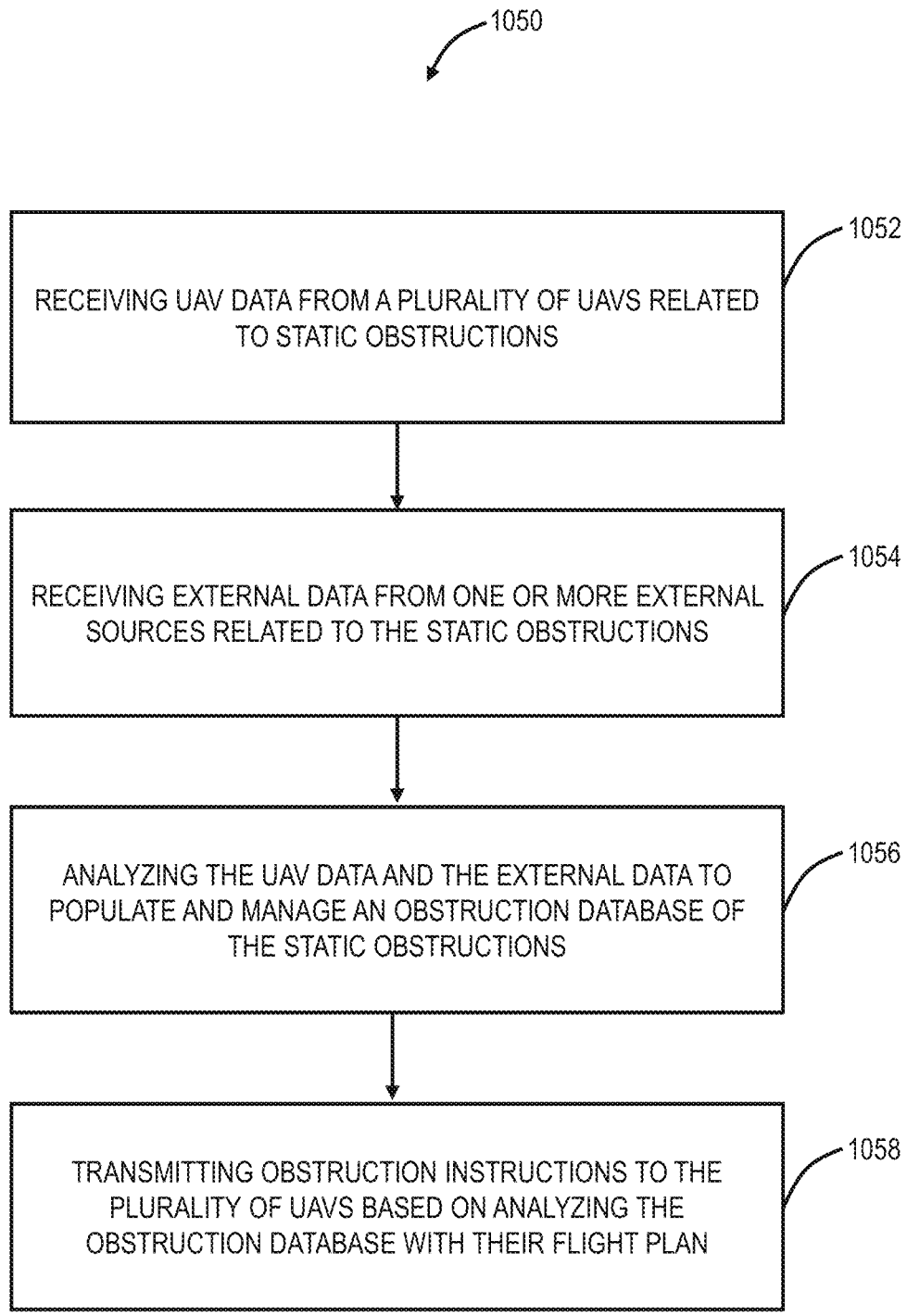
FIG. 22 is a flowchart of a static obstruction detection and management method through an Air Traffic Control (ATC) system for Unmanned Aerial Vehicles (UAVs)

FIG. 22 is a flowchart of a static obstruction detection and management method 1050 through an Air Traffic Control (ATC) system for Unmanned Aerial Vehicles (UAVs). The static obstruction detection and management method 1050 includes receiving UAV data from a plurality of UAVs related to static obstructions (step 1052); receiving external data from one or more external sources related to the static obstructions (step 1054); analyzing the UAV data and the external data to populate and manage an obstruction database of the static obstructions (step 1056); and transmitting obstruction instructions to the plurality of UAVs based on analyzing the obstruction database with their flight plan (step 1058).

The obstruction database can include a plurality of data structures each defining a no-fly zone of location coordinates based on the analyzing. The data structures define one of a cylinder and a rectangle sized to cover an associated obstruction and with associated location coordinates. The data structures each can include a time to remove parameter defining either a temporary or a permanent obstruction. One of the UAV data and the external data can be used first to detect an obstruction and enter the obstruction in the obstruction database, and the other of the UAV data and the external data is used to verify the obstruction in the obstruction database. The static obstruction detection and management method 1050 can further include transmitting instructions to one or more UAVs to obtain additional information to populate and manage the obstruction database. The static obstruction detection and management method 1050 can further include managing one or more of emergency landing locations, recharging locations, and landing locations for the plurality of UAVs based on the obstruction database. The plurality of UAVs fly under about 1000' and the obstructions are based thereon.

§ 14.0 UAV Configuration

Figure 23:
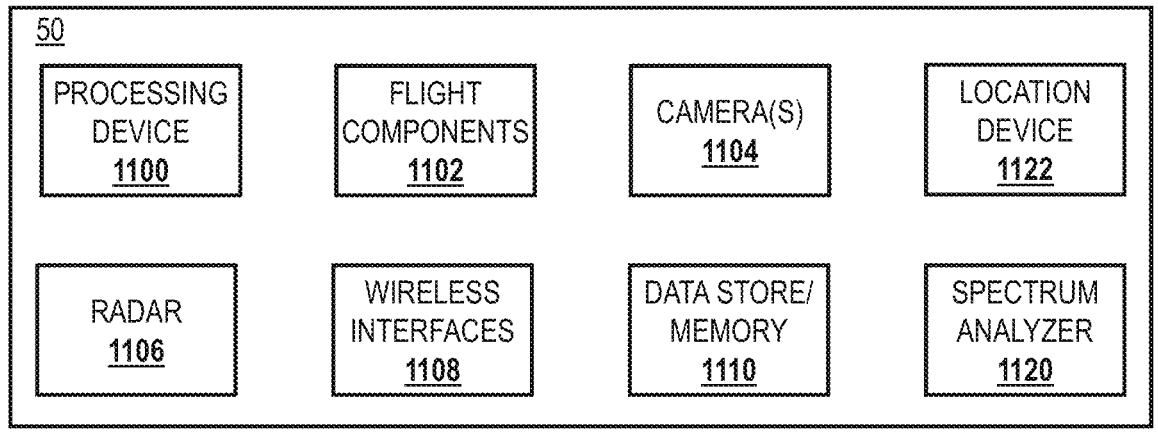
FIG. 23 is a block diagram of functional components implemented in physical components in the UAV for use with the air traffic control system, such as for dynamic and static obstruction detection.

FIG. 23 is a block diagram of functional components implemented in physical components in the UAV 50 for use with the air traffic control system 300, such as for dynamic and static obstruction detection. This embodiment in FIG. 23 can be used with any of the UAV 50 embodiments described herein. The UAV 50 can include a processing device 1100, flight components 1102, cameras 1104, radar 1106, wireless interfaces 1108, a data store/memory 1110, a spectrum analyzer 1120, and a location device 1122. These components can be integrated with, disposed on, associated with the body 52 of the UAV 50. The processing device 1100 can be similar to the mobile device 100 or the processor 102. Generally, the processing device 1100 can be configured to control operations of the flight components 1102, the cameras 1104, the radar 1106, the wireless interfaces 1108, and the data store/memory 1110.

The flight components 1102 can include the rotors 58 and the like. Generally, the flight components 1102 are configured to control the flight, i.e., speed, direction, altitude, heading, etc., of the UAV 50 responsive to control by the processing device 1100.

The cameras 1104 can be disposed on or about the body 82. The UAV 50 can include one or more cameras 1104, for example, facing different directions as well as supporting pan, tilt, zoom, etc. Generally, the cameras 1104 are configured to obtain images and video, including high definition. In an embodiment, the UAV 50 includes at least two cameras 1104 such as a front-facing and a rear-facing camera. The cameras 1104 are configured to provide the images or video to the processing device 1100 and/or the data store/memory 1110. The front-facing camera can be configured to detect obstructions in front of the UAV 50 as it flies and the rear-facing camera can be configured to obtain additional images for further characterization of the detected obstructions.

The radar 1106 can be configured to detect objects around the UAV 50 in addition to the cameras 1104, using standard radar techniques. The wireless interfaces 1108 can be similar to the wireless interfaces 106 with similar functionality. The data store/memory 1110 can be similar to the data store 108 and the memory 110. The wireless interfaces 1108 can be used to communicate with the air traffic control system 300 over one or more wireless networks as described herein.

Collectively, the components in the UAV 50 are configured to fly the UAV 50, and concurrent detect and identify obstructions during the flight. In an embodiment, the radar 1106 can detect an obstruction through the processing device 1100, the processing device 1100 can cause the cameras 1104 to obtain images or video, the processing device 1100 can cause adjustments to the flight plan accordingly, and the processing device 1100 can identify aspects of the obstruction from the images or video. In another embodiment, the camera 1104 can detect the obstruction, the processing device 1100 can cause adjustments to the flight plan accordingly, and the processing device 1100 can identify aspects of the obstruction from the images or video. In a further embodiment, the front-facing camera or the radar 1106 can detect the obstruction, the processing device 1100 can cause the rear-facing and/or the front-facing camera to obtain images or video, the processing device 1100 can cause adjustments to the flight plan accordingly, and the processing device 1100 can identify aspects of the obstruction from the images or video.

In all the embodiments, the wireless interfaces 1108 can be used to communicate information about the detected obstruction to the air traffic control system 300. This information can be based on the local processing by the processing device 1100, and the information can include, without limitation, size, location, shape, type, images, movement characteristics, etc.

For dynamic obstructions, the UAV 50 can determine movement characteristics such as from multiple images or video. The movement characteristics can include speed, direction, altitude, etc. and can be derived from analyzing the images of video over time. Based on these characteristics, the UAV 50 can locally determine how to avoid the detected dynamic obstructions.

Additionally, the air traffic control system 300 can keep track of all of the UAVs 50 under its control or management. Moving UAVs 50 are one example of dynamic obstructions. The air traffic control system 300 can notify the UAVs 50 of other UAVs 50 and the UAVs 50 can also communicate the detection of the UAVs 50 as well as other dynamic and static obstructions to the air traffic control system 300.

The spectrum analyzer 1120 is configured to measure wireless performance. The spectrum analyzer 1120 can be incorporated in the UAV 50, attached thereto, etc. The spectrum analyzer 1120 is communicatively coupled to the processing device 1100 and the location device 1122. The location device 1122 can be a Global Positioning Satellite (GPS) device or the like. Specifically, the location device 1122 is configured to determine a precise location of the UAV 50. The spectrum analyzer 1120 can be configured to detect signal bandwidth, frequency, and Radio Frequency (RF) strength. These can collectively be referred to as measurements, and they can be correlated to the location where taken from the location device 1122.

Figure 24:
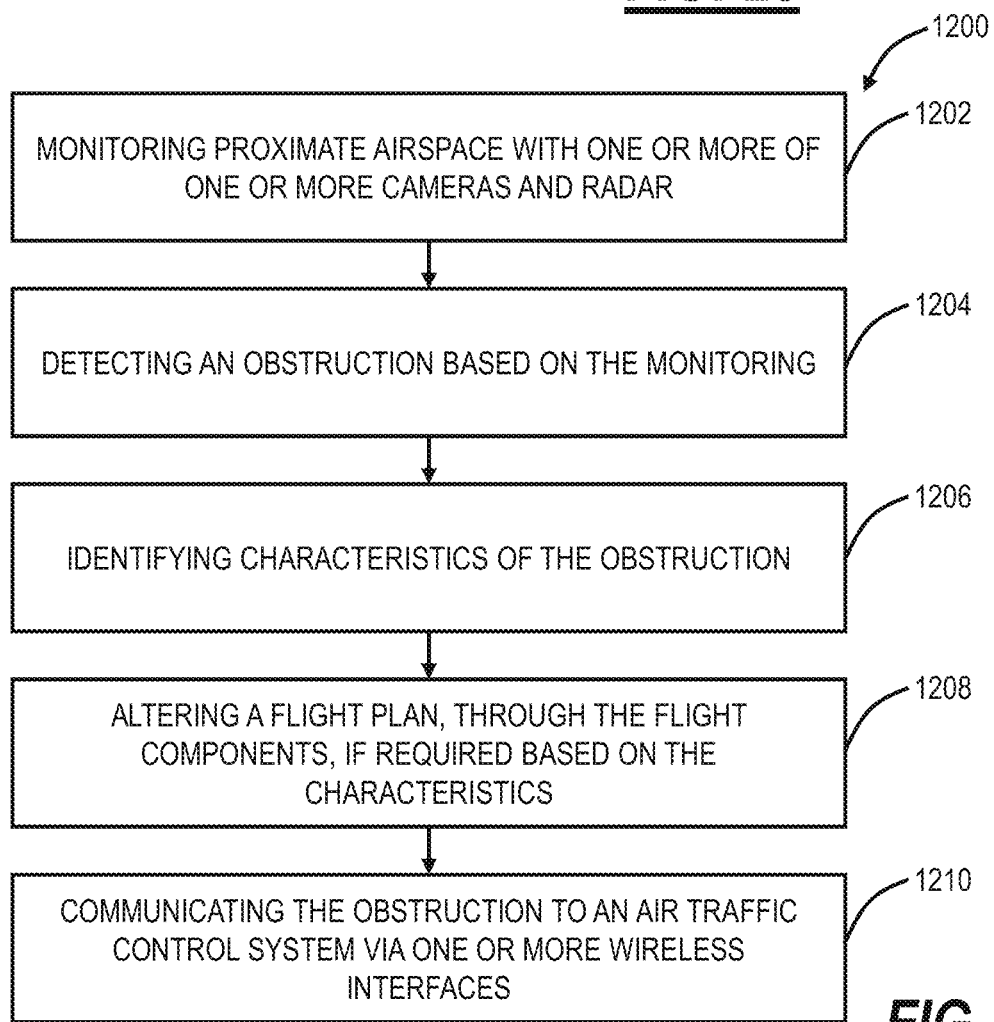
FIG. 24 is a flowchart of a UAV method for obstruction detection.

Referring to FIG. 24, in an embodiment, a flowchart illustrates a UAV method 1200 for obstruction detection. The UAV includes flight components attached or disposed to a base; one or more cameras; radar; one or more wireless interfaces; and a processing device communicatively coupled to the flight components, the one or more cameras, the radar, and the wireless interfaces. The UAV method 1200 includes monitoring proximate airspace with one or more of one or more cameras and radar (step 1202); detecting an obstruction based on the monitoring (step 1204); identifying characteristics of the obstruction (step 1206); altering a flight plan, through the flight components, if required based on the characteristics (step 1208); and communicating the obstruction to an air traffic control system via one or more wireless interfaces (step 1210).

The detecting can be via the radar and the method 1200 can further include causing the one or more cameras to obtain images or video of the detected obstruction at a location based on the radar; and analyzing the images or video to identify the characteristics. The detecting can be via the one or more cameras and the method 1200 can further include analyzing images or video from the one or more cameras to identify the characteristics. The one or more cameras can include a front-facing camera and a rear-facing camera and the method 1200 can further include causing one or more of the front-facing camera and the rear-facing camera to obtain additional images or video; and analyzing the images or video to identify the characteristics. The obstructions can include dynamic obstructions, and the characteristics comprise size, shape, speed, direction, altitude, and heading. The characteristics can be determined based on analyzing multiple images or video over time. The UAV method 1200 can further include receiving notifications from the air traffic control system related to previously detected obstructions; and updating the air traffic control system based on the detection of the previously detected obstructions. The characteristics are for an obstruction database maintained by the air traffic control system.

§ 15.0 Waypoint Directory

In an embodiment, the UAV air traffic control system 300 uses a plurality of waypoints to manage air traffic in a geographic region. Again, waypoints are sets of coordinates that identify a point in physical space. The waypoints can include longitude and latitude as well as an altitude. For example, the waypoints can be defined over some area, for example, a square, rectangle, hexagon, or some other geometric shape, covering some amount of area. It is not practical to define a waypoint as a physical point as this would lead to an infinite number of waypoints for management by the UAV air traffic control system 300. Instead, the waypoints can cover a set area, such as every foot to hundred feet or some other distance. In an embodiment, the waypoints can be set between 1' to 50' in dense urban regions, between 1' to 100' in metropolitan or suburban regions, and between 1' to 1000' in rural regions. Setting such sized waypoints provides a manageable approach in the UAV air traffic control system 300 and for communication over the wireless networks with the UAVs 50. The waypoints can also include an altitude. However, since UAV 50 flight is generally constrained to several hundred feet, the waypoints can either altitude or segment the altitude in a similar manner as the area. For example, the altitude can be separated in 100' increments, etc. Accordingly, the defined waypoints can blanket an entire geographic region for management by the UAV air traffic control system 300.

The waypoints can be detected by the UAVs 50 using location identification components such as GPS. A typical GPS receiver can locate a waypoint with an accuracy of three meters or better when used with land-based assisting technologies such as the Wide Area Augmentation System (WAAS). Waypoints are managed by the UAV air traffic control system 300 and communicated to the UAVs 50, and used for a variety of purposes described herein. In an embodiment, the waypoints can be used to define a flight path for the UAVs 50 by defining a start and end waypoint as well as defining a plurality of intermediate waypoints.

The waypoints for a given geographic region (e.g., a city, region, state, etc.) can be managed in a waypoint directory which is stored and managed in the DB 820. The DB 820 can include the waypoint directory and actively manage a status of each waypoint. For example, the status can be either obstructed, clear, or unknown. With these classifications, the UAV air traffic control system 300 can actively manage UAV 50 flight paths. The UAVs 50 can also check and continually update the DB 820 through communication with the UAV air traffic control system 300. The use of the waypoints provides an efficient mechanism to define flight paths.

§ 15.1 Use of Waypoints

The UAV air traffic control system 300 and the UAVs 50 can use the waypoints for various purposes including i) flight path definition, ii) start and end point definition, iii) tracking of UAVs 50 in flight, iv) measuring the reliability and accuracy of information from particular UAVs 50, v) visualizations of UAV 50 flight, and the like. For flight path definition, the waypoints can be a collection of points defining how a particular UAV 50 should fly. In an embodiment, the flight path can be defined with waypoints across the entire flight path. In another embodiment, the flight path can be defined by various marker waypoints allowing the particular UAV 50 the opportunity to determine flight paths between the marker waypoints locally. In a further embodiment, the flight path is defined solely by the start and end waypoints, and the UAV 50 locally determines the flight path based thereon.

In these embodiments, the intermediate waypoints are still monitored and used to manage the UAV 50 in flight. In an embodiment, the UAV 50 can provide updates to the UAV air traffic control system 300 based on obstruction detection as described herein. These updates can be used to update the status of the waypoint directory in the DB 820. The UAV air traffic control system 300 can use the waypoints as a mechanism to track the UAVs 50. This can include waypoint rules such as no UAV 50 can be in a certain proximity to another UAV 50 based on the waypoints, speed, and direction. This can include proactive notifications based on the current waypoint, speed, and direction, and the like.

In an embodiment, the waypoints can be used for measuring the reliability and accuracy of information from particular UAVs 50. Again, the waypoints provide a mechanism to define the geography. The UAV air traffic control system 300 is configured to receive updates from UAVs 50 about the waypoints. The UAV air traffic control system 300 can determine the reliability and accuracy of the updates based on crowd-sourcing the updates. Specifically, the UAV air traffic control system 300 can receive an update which either confirms the current status or changes the current status. For example, assume a waypoint is currently clear, and an update is provided which says the waypoint is clear, then this UAV 50 providing the update is likely accurate. Conversely, assume a waypoint is currently clear, and an update is provided which says the waypoint is now obstructed, but a short time later, another update from another UAV 50 says the waypoint is clear, this may reflect inaccurate information. Based on comparisons between UAVs 50 and their associated waypoint updates, scoring can occur for the UAVs 50 to determine reliability and accuracy. This is useful for the UAV air traffic control system 300 to implement status update changes—preference may be given to UAVs 50 with higher scoring.

The waypoints can also be used for visualization in the UAV air traffic control system 300. Specifically, waypoints on mapping programs provide a convenient mechanism to show location, start and end points, etc. The waypoints can be used to provide operators and pilots visual information related to one or more UAVs 50.

Figure 25:
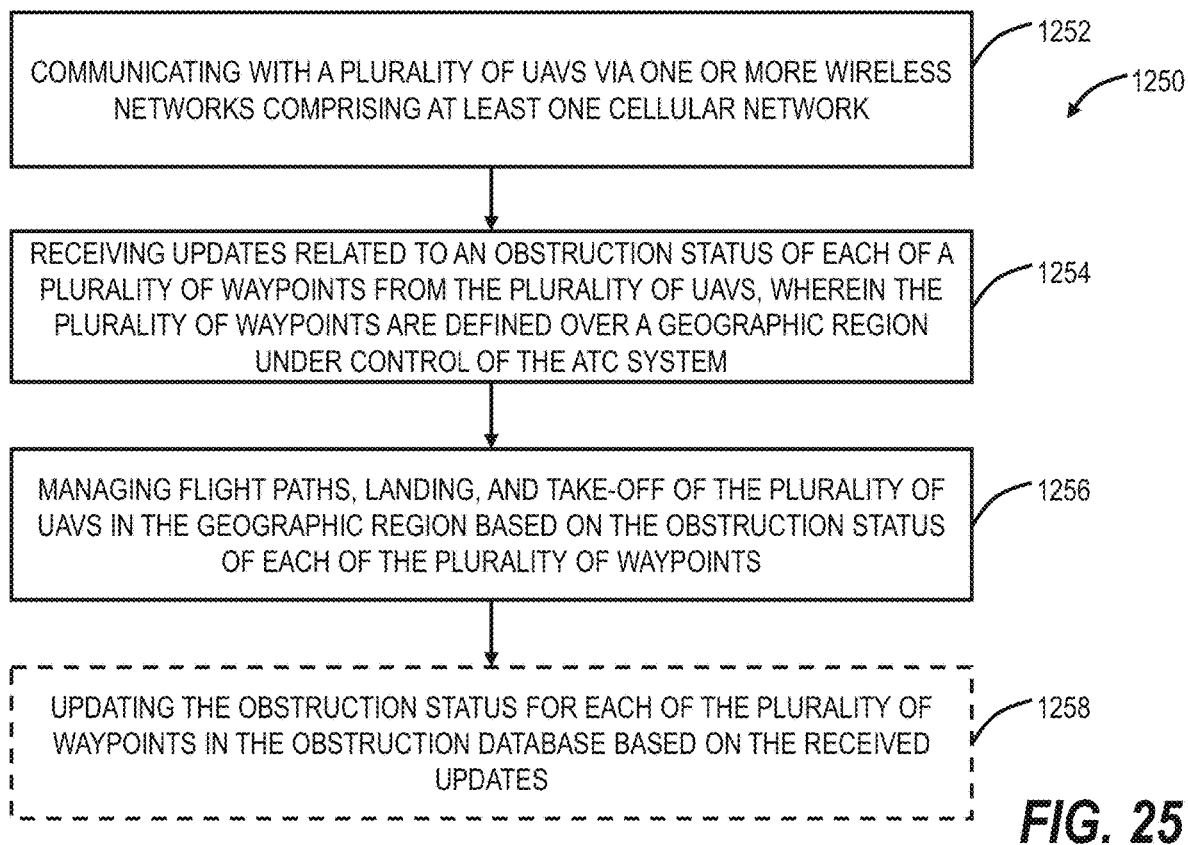
FIG. 25 is a flowchart of a waypoint management method for an Air Traffic Control (ATC) system for Unmanned Aerial Vehicles (UAVs)

FIG. 25 is a flowchart of a waypoint management method 1250 for an Air Traffic Control (ATC) system for Unmanned Aerial Vehicles (UAVs). The waypoint management method 1250 includes communicating with a plurality of UAVs via one or more wireless networks comprising at least one cellular network (step 1252); receiving updates related to an obstruction status of each of a plurality of waypoints from the plurality of UAVs, wherein the plurality of waypoints are defined over a geographic region under control of the ATC system (step 1254); and managing flight paths, landing, and take-off of the plurality of UAVs in the geographic region based on the obstruction status of each of the plurality of waypoints (step 1256). The plurality of waypoints each includes a latitude and longitude coordinate defining a point about which an area is defined for covering a portion of the geographic region. A size of the area can be based on whether the area covers an urban region, a suburban region, and a rural region in the geographic area, wherein the size is smaller for the urban region than for the suburban region and the rural region, and wherein the size is smaller for the suburban region than for the rural region. Each of the plurality of waypoints can include an altitude range set based on flight altitudes of the plurality of UAVs.

The ATC system can include an obstruction database comprising a data structure for each of the plurality of waypoints defining a unique identifier of a location and the obstruction status, and wherein the obstruction status comprises one of clear, obstructed, and unknown. The waypoint management method 1250 can further include updating the obstruction status for each of the plurality of waypoints in the obstruction database based on the received updates (step 1258). The waypoint management method 1250 can further include defining the flight paths based on specifying two or more waypoints of the plurality of waypoints. A flight path can be defined by one of specifying a start waypoint and an end waypoint and allowing a UAV to determine a path therebetween locally; and specifying a start waypoint and an end waypoint and a plurality of intermediate waypoints between the start waypoint and the end waypoint. The waypoint management method 1250 can further include scoring each UAV's updates for the plurality of waypoints to determine reliability and accuracy of the updates.

In another embodiment, an Air Traffic Control (ATC) system for Unmanned Aerial Vehicles (UAVs) using waypoint management includes a network interface and one or more processors communicatively coupled to one another, wherein the network interface is communicatively coupled to a plurality of UAVs via one or more wireless networks; and memory storing instructions that, when executed, cause the one or more processors to communicate with a plurality of UAVs via one or more wireless networks comprising at least one cellular network; receive updates related to an obstruction status of each of a plurality of waypoints from the plurality of UAVs, wherein the plurality of waypoints are defined over a geographic region under control of the ATC system; and manage flight paths, landing, and take-off of the plurality of UAVs in the geographic region based on the obstruction status of each of the plurality of waypoints.

In a further embodiment, a non-transitory computer-readable medium comprising instructions that, when executed, cause one or more processors to perform steps of communicating with a plurality of UAVs via one or more wireless networks comprising at least one cellular network; receiving updates related to an obstruction status of each of a plurality of waypoints from the plurality of UAVs, wherein the plurality of waypoints are defined over a geographic region under control of the ATC system; and managing flight paths, landing, and take-off of the plurality of UAVs in the geographic region based on the obstruction status of each of the plurality of waypoints.

§ 16.0 Network Switchover and Emergency Instructions

Figure 26:
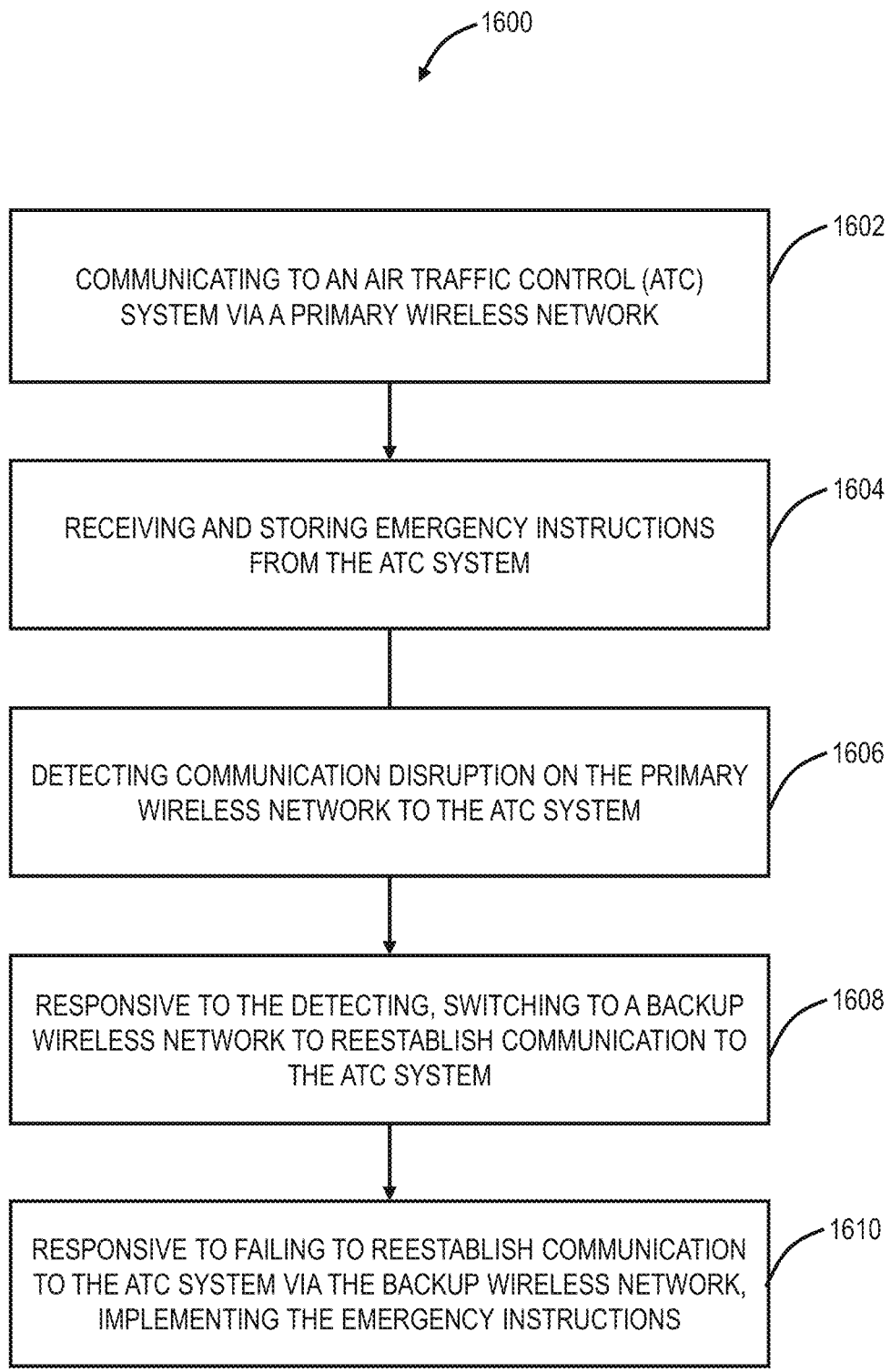
FIG. 26 is a flowchart of a UAV network switchover and emergency procedure method.

FIG. 26 is a flowchart of a UAV network switchover and emergency procedure method 1600. The method 1600 can be implemented by the UAV 50 in conjunction with the ATC system 300 and the wireless networks 302, 304. The method 1600 includes communicating to an Air Traffic Control (ATC) system via a primary wireless network (step 1602); receiving and storing emergency instructions from the ATC system (step 1604); detecting communication disruption on the primary wireless network to the ATC system (step 1606); responsive to the detecting, switching to a backup wireless network to reestablish communication to the ATC system (step 1608); and, responsive to failing to reestablish communication to the ATC system via the backup wireless network, implementing the emergency instructions (step 1610).

Thus, the method 1600 enables the UAV 50 to maintain connectivity to the ATC system 300 during an outage, catastrophe, etc. The ATC system 300 is configured to provide the emergency instructions from the ATC system 300 for use in case of a network disturbance or outage. The UAV 50 is configured to store the emergency instructions. The emergency instructions can include an altitude to maintain and a flight plan to maintain until communication is reestablished, nearby landing zones to proceed to, continuing to a destination as planned, immediate landing at one of a plurality of designated locations, flying lane information, hover in place, hover in place for a certain amount of time to regain communication, hover in place until a battery level is reached and then land or proceed to another location, and the like. Of note, the ATC system 300 can periodically update the emergency instructions. Further, the ATC system 300 can provide multiple different emergency instructions for a local decision by the UAV 50. The objective of the method 1600 is to ensure the UAV 50 operates with communication to the ATC system 300 and in the absence of communication to implement the emergency instructions.

The method 1600 can further include, during the emergency instructions, reestablishing communication to the ATC system via one of the primary wireless network and the backup wireless network; and receiving instructions from the ATC system. The primary wireless network can include a first wireless provider network and the backup wireless network can include a second wireless provider network. The first wireless provider network and the second wireless provider network can include a cellular network, such as LTE. The UAV 50 can include a wireless interface configured to communicate to each of the first wireless provider network and the second wireless provider network. The communicating to the ATC system can include providing flight information to the ATC system; and receiving instructions and updates from the ATC system for real-time control. The flight information can include weather and obstacle reporting, speed, altitude, location, and direction, and the instructions and updates can relate to separation assurance, traffic management, landing, and flight plan.

In another embodiment, the UAV 50 is configured for network switchover to communicate with an Air Traffic Control (ATC) system. The UAV 50 includes one or more rotors disposed to a body and configured for flight; wireless interfaces including hardware and antennas adapted to communicate with a primary wireless network and a backup wireless network of a plurality of wireless networks; a processor coupled to the wireless interfaces and the one or more rotors; and memory storing instructions that, when executed, cause the processor to: communicate to ATC system via the primary wireless network; receive and store emergency instructions from the ATC system; detect communication disruption on the primary wireless network to the ATC system; responsive to detection of the communication disruption, switch to the backup wireless network to reestablish communication to the ATC system; and, responsive to failure to reestablish communication to the ATC system via the backup wireless network, implement the emergency instructions.

§ 17.0 Elevator or Tube Lift

FIGS. 27-30 are diagrams of a lift tube 1700 for drone takeoff. FIG. 27 is a diagram of the lift tube 1700 and a staging location 1702 and FIG. 28 is a diagram of the lift tube 1700 in a location 1704 such as a factory, warehouse, distribution center, etc. FIG. 29 is a diagram of a pneumatic lift tube 1700A and FIG. 30 is a diagram of an elevator lift tube 1700B. The present disclosure includes systems for the lift tube 1700 and methods for the use of the lift tube 1700 in conjunction with the UAV air traffic control system 300.

The lift tube 1700 is utilized for the UAVs 50 to take off from within the location 1704. Specifically, the lift tube 1700 is located in the location 1704, such as a factory, warehouse, distribution center, etc., such that the UAVs 50 can be launched from a floor or interior point in the location 1704. The lift tube 1700 provides an efficient flow and use of the UAV 50 in existing facilities, i.e., incorporating UAV 50 takeoff from within the facility as opposed to adding extra steps or moving the UAVs 50 outside or up to a roof. That is, the UAVs 50 can be loaded with products or delivery items and then take off via the lift tube 1700 to an elevated position or rooftop without an individual carrying the UAV to the roof or outside.

The lift tube 1700 is a physical conduit or the like which extends from a lower portion of the location 1704 to outside the location 1704, such as on the roof. For example, the lift tube 1700 can be cylindrical or square and extend in vertical direction. The size of the lift tube 1700 is such that it supports the UAV 50 in an upward direction along with any cargo carried by the UAV 50. Of note, the lift tube 1700 could support multiple UAVs 50 simultaneously at different elevations.

In an embodiment, the lift tube 1700 can be the pneumatic lift tube 1700A which includes compressed air 1720 to cause the UAVs 50 to move upwards from an ingress of the pneumatic lift tube 1700A to an egress outside. For example, the UAVs 50 can be loaded in a closed cylinder which is moved in the pneumatic lift tube 1700A. Alternatively, the UAVs 50 can fly themselves in the pneumatic lift tube 1700A with the compressed air 1720 providing assistance.

In another embodiment, the lift tube 1700 can be the elevator lift tube 1700B which includes an elevator including a lift 1730 and multiple supports 1732. Each UAV 50 can be placed on one of the supports 1732 and the lift 1730 can move to raise the support 1732.

In operation, the staging location 1702 can be a conveyor belt or the like. For example, personnel can place the UAVs 50 and associated cargo on the staging location 1702, similar to an aircraft in line for taxi at the runway. The staging location 1702 can provide the UAVs 50 to the lift tube 1700 for launch thereof. Again, the lift tube 1700 can be the pneumatic lift tube 1700A, the elevator lift tube 1700B, or the like that raises the UAVs 50 that have been loaded with products or delivery items. This essentially creates a launching pad from an elevated position or rooftop without forcing employees to have to go onto the roof.

Further, the operation of the lift tube 1700 can be controlled by the UAV air traffic control system 300 which in addition to performing the various functions described herein can further include logistics management to coordinate the UAVs 50 in the location 1704.

In an embodiment, a method of using a lift tube with an Unmanned Aerial Vehicle (UAV) air traffic control system includes staging one or more UAVs and associated cargo for takeoff; moving the staged one or more UAVs to a lift tube; and controlling the lift tube by the UAV air traffic control system to provide the one or more UAVs for takeoff, wherein the lift tube is a vertical structure disposed in a facility to raise the one or more UAVs from an interior position in the facility for takeoff outside of the facility. The lift tube can include an elevator lift tube with a lift and a plurality of supports disposed thereto, each of the supports comprising a vertical structure supporting a UAV with associated cargo, and the lift is configured to raise the plurality of supports along the elevator lift tube. The lift tube can include a pneumatic lift tube with compressed air therein causing a vacuum extending upwards in the vertical structure for lifting the one or more UAVs. The facility can include one of a factory, a warehouse, and a distribution center. The UAV air traffic control system 300 can be configured to provide logistics management to coordinate the staging, the moving, and the takeoff of the one or more UAVs via the controlled lift tube. The lift tube 1700 can be communicative coupled to a controller which has a wireless network connection to the UAV air traffic control system 300 for control thereof.

In another embodiment, a lift tube system controlled in part by an Unmanned Aerial Vehicle (UAV) air traffic control system includes a staging location for one or more UAVs and associated cargo for takeoff; a lift tube comprising a vertical structure disposed in a facility to raise the one or more UAVs from an interior position in the facility for takeoff outside of the facility; and a controller configured to cause movement of the staged one or more UAVs to the lift tube; and control the lift tube with the UAV air traffic control system to provide the one or more UAVs for takeoff. The lift tube can include an elevator lift tube with a lift and a plurality of supports disposed thereto, each of the supports comprising a vertical structure supporting a UAV with associated cargo, and the lift is configured to raise the plurality of supports along the elevator lift tube. The lift tube can include a pneumatic lift tube with compressed air therein causing a vacuum extending upwards in the vertical structure for lifting the one or more UAVs. The facility can include one of a factory, a warehouse, and a distribution center. The UAV air traffic control system can be configured to provide logistics management to coordinate the staging, the moving, and the takeoff of the one or more UAVs via the controlled lift tube. The lift tube can be communicatively coupled to a controller which has a wireless network connection to the UAV air traffic control system for control thereof.

In a further embodiment, an Unmanned Aerial Vehicle (UAV) air traffic control system configured to control a lift tube system includes a network interface communicatively coupled to the lift tube system; a processor communicatively coupled to the network interface; and memory storing instructions that, when executed, cause the processor to, responsive to staging one or more UAVs and associated cargo for takeoff, cause movement of the staged one or more UAVs to a lift tube; and control the lift tube by the UAV air traffic control system to provide the one or more UAVs for takeoff, wherein the lift tube is a vertical structure disposed in a facility to raise the one or more UAVs from an interior position in the facility for takeoff outside of the facility. The lift tube can include an elevator lift tube with a lift and a plurality of supports disposed thereto, each of the supports comprising a vertical structure supporting a UAV with associated cargo, and the lift is configured to raise the plurality of supports along the elevator lift tube. The lift tube can include a pneumatic lift tube with compressed air therein causing a vacuum extending upwards in the vertical structure for lifting the one or more UAVs. The facility can include one of a factory, a warehouse, and a distribution center. The UAV air traffic control system can be configured to provide logistics management to coordinate the staging, the moving, and the takeoff of the one or more UAVs via the controlled lift tube. The lift tube can be communicatively coupled to a controller which has a wireless network connection to the UAV air traffic control system for control thereof.

There can be one or more lift tubes 1700 in the location 1704. In an embodiment, the lift tube 1700 can be used solely for cargo, i.e., to lift the cargo up to a roof and then the cargo is attached to the UAV 50. Here, the cargo can be connected to the UAV 50 on the roof and the UAV 50 can then take off. Here, there can be a takeoff point 1750 where UAVs 50 are staged and the cargo is added from the lift tube 1700. The lift tube 1700 can be either the pneumatic lift tube 1700A, the elevator lift tube 1700B, or the like, and the cargo can be lifted on the supports 1732 or in a capsule which slides in the pneumatic lift tube 1700A. The air traffic control system 300 can control the takeoff of the various UAVs 50 at the takeoff point 1750.

§ 18.0 Modified Inevitable Collision State (ICS)

Figure 31:
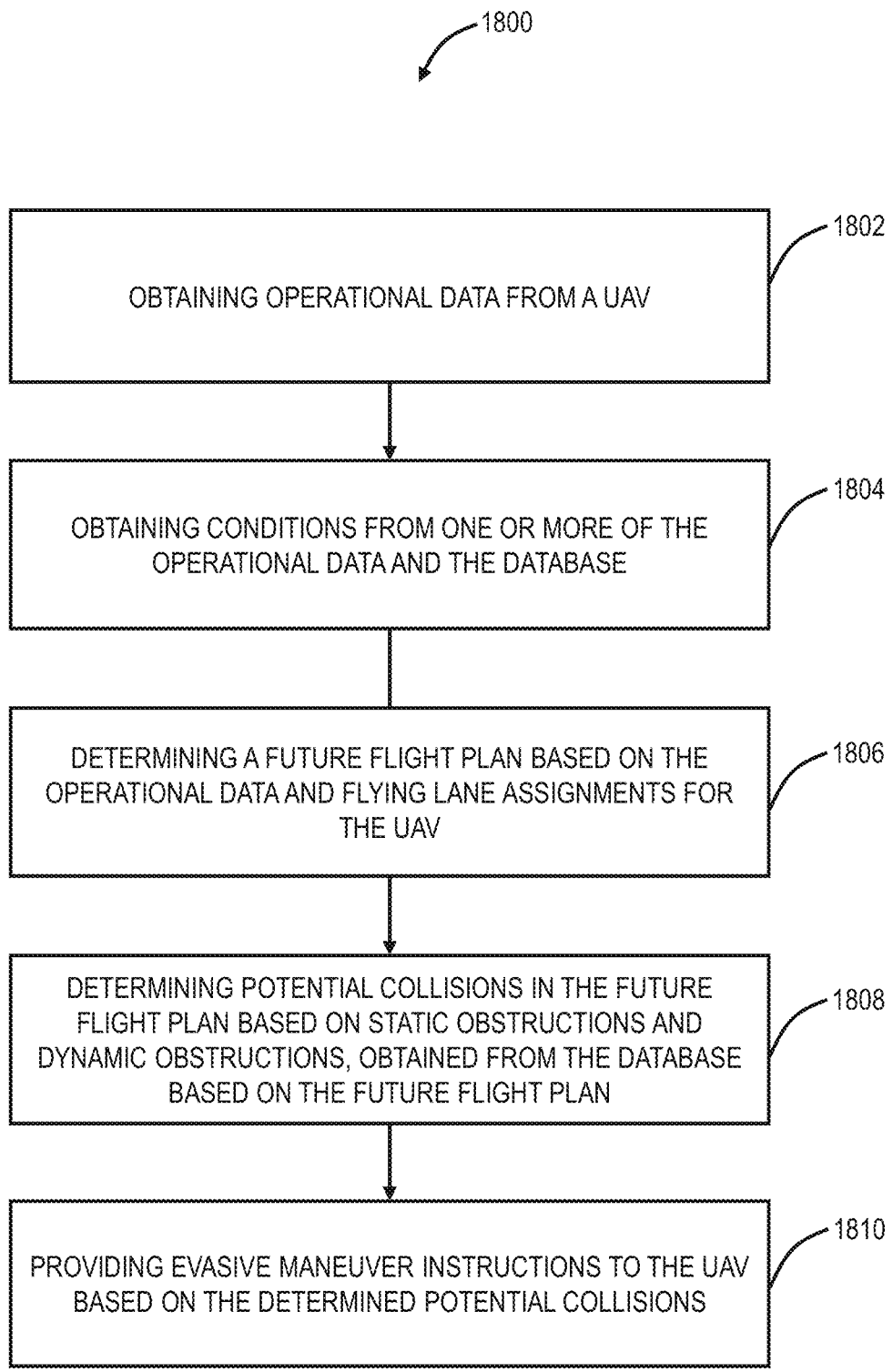
FIG. 31 is a flowchart of a modified inevitable collision state method for collision avoidance of drones.

FIG. 31 is a flowchart of a modified inevitable collision state method 1800 for collision avoidance of drones. The method 1800 is implemented through the UAV air traffic control system 300 described herein. The method 1800 can be performed in one or more servers each including a network interface, a processor, and memory; and a database communicatively coupled to the one or more servers, wherein the network interface in each of the one or more servers is communicatively coupled to one or more Unmanned Aerial Vehicles (UAVs) via a plurality of wireless networks at least one of which includes a cellular network.

The method 1800 includes obtaining operational data from a UAV (step 1802), obtaining conditions from one or more of the operational data and the database (step 1804), determining a future flight plan based on the operational data and a flying lane assignment for the UAV (step 1806), determining potential collisions in the future flight plan based on static obstructions and dynamic obstructions, obtained from the database based on the future flight plan (step 1808), and providing evasive maneuver instructions to the UAV based on the determined potential collisions (step 1810).

The objective of the method 1800 is up to 100% collision avoidance by modeling potential collisions based on algorithms taking into account drone size; drone speed, direction and wind load; and wind speed and direction. The operational data can include speed, direction, altitude, heading, and location of the UAV, and wherein the future flight plan can be determined based on a size of the UAV and the UAV speed, direction, and wind load.

The method 1800 can further include providing the flying lane assignment to the UAV, wherein the flying lane assignment is selected from a plurality of flying lane assignments to maximize collision-free trajectories based on the static obstructions. The method 1800 can further include managing ground hold time for a plurality of UAVs to manage airspace, i.e., minimize ground hold time for drones, safely maximize drone flight time for all airspace users. The evasive maneuver instructions utilize six degrees of freedom in movement of the UAV. The method 1800 can further include storing the future flight plan in the database along with future flight plans for a plurality of UAVs, for a determination of the dynamic obstructions.

The method 1800 can include algorithms to predict finally resting locations for falling drones from various altitudes and under a variety of conditions (velocity, wind speed, drone size/wind load, etc.). Advantageously, the method 1800 can move all drone traffic safely through U.S. airspace—recognizing it is a dynamic environment. This may encourage the use of flying lanes that are located away from or above potential consumer drone traffic. The method 1800 can also minimize and attempt to eliminate all unauthorized drone flights.

In another embodiment, an ATC system 300 includes one or more servers each including a network interface, a processor, and memory; and a database communicatively coupled to the one or more servers, wherein the network interface in each of the one or more servers is communicatively coupled to one or more Unmanned Aerial Vehicles (UAVs) via a plurality of wireless networks at least one of which includes a cellular network; wherein the one or more servers are configured to obtain operational data from a UAV, obtain conditions from one or more of the operational data and the database, determine a future flight plan based on the operational data and a flying lane assignment for the UAV, determine potential collisions in the future flight plan based on static obstructions and dynamic obstructions, obtained from the database based on the future flight plan, and provide evasive maneuver instructions to the UAV based on the determined potential collisions.

In a further embodiment, an Unmanned Aerial Vehicle (UAV) includes one or more rotors disposed to a body and configured for flight; wireless interfaces including hardware and antennas adapted to communicate with a plurality of wireless networks at least one of which includes a cellular network; a processor coupled to the wireless interfaces and the one or more rotors; and memory storing instructions that, when executed, cause the processor to monitor operational data during the flight, provide the operational data to an air traffic control system via the wireless networks, wherein the air traffic control system obtains conditions from one or more of the operational data and a database, determines a future flight plan based on the operational data and a flying lane assignment for the UAV, and determines potential collisions in the future flight plan based on static obstructions and dynamic obstructions, obtained from the database based on the future flight plan, and receive evasive maneuver instructions from the air traffic control system based on the determined potential collisions.

§ 19.0 Flying Lane Management with Lateral Separation

Figure 32:
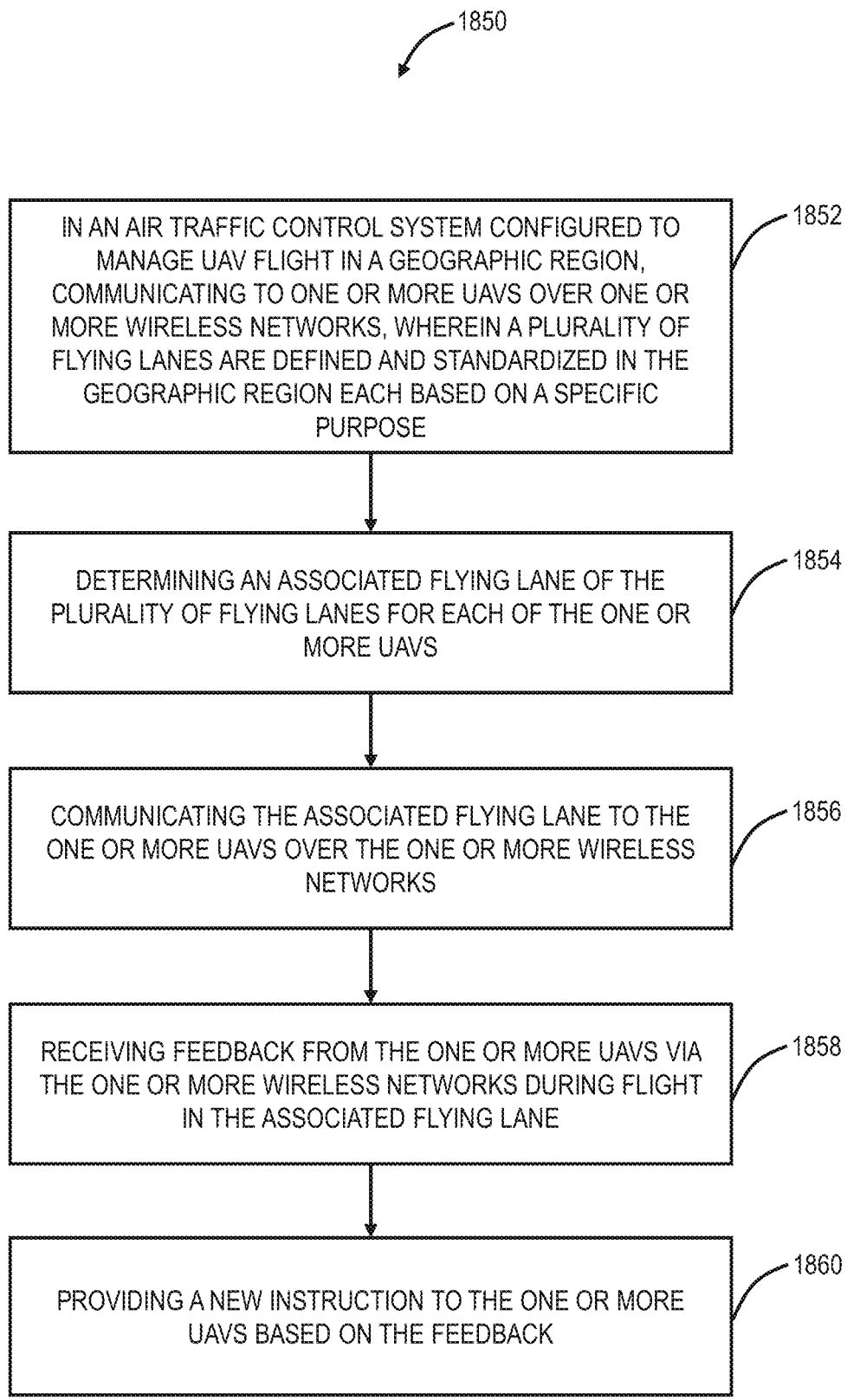
FIG. 32 is a flowchart of a flying lane management method.

FIG. 32 is a flowchart of a flying lane management method 1850. Again, the flying lane management method 1850 relates to lateral separations between drones (UAV's) operating in the same flying lane or at the same altitude and in the same proximity or geography. The distance between UAVs 50 is standardized and set based on the purpose of the particular flying lane 700 by the ATC system 300. For example, the flying lane 700 is an entry and exit lane allowing for UAVs 50 taking off to enter the ATC system 300, an intermediate flying lane that allows for some speed but also puts UAVs 50 in a position to move into an entry/exit lane, a high-speed lane (express) at a higher altitude allowing for UAVs 50 to quickly reach their destination, and the like.

In an embodiment, standard distances between UAVs 50 may be closer in lower altitude/entry and exit lanes where UAV 50 speeds may be lower than higher altitude lanes. Standard distances between UAVs 50 may be further in high altitude lanes due to increased speed of the UAVs 50 and allow for more time for speed and course corrections and to avoid collisions.

The distance between UAVs 50 can be changed at any time and new instructions sent to UAVs 50, from the ATC system 300 via the wireless networks 302, 304, to require speed changes or to hold position. The new instructions can be based on changes in weather and more specifically storms and rain, changes in wind speed and dealing with imprecise wind speed forecasts that impact drone speed and fuel usage (battery, gas), obstructions entering or expected to enter the flying lane(s) 700, a UAV 50 experiencing a problem such as limited battery power or fuel left, temporary flight restrictions that may include restricted airspace, and the like.

The lateral separation accounts for UAVs 50 entering and leaving flying lanes 700 to account for the required takeoff, landing, and possible hovering or delivery of products by UAVs 50 that must exit flying lanes to achieve their objectives. All communications to and from UAVs 50 occur over the wireless networks 302, 304 to and from the ATC system 300 and/or backup Air Traffic Control centers. The airspeed for UAVs 50 can be measured and/or authorized in knots and/or miles per hour (mph) within and outside of the flying lanes 700 to achieve appropriate lateral separations within the flying lanes. The objective of these procedures is to ensure safe and efficient drone flights in the United States airspace.

The flying lane management method 1850 includes, in an air traffic control system configured to manage UAV flight in a geographic region, communicating to one or more UAVs over one or more wireless networks, wherein a plurality of flying lanes are defined and standardized in the geographic region each based on a specific purpose (step 1852); determining an associated flying lane of the plurality of flying lanes for each of the one or more UAVs (step 1854); communicating the associated flying lane to the one or more UAVs over the one or more wireless networks (step 1856); receiving feedback from the one or more UAVs via the one or more wireless networks during flight in the associated flying lane (step 1858); and providing a new instruction to the one or more UAVs based on the feedback (step 1860).

The plurality of flying lanes can include lanes for entry and exit allowing the one or more UAVs to take off or land, lanes for the intermediate flight which are positioned adjacent to the lanes for entry and exit, and lanes for high speed at a higher altitude than the lanes for intermediate flight. Distances between UAVs can be set closer in the lanes for entry and exit than in the lanes for intermediate flight than in the lanes for high speed. The new instruction can be based on a change in weather comprising storms or rain. The new instruction can be based on a change in wind speed and based on wind speed forecasts and associated impact on the one or more UAVs and their fuel usage. The new instruction can be based on obstructions entering or expected to enter the flying lane.

In another embodiment, an air traffic control system includes one or more servers each comprising a network interface, a processor, and memory; and a database communicatively coupled to the one or more servers, wherein the network interface in each of the one or more servers is communicatively coupled to one or more Unmanned Aerial Vehicles (UAVs) via a plurality of wireless networks at least one of which comprises a cellular network, wherein a plurality of flying lanes are defined and standardized in the geographic region each based on a specific purpose, and wherein the one or more servers are configured to communicate to the one or more UAVs over the one or more wireless networks; determine an associated flying lane of the plurality of flying lanes for each of the one or more UAVs; communicate the associated flying lane to the one or more UAVs over the one or more wireless networks; receive feedback from the one or more UAVs via the one or more wireless networks during flight in the associated flying lane; and provide a new instruction to the one or more UAVs based on the feedback.

In a further embodiment, an Unmanned Aerial Vehicle (UAV) includes one or more rotors disposed to a body and configured for flight; wireless interfaces including hardware and antennas adapted to communicate with one or more wireless networks at least one of which includes a cellular network; a processor coupled to the wireless interfaces and the one or more rotors; and memory storing instructions that, when executed, cause the processor to communicate over the one or more wireless networks with an air traffic control system configured to manage UAV flight in a geographic region, wherein a plurality of flying lanes are defined and standardized in the geographic region each based on a specific purpose; receive an associated flying lane of the plurality of flying lanes from the air traffic control system over the one or more wireless networks; provide feedback to the air traffic control system via the one or more wireless networks during flight in the associated flying lane; receive a new instruction from the air traffic control system based on the feedback; and implement the new instruction.

§ 20.0 Drone Service for Package Pickup and Delivery

Figure 33:
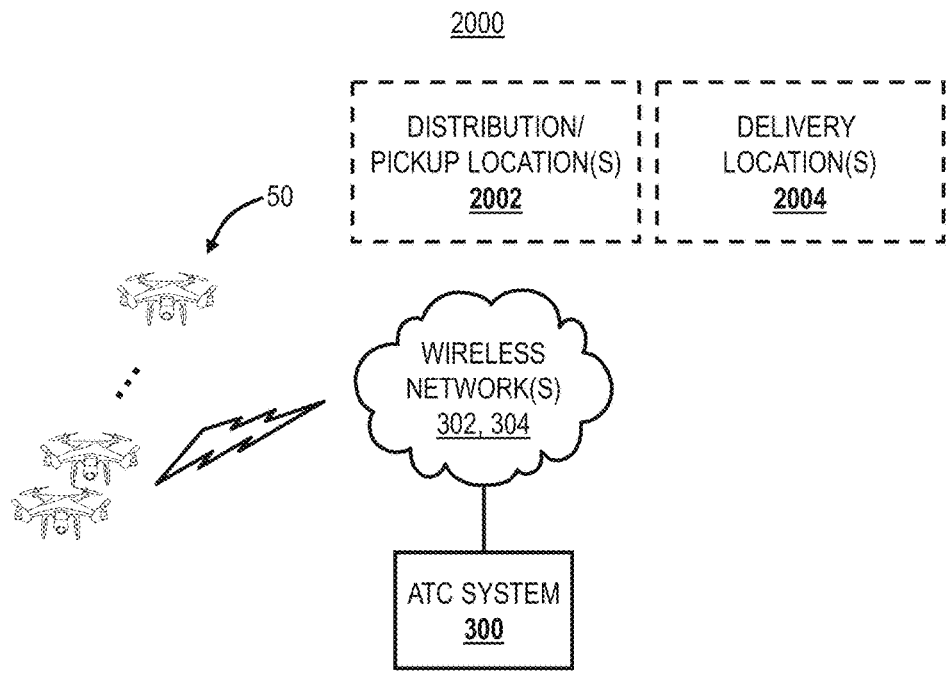
FIG. 33 is a diagram of a drone delivery system using the ATC system.

FIG. 33 is a diagram of a drone delivery system 2000 using the ATC system 300. Again, the UAVs 50 can be used to pick up and deliver goods such as, for example, groceries, packages, mail, takeout, etc. The drone delivery system 2000 contemplates operation of a service where the operator utilizes the UAVs 50 and communication thereto via the wireless networks 302, 304. For example, a UAV 50 from the delivery operator can fly to various distribution/pickup locations 2002 systems and methods for Drone Air Traffic Control (ATC) over wireless networks for package pickup and delivery to various delivery locations 2004, e.g., homes, offices, etc.

The delivery operator can provide a delivery service which supports multiple different distribution/pickup locations 2002 such as for different companies. That is, the delivery service can support various companies in a geographic region, supported by the ATC system 300. The delivery service can be for smaller companies who cannot build their own drone fleet. For example, the delivery service can be similar to parcel delivery services, albeit via the UAVs 50. Of course, other embodiments are contemplated. Also, it is contemplated that the UAV 50 can handle multiple packages at the same time, including from different distribution/pickup locations 2002 and with different delivery locations 2004. The ATC system 300 can perform the various functions described herein. Further, the UAVs 50 for the drone delivery system 2000 can also be configured as described herein, such as to constrain flight to where there is coverage in the wireless networks 302, 304.

Figure 34:
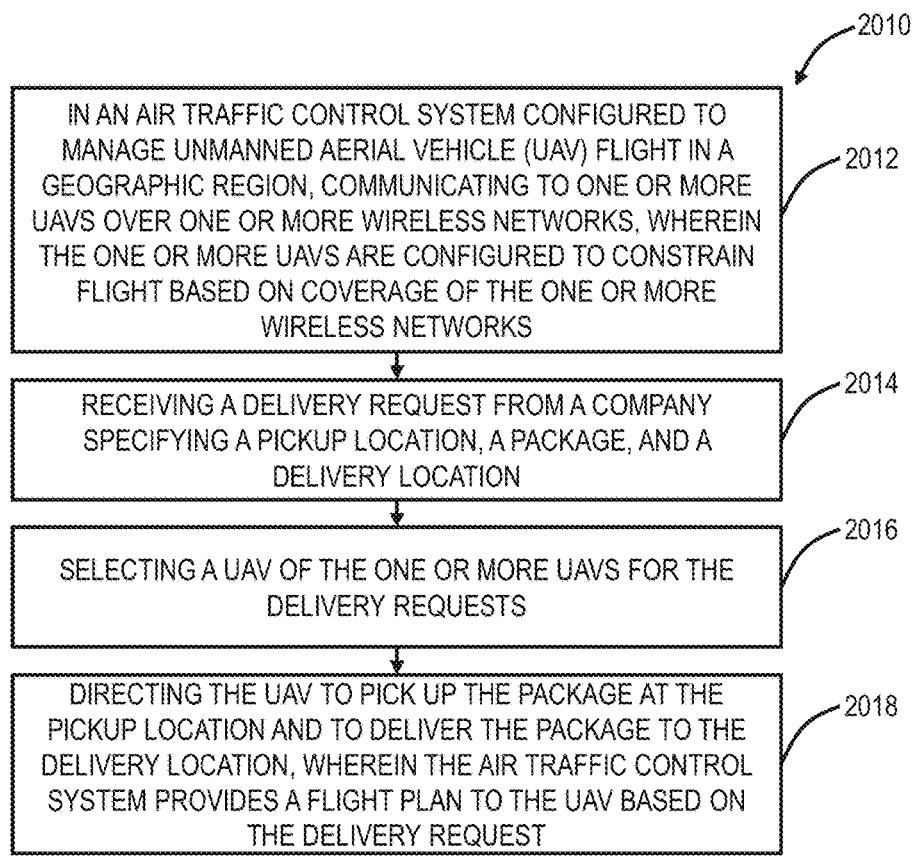
FIG. 34 is a flowchart of Drone Air Traffic Control (ATC) method over wireless networks for package pickup and delivery.

FIG. 34 is a flowchart of Drone Air Traffic Control (ATC) method 2010 over wireless networks for package pickup and delivery. The method 2100 includes, in an air traffic control system configured to manage Unmanned Aerial Vehicle (UAV) flight in a geographic region, communicating to one or more UAVs over one or more wireless networks, wherein the one or more UAVs are configured to constrain flight based on coverage of the one or more wireless networks (step 2012); receiving a delivery request from a company specifying a pickup location, a package, and a delivery location (step 2014); selecting a UAV of the one or more UAVs for the delivery requests (step 2016); and directing the UAV to pick up the package at the pickup location and to deliver the package to the delivery location, wherein the air traffic control system provides a flight plan to the UAV based on the delivery request (step 2018).

The drone method 2010 can further include receiving a second delivery request from a second company specifying a second pickup location, a second package, and a second delivery location; selecting a second UAV of the one or more UAVs for the delivery requests; and directing the second UAV to pick up the second package at the second pickup location and to deliver the second package to the second delivery location, wherein the air traffic control system provides a second flight plan to the second UAV based on the second delivery request The UAV 50 can include an antenna communicatively coupled to the one or more wireless networks, and wherein the flight is constrained based on the antenna monitoring cell signal strength during the flight and adjusting the flight based therein whenever the cell signal strength is lost or degraded. The drone method 2010 can further include receiving flight information from the UAV during the flight; and providing updates to the flight plan based on the flight information. The air traffic control system can maintain location information for the UAV based on the communicating. The location information can be determined based on a combination of triangulation by the plurality of cell towers and a determination by the UAV based on a location identification network.

The drone method 2010 can further include assigning the UAV a specified flying lane and ensuring the UAV is within the specified flying lane based on the communicating. The drone method 2010 can further include receiving photographs and/or video of the delivery location subsequent to delivery of the package; and providing the photographs and/or video as a response to the delivery request. The directing can include providing a delivery technique comprising one of landing, dropping via a tether, dropping to a doorstep, dropping to a mailbox, dropping to a porch, and dropping to a garage.

In another embodiment, a drone air traffic control system includes a processor and a network interface communicatively coupled to one another; and memory storing instructions that, when executed, cause the processor to: communicate to one or more Unmanned Aerial Vehicles (UAVs) over one or more wireless networks, wherein the one or more UAVs are configured to constrain flight based on coverage of the one or more wireless networks; receive a delivery request from a company specifying a pickup location, a package, and a delivery location; select a UAV of the one or more UAVs for the delivery requests; and direct the UAV to pick up the package at the pickup location and to deliver the package to the delivery location, wherein the air traffic control system provides a flight plan to the UAV based on the delivery request.

§ 21.0 Weather Information Based Flight Updates

Again, flying lanes can be used by the ATC system 300 to manage flight of various UAVs 50 in a geographic region. Additionally, a high percentage of problems in flight are caused by weather-related incidents, e.g., wind shear, crosswinds, fuel mismanagement caused by unexpected or unplanned winds, ice, freezing rain, icing, thunderstorms, etc. Accordingly, in an embodiment, the ATC system 300 is configured to learn about weather-related incidents and incorporate this information into flight plans, flying lanes, etc. for safer, more efficient flight of the UAVs 50.

Figure 35:
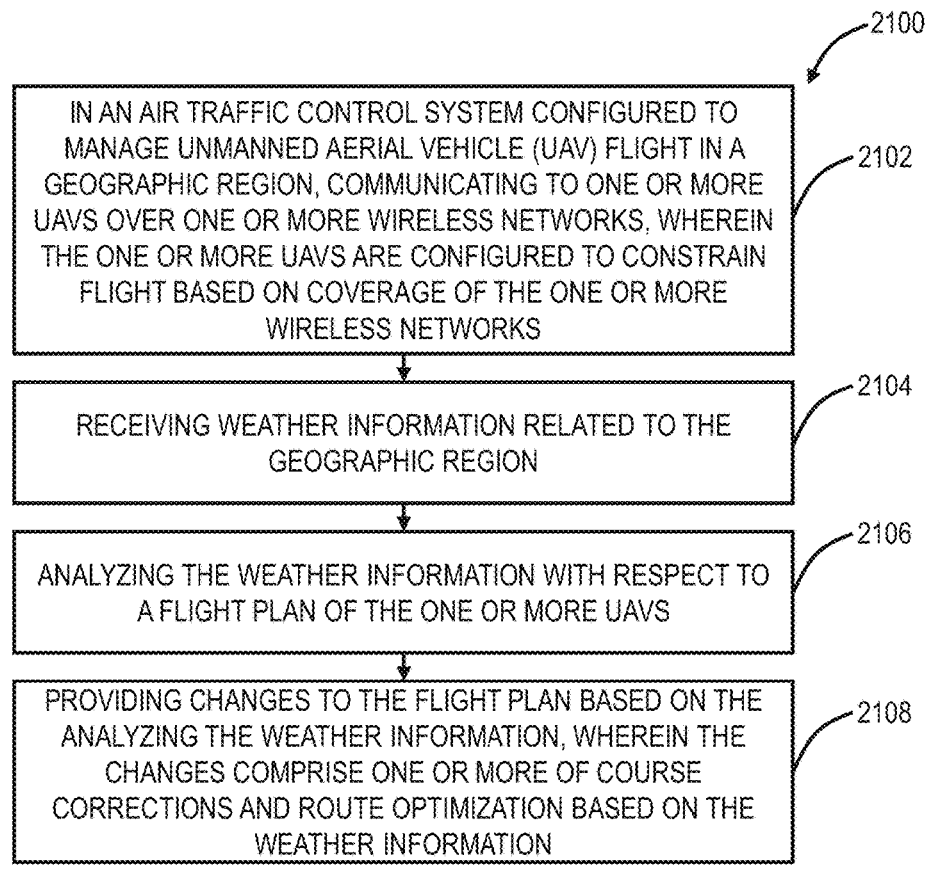
FIG. 35 is a flowchart of a UAV air traffic control management method which provides real-time course corrections and route optimizations based on weather information.

FIG. 35 is a flowchart of a UAV air traffic control management method 2100 which provides real-time course corrections and route optimizations based on weather information. Again, the ATC system 300 operates to manage UAVs 50 in a geographic region. In an embodiment, the ATC system 300 can receive real-time weather updates. The UAV air traffic control management method 2100 incorporates weather updates for real-time course corrections and route optimization (over the wireless networks 302, 304). The real-time course corrections and route optimization can include, for example: instructions to change direction, instructions to change flying lane(s), instruction to land and where the drone should target for landing, full route modification with an emphasis on route optimization while avoiding the negative impact of the weather event, instructions to speed up or slow down, instructions to change altitude, instructions to hold position for a specific or indefinite time period, instructions to move to a safe position away from the weather event and either hold in the air or on the ground for a specific or indefinite time period, instructions to land very quickly, instructions to land very slowly, instructions to circle, and the like.

The UAV air traffic control management method 2100 includes, in an air traffic control system configured to manage Unmanned Aerial Vehicle (UAV) flight in a geographic region, communicating to one or more UAVs over one or more wireless networks, wherein the one or more UAVs are configured to constrain flight based on coverage of the one or more wireless networks (step 2102); receiving weather information related to the geographic region (step 2104); analyzing the weather information with respect to a flight plan of the one or more UAVs (step 2106); and providing changes to the flight plan based on the analyzing the weather information, wherein the changes comprise one or more of course corrections and route optimization based on the weather information (step 2108).

The UAV can include an antenna communicatively coupled to the one or more wireless networks, and wherein the flight is constrained based on the antenna monitoring cell signal strength during the flight and adjusting the flight based therein whenever the cell signal strength is lost or degraded.

The changes can include instructions to change direction, instructions to change flying lane(s), instruction to land and where the drone should target for landing, full route modification with an emphasis on route optimization while avoiding the negative impact of the weather event, instructions to speed up or slow down, instructions to change altitude, instructions to hold position for a specific or indefinite time period, instructions to move to a safe position away from the weather event and either hold in the air or on the ground for a specific or indefinite time period, instructions to land very quickly, instructions to land very slowly, instructions to circle, and the like.

§ 22.0 Package Drop-Off

Again, the air traffic control system 300 can receive delivery requests from a company and direct a UAV 50 to pick up a package and deliver the package to a delivery location. The delivery request can include data that is maintained by the air traffic control system 300 to perform the delivery. This data can include the delivery instructions including the delivery coordinates, the delivery location, package care instructions, and package drop-off instructions.

A delivery technique for the package can be obtained from the package drop-off instructions or can be determined based on one or more of the delivery locations, package care instructions, package drop-off instructions, and a check of the delivery location. The delivery technique can be determined by the air traffic control system 300 or by the UAV 50. Alternatively, the delivery technique can be received by the air traffic control system 300 as part of the delivery request. The delivery technique can be selected from one of multiple delivery techniques including landing the UAV 50 to place the package, dropping the package from a predetermined height, lowering the package from a tether to place the package, and swinging the package towards the drop location and disengaging the connection. Swinging the package can be performed by maneuvering the UAV 50 to transfer momentum to the package. The transferred momentum to the package can be used to deliver the package to a location that cannot be reached from directly above.

For example, a delivery location in a mailbox, in a partially opened garage or on a covered porch may not be accessible from directly above. As such, the UAV 50 can maneuver to swing the package, and then release the package so that the momentum of the package carries the package into the delivery location (i.e. into the mailbox, into the garage, or onto the porch). This can be performed where the package is being held at a bottom of the UAV 50 or where the package has been lowered by a tether where the tether can be used to further transfer the momentum to the package, such as by swinging the package on the tether.

In some embodiments, delivery techniques can be limited when particular care instructions for the package are included in the delivery request. For example, when a package is marked as fragile, and/or with instructions to handle with care, delivery methods, such as dropping the package or releasing the package with momentum may not be used to ensure that the contents of the package are not damaged during the delivery process.

Figure 36:
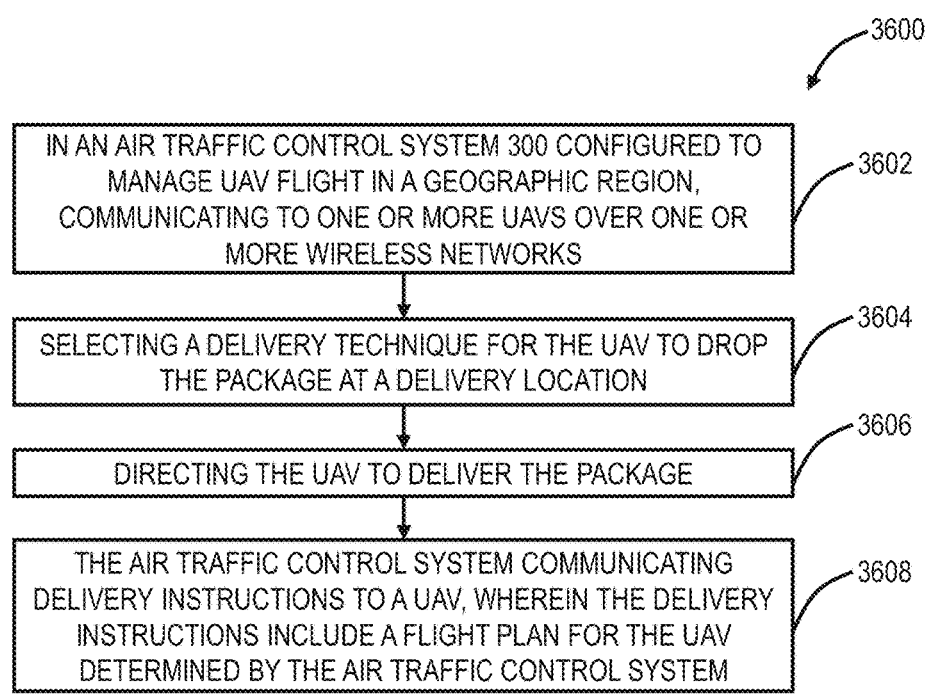
FIG. 36 is a flowchart of a package delivery method.

FIG. 36 is a flowchart of a package delivery method 3600. The method can be combined with any of the methods disclosed herein. The package delivery method 3600 includes, in an air traffic control system 300 configured to manage UAV flight in a geographic region, communicating to one or more UAVs 50 over one or more wireless networks (step 3602). The package delivery method 3600 can also include selecting a delivery technique for the UAV 50 to drop the package at a delivery location (step 3604). The delivery technique can be selected from multiple techniques, such as the techniques disclosed above, including the UAV 50 maneuvering to swing the package, the maneuvering being such that momentum is transferred to the package. This technique can include releasing the package with momentum so that the package will reach the delivery location after the package is released. The package delivery method 3600 can further include directing the UAV 50 to deliver the package (step 3606). The package delivery method 3600 can yet further include the air traffic control system 300 communicating delivery instructions to a UAV 50 (step 3608). As described above, the delivery instructions can include the delivery coordinates, the delivery location, package care instructions, and package drop-off instructions with the delivery technique. The delivery instructions can be part of a flight plan provided to the UAV 50 by the air traffic control system 300.

In some embodiments, not all delivery methods may be available at a delivery location. As such, the package delivery method 3600 can include confirming a selected delivery technique is suitable for the delivery location. This can include receiving feedback from the UAV, such as images of the delivery location, and the like. Alternatively, the feedback can be obtained by the air traffic control system 300 prior to selecting a delivery technique.

§ 23.0 Package Deliveries and Returns

Again, the air traffic control system 300/drone delivery system 2000 can be used to schedule, manage, and coordinate pickup, distribution, delivery, and returns of one or more packages. As described above, a UAV 50 from a delivery operator can fly to various distribution/pickup locations 2002 for package pickup and delivery to various delivery locations 2004 (refer to FIG. 33). In some embodiments, a delivery location and pickup location are at the same coordinates/location, such as when a home, office, etc. is both receiving a package and sending a package via a delivery operator that is utilizing the air traffic control system 300/drone delivery system 2000. The package being sent may be a new package being sent to a designated location or may be a previously delivered package being returned.

When picking up packages from various distribution/pickup locations 2002, the UAV 50 may need to distinguish between packages that the UAV 50 is assigned to pick up and other packages, such as those for other UAVs to pick up and packages previously delivered to that location (in cases where the pickup location and delivery location are the same) that are not designated for return. In such cases the UAV 50 can scan the package, such as by using a camera or barcode reader, to identify the package. The package can include a barcode, such as a linear or matrix barcode, to identify the package, provide or verify delivery instructions, and the like.

Figure 37:
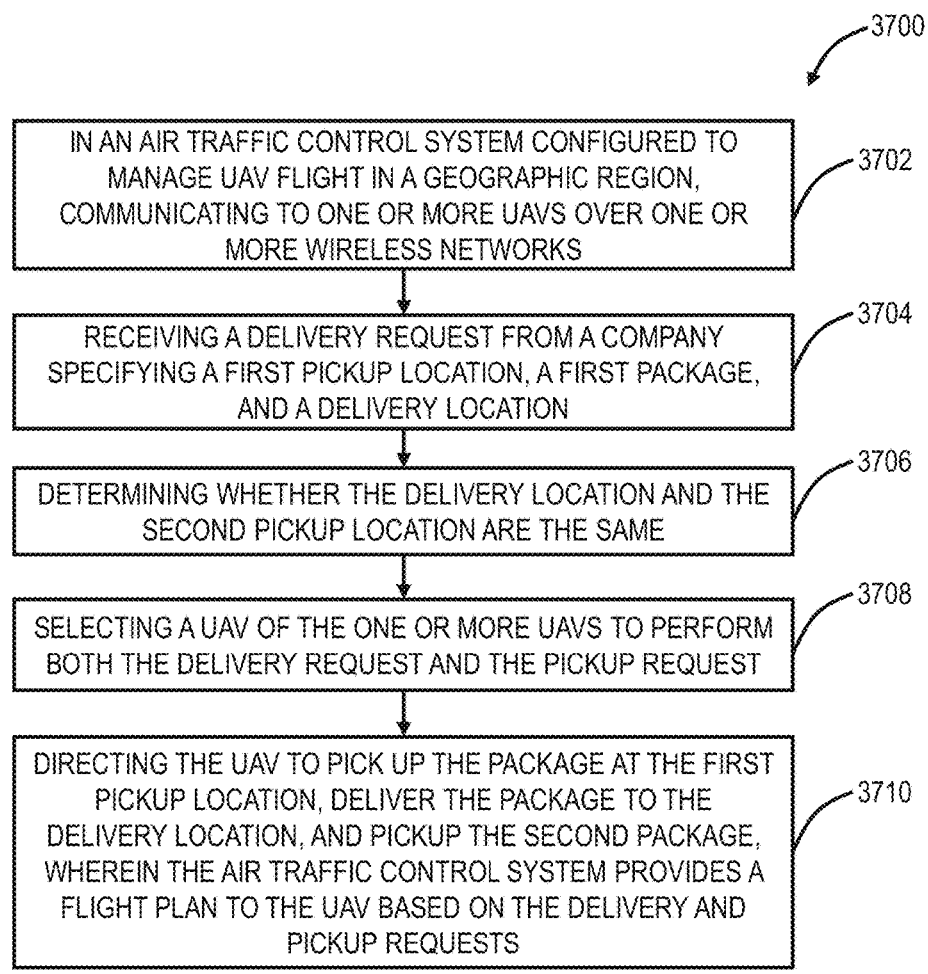
FIG. 37 is a flowchart of a package delivery and return method.

FIG. 37 is a flowchart of a package delivery and return method 3700. The method can be combined with any of the methods disclosed herein. The package delivery and return method 3700 can include, in an air traffic control system 300 configured to manage UAV flight in a geographic region, communicating to one or more UAVs 50 over one or more wireless networks (step 3702). The package delivery and return method 3700 can also include receiving a delivery request from a company specifying a first pickup location, a first package, and a delivery location (step 3704). The package delivery method 3700 can further include receiving a pickup request specifying a second pickup location and a second package. The pickup request can also include a destination location, which can include a final destination for the second package, which may need to be routed to a distribution location for further processing. Thus, a distribution location for further processing may need to be determined based on the second pickup location, the final destination, and the like.

The package delivery and return method 3700 can further include determining whether the delivery location and the second pickup location are the same (step 3706). In embodiments, the delivery location and the second pickup location are the same when the delivery coordinates match, the delivery addresses match, the delivery coordinates fall within the same property, the delivery coordinates are within a predetermined distance to one another, or the like.

The package delivery and return method 3700 can yet further include selecting a UAV 50 of the one or more UAVs 50 to perform both the delivery request and the pickup request (step 3708); and directing the UAV 50 to pick up the package at the first pickup location, deliver the package to the delivery location, and pick up the second package, wherein the air traffic control system 300 provides a flight plan to the UAV 50 based on the delivery and pickup requests (step 3710). Step 3710 can include instructing the UAV 50 to scan the delivery location for the second package. In the event that the final location of the second package is within a flying range of the UAV 50 (i.e. the UAV 50 can deliver the second package to the final location in a single flight without recharging or refueling), the air traffic control system 300 can direct the UAV 50 to deliver the second package to the final destination for the second package, which can be included in the flight plan for the UAV 50.

Furthermore, the air traffic control system 300 can instruct the UAV 50 to scan for a second package upon delivery of the first package without having received the pickup request. Upon identifying the second package, the UAV 50 can scan the package for identifying information and delivery instructions (such as by reading a barcode), which can be transmitted by the UAV 50 to the air traffic control system 300, which receives the delivery instructions, processes the instructions, and directs the UAV 50 to pick up the second package upon confirming that the second package should be picked up and taken to a distribution location for further processing. Thus, in some instances, the instruction to deliver the first package and the instruction to pick up the second package can be sent from the air traffic control system 300 to the UAV 50 at different times.

§ 24.0 Multiple Package Delivery/Pickup

Again, the UAV 50 can handle multiple packages at the same time, including from different distribution/pickup locations 2002 and with different delivery locations 2004. As such, the UAV 50 can deliver one or more packages to a first location and one or more packages to a second location, which is located at a different set of coordinates than the first location. The coordinates can be defined as waypoints, as discussed above. Furthermore, the UAV 50 can pick up one or more packages from a different location after delivering one or more packages.

In the event that multiple packages are being delivered to the same location or picked up from the same location, the UAV 50 can be instructed to pick up and deliver a container, bin, or the like that holds the multiple packages during transit to the location.

Figure 38:
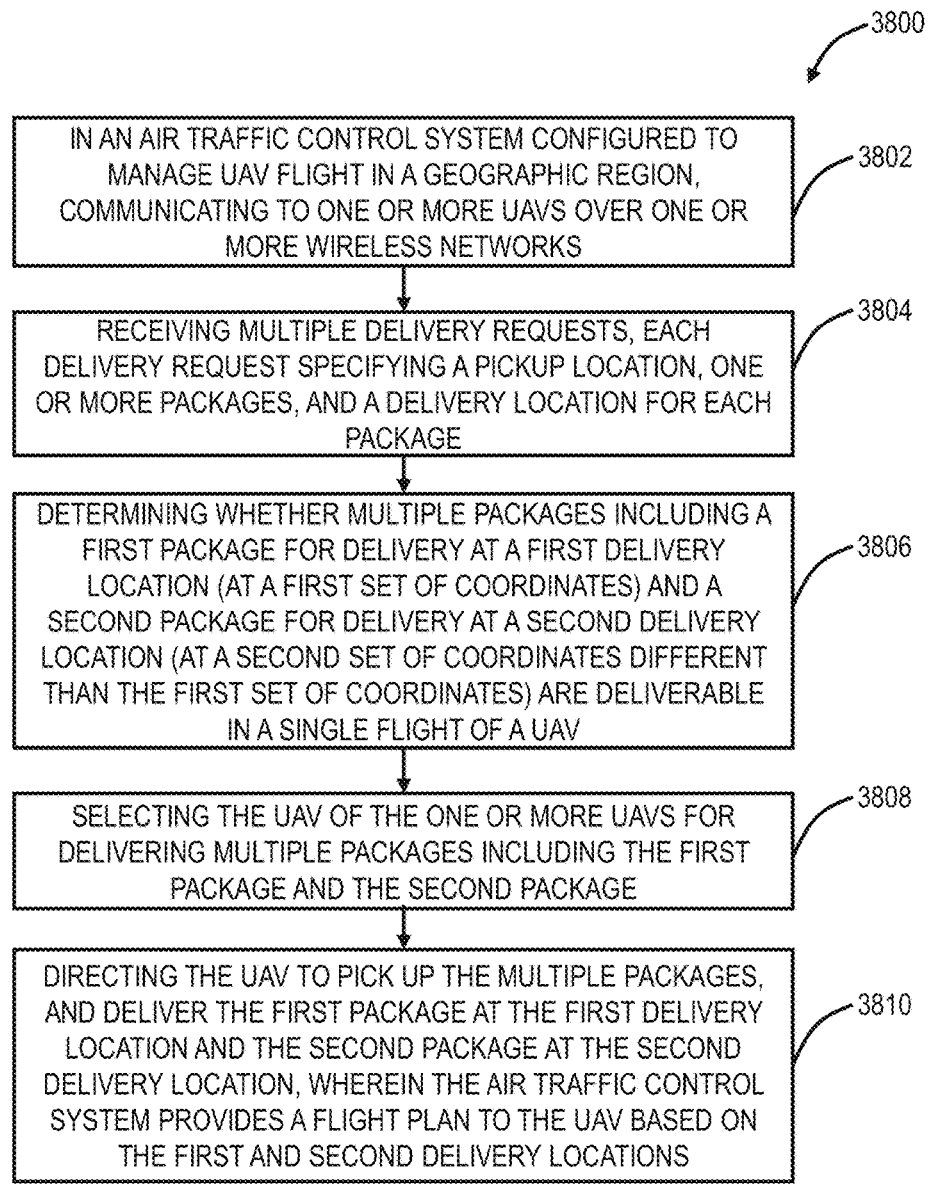
FIG. 38 is a flowchart of a package delivery method.

FIG. 38 is a flowchart of a package delivery method 3800. The method can be combined with any of the methods disclosed herein. The package delivery method 3800 includes, in an air traffic control system 300 configured to manage UAV flight in a geographic region, communicating to one or more UAVs 50 over one or more wireless networks (step 3802). The package delivery method 3800 can also include receiving multiple delivery requests, each delivery request specifying a pickup location, one or more packages, and a delivery location for each package (step 3804). The package delivery method 3800 can further include determining whether multiple packages including a first package for delivery at a first delivery location (at a first set of coordinates) and a second package for delivery at a second delivery location (at a second set of coordinates different than the first set of coordinates) are deliverable in a single flight of a UAV 50 (step 3806). The first and second set of coordinates can be a specific geographic point, a waypoint, and the like. Step 3806 and a number of the multiple packages selected for delivery by the UAV 50 can be determined based on the weight of the packages, the distances between the pickup and delivery locations, and a range of the UAVs 50 based on battery levels and/or fuel status of the UAVs 50.

The package delivery method 3800 can yet further include selecting the UAV 50 of the one or more UAVs 50 for delivering the multiple packages (step 3808); and directing the UAV 50 to pick up the multiple packages, and deliver the first package at the first delivery location and the second package at the second delivery location, wherein the air traffic control system 300 provides a flight plan to the UAV 50 based on the first and second delivery locations (step 3810).

The air traffic control system 300 can optimize the flight plan such that the second package can be picked up simultaneously with the first package (when the pickup location is the same for both), before the pickup of the first package, after the pickup of the first package, before the delivery of the first package, or after the delivery of the first package based on the locations of each of the pickup and delivery locations.

The delivery and pickup locations can each be one of distribution locations, homes, offices, and the like.

§ 25.0 Delayed Delivery

Again, the UAV 50 can be instructed to deliver one or more packages to one or more delivery locations. However, at times, the delivery to a particular location may need to be delayed, which can occur after the UAV 50 has been dispatched and is already traveling and following the flight plan provided by the air traffic control system 300. Such delays could be the result of a temporary obstruction in the flight path, temporary unavailability of the delivery location, a mobile recipient that has not reached the delivery location yet, and the like. When the necessity to delay the delivery is temporary, the UAV 50 can hold a position until receiving instructions to complete the delivery. While holding position, the UAV 50 can hover in place, move to specific coordinates to hover, or can land to preserve battery power/fuel. The specific coordinates can be a specific point, a waypoint, and the like. The landing location can be a secure location, a distribution location, an emergency landing location, a recharging location for the UAV 50, and the like.

Figure 39:
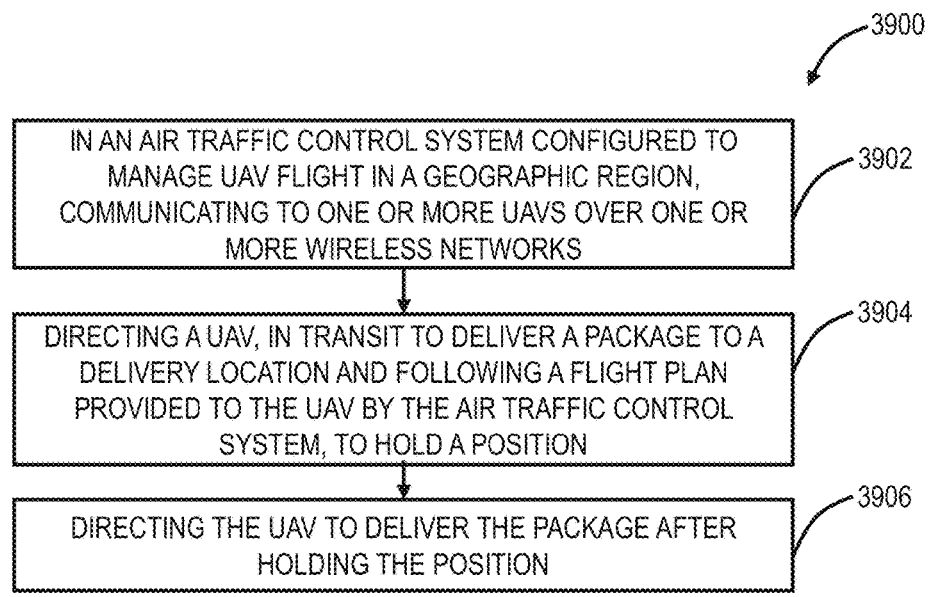
FIG. 39 is a flowchart of a package delivery delay method.

FIG. 39 is a flowchart of a package delivery delay method 3900. The method can be combined with any of the methods disclosed herein. The package delivery delay method 3900 can include, in an air traffic control system 300 configured to manage UAV flight in a geographic region, communicating to one or more UAVs 50 over one or more wireless networks (step 3902). The package delivery delay method 3900 can also include directing a UAV 50, in transit to deliver a package to a delivery location and following a flight plan provided to the UAV 50 by the air traffic control system 300 or by a drone operator, including the drone operator using the air traffic control system 300, to hold a position (step 3904); and directing the UAV 50 to deliver the package after holding the position (step 3906). Steps 3904 and 3906 can be performed simultaneously, such as by instructing the UAV 50 to hold for a predetermined amount of time or can be sent separately. Steps 3904 and 3906 may be sent separately when the amount of time that the UAV 50 is to hold its position is not known at the time of step 3904. Step 3906 can also include instructions for the UAV 50 to follow an updated flight plan.

§ 26.0 Cancel/Update Delivery

Again, the UAV 50 can be instructed to deliver one or more packages to one or more delivery locations. As noted above, delivery to a particular location may need to be delayed. This delay may need to be for an extended period of time and cannot be completed within the current flight of the UAV 50. Furthermore, delivery may need to be canceled or re-routed/changed. The re-route may be due to a change in the delivery location of the package, which may or may not be completable within the current flight of the UAV 50. In instances where the re-route cannot be completed within the current flight of the UAV 50, delivery of the package can be cancelled and the package can be returned to the original pickup location.

Figure 40:
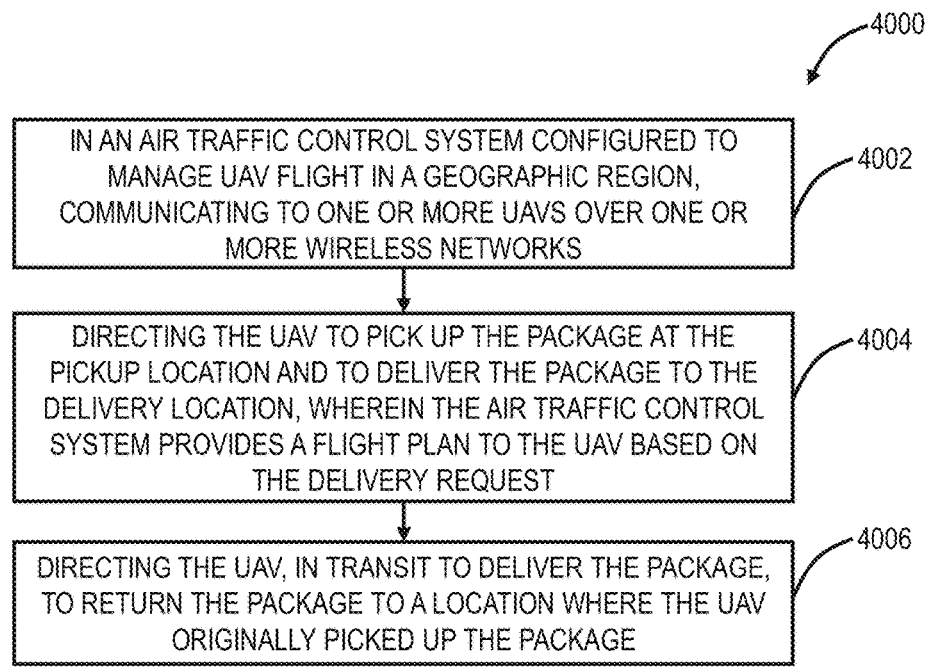
FIG. 40 is a flowchart of a package delivery cancelation method.

FIG. 40 is a flowchart of a package delivery cancelation method 4000. The method can be combined with any of the methods disclosed herein. The package delivery cancelation method 4000 can include, in an air traffic control system 300 configured to manage UAV flight in a geographic region, communicating to one or more UAVs 50 over one or more wireless networks (step 4002). The package delivery cancelation method 4000 can also include directing the UAV 50 to pick up the package at the pickup location and to deliver the package to the delivery location, wherein the air traffic control system 300 provides a flight plan to the UAV 50 based on the delivery request (step 4004). The package delivery cancelation method 4000 can also include directing the UAV 50, in transit to deliver the package, to return the package to a location where the UAV 50 originally picked up the package (step 4006).

Figure 41:
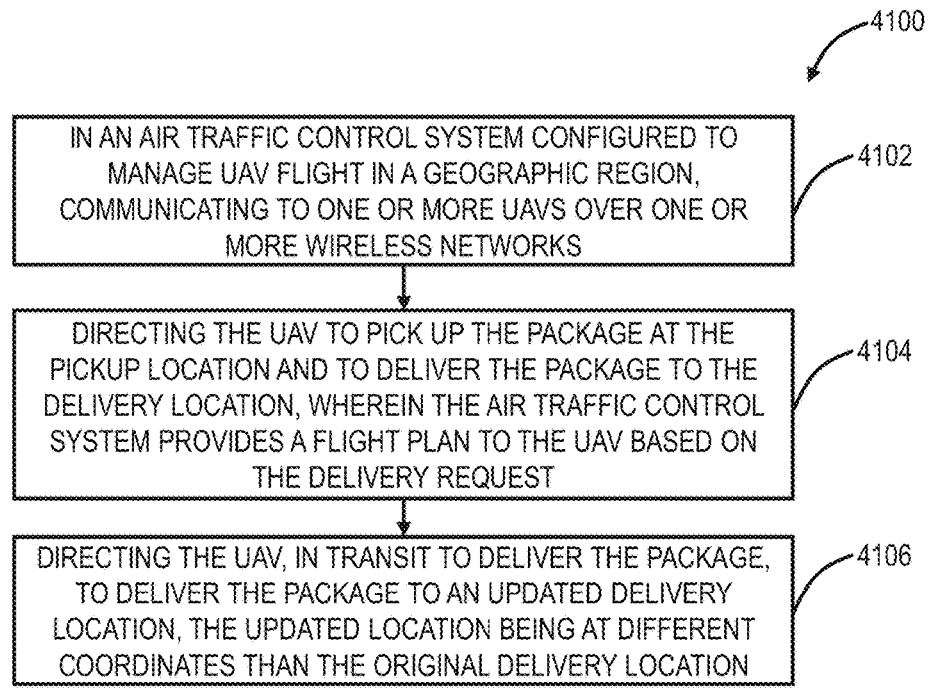
FIG. 41 is a flowchart of a package delivery method.

FIG. 41 is a flowchart of a package delivery method 4100. The method can be combined with any of the methods disclosed herein. The package delivery method 4100 can include, in an air traffic control system 300 configured to manage UAV flight in a geographic region, communicating to one or more UAVs 50 over one or more wireless networks (step 4102). The package delivery method 4100 can also include directing the UAV 50 to pick up the package at the pickup location and to deliver the package to the delivery location, wherein the air traffic control system provides a flight plan to the UAV 50 based on the delivery request (step 4104). The package delivery method 4100 can also include directing the UAV 50, in transit to deliver the package, to deliver the package to an updated delivery location, the updated location being at different coordinates than the original delivery location (step 4106). Step 4106 can also include instructions for the UAV 50 to follow an updated flight plan.

§ 27.0 Flight Path Control

Again, the air traffic control system 300 can be used to schedule, manage, and coordinate pickup, distribution, delivery, and returns of one or more packages. As described above, the air traffic control system 300 can determine flight plans for one or more UAVs 50 and communicate those flight plans to the UAVs 50. Each flight plan can include a flight path for the UAV 50. The flight path can be over various types of terrain, can take the UAV 50 in and out of various flying lanes, and can take the UAV 50 to multiple locations.

The flight plan can include instructing the UAV 50 to follow a road, street, or a highway at a particular altitude for a specific distance and then move to new coordinates once the distance is achieved. The UAV 50 maintaining flight along the road can be achieved by following a specific set of coordinates identifying the path over the road, street or highway and can also be achieved by using cameras to identify the road and to maintain flight above the road until the distance is achieved or until a set of coordinates, signifying the distance has been achieved, is reached.

In embodiments, the set of coordinates can be the pickup or delivery location, and the air traffic control system 300 can instruct the UAV 50 to follow one or more roads until the pickup or delivery location is reached. This instruction can be such that the UAV 50 follows the one or more roads from the time the UAV 50 exits a designated flying lane until the pickup/delivery location is reached. Indeed, the flying lanes themselves can be defined and standardized in such a way as to be over a road, street, or highway.

Figure 42:
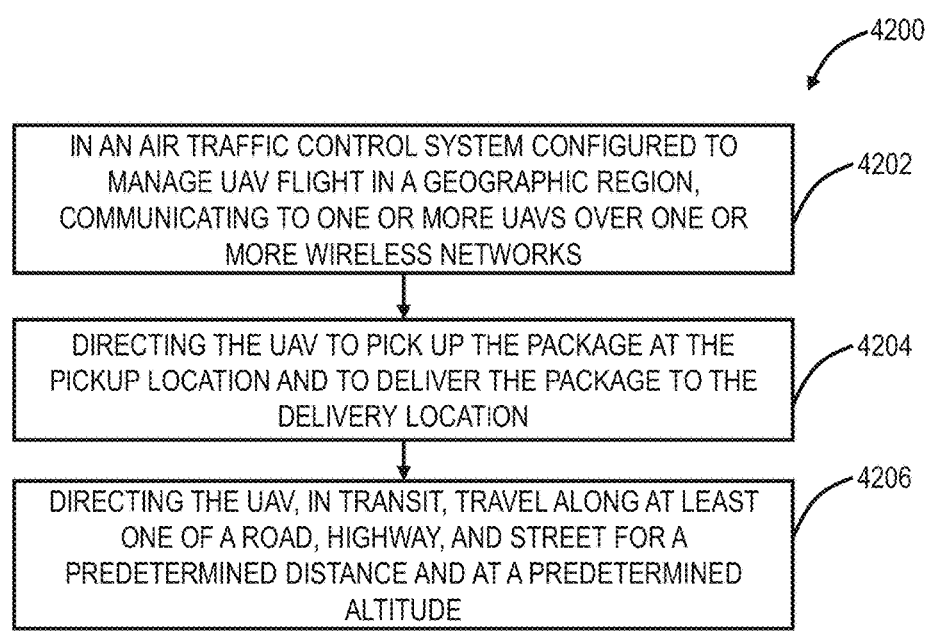
FIG. 42 is a flowchart of a package delivery method.

FIG. 42 is a flowchart of a package delivery method 4200. The method can be combined with any of the methods disclosed herein. The package delivery method 4200 can include, in an air traffic control system 300 configured to manage UAV flight in a geographic region, communicating to one or more UAVs 50 over one or more wireless networks (step 4202). The package delivery method 4200 can also include directing the UAV 50 to pick up the package at the pickup location and to deliver the package to the delivery location (step 4204). The package delivery method 4200 can also include directing the UAV 50, in transit, travel along at least one of a road, highway, and street for a predetermined distance and at a predetermined altitude (step 4206). In embodiments, the method can include the directing the UAV 50 to utilize one or more cameras in control of the UAV 50 to identify the at least one of the road, highway, and street in maintaining flight above the at least one of the road, highway, and street.

Again, each flight plan can include a flight path for the UAV 50 outlining a collection of points, that define how the UAV 50 should fly. As such, for a delivery, the air traffic control system 300 can instruct the UAV 50, outbound for a delivery, to move from one point to another in a specific order. For example, the air traffic control system 300 can instruct the UAV 50 to move from coordinates A to coordinates B to coordinates C (and so on) at precise speeds and altitudes until the final destination is reached for delivery of the package. Some of the coordinates can define at least a portion of a flying lane defined and standardized within the geographic region.

The air traffic control system 300 can instruct the UAV 50, inbound from a delivery, to travel along the same set of points followed while outbound for the delivery, but in a specific order that is a reverse of the outbound order of the points. Thus, from the example above, the air traffic control system 300 can instruct the UAV 50 to move from the final destination to coordinates C to coordinates B to coordinates A (and so on) at precise speeds and altitudes until returning to an original location of the UAV 50 or a distribution location to pick up another package. Each of the coordinates can be a waypoint, as disclosed above, which can define both a horizontal area and an altitude range (i.e. a volume) for the UAV 50 to travel through.

Figure 43:
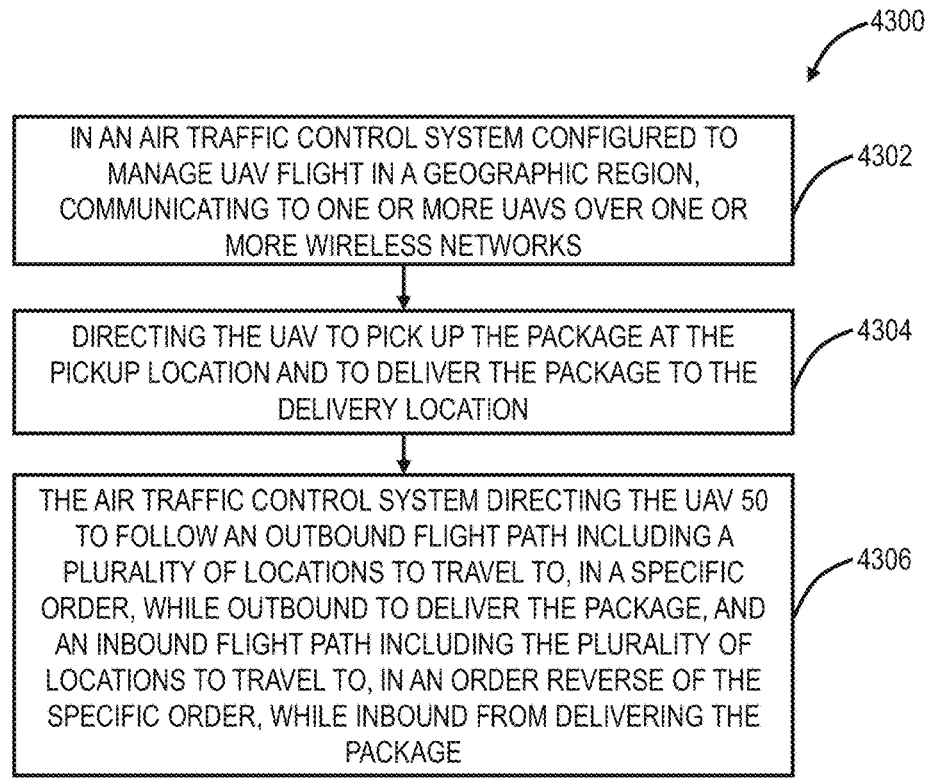
FIG. 43 is a flowchart of a package delivery method.

FIG. 43 is a flowchart of a package delivery method 4300. The method can be combined with any of the methods disclosed herein. The package delivery method 4300 can include, in an air traffic control system 300 configured to manage UAV flight in a geographic region, communicating to one or more UAVs 50 over one or more wireless networks (step 4302). The package delivery method 4300 can also include directing the UAV 50 to pick up the package at the pickup location and to deliver the package to the delivery location (step 4304). The package delivery method 4300 can further include the air traffic control system 300 directing the UAV 50 to follow an outbound flight path including a plurality of locations to travel to, in a specific order, while outbound to deliver the package, and an inbound flight path including the plurality of locations to travel to, in an order reverse of the specific order, while inbound from delivering the package (step 4306).

§ 28.0 Emergency Delivery

Again, the air traffic control system 300 can direct a UAV 50 to pick up a package and deliver the package to a delivery location. In some instances, the package delivery may be urgent, such as for an emergency. For example, the package can include emergency equipment, such as a defibrillator, medicine, equipment to pry open vehicles, and the like. Similarly, the delivery can be of a patient requiring quick transfer from one location to another, such as from a scene of an accident to a hospital.

When a delivery is identified or classified as urgent, provisions for the flight plan can be made to ensure that the package can be delivered as quickly as possible. The flight plan can include a flight path that is a parabolic arc that the UAV 50 follows, traveling at higher speeds than other UAV traffic or at a maximum permissible speed. The parabolic arc can be over other existing UAV traffic (identified or classified as non-urgent), such as at higher altitudes and over other flying lanes, such as those defined and standardized in the geographic region.

Furthermore, a flying lane can be defined for urgent deliveries, such as those for emergencies. The UAV 50 can climb vertically, at an inclined angle, or on an arc as quickly as possible to the flying lane and then travel horizontally in the urgent flying lane at higher speeds than UAV traffic in other lanes or at a maximum permissible speed.

When determining the optimum route for the UAV 50 for an urgent delivery, the paths and flying lanes for other UAVs 50 may interfere therewith. As such, the paths and flying lanes of other UAVs 50 can be re-routed to clear the optimum route for the UAV 50. For example, the optimum route for the UAV 50 can be considered to be a temporary obstruction and can be treated as an obstruction (as described above) to the other flying paths and flying lanes.

Figure 44:
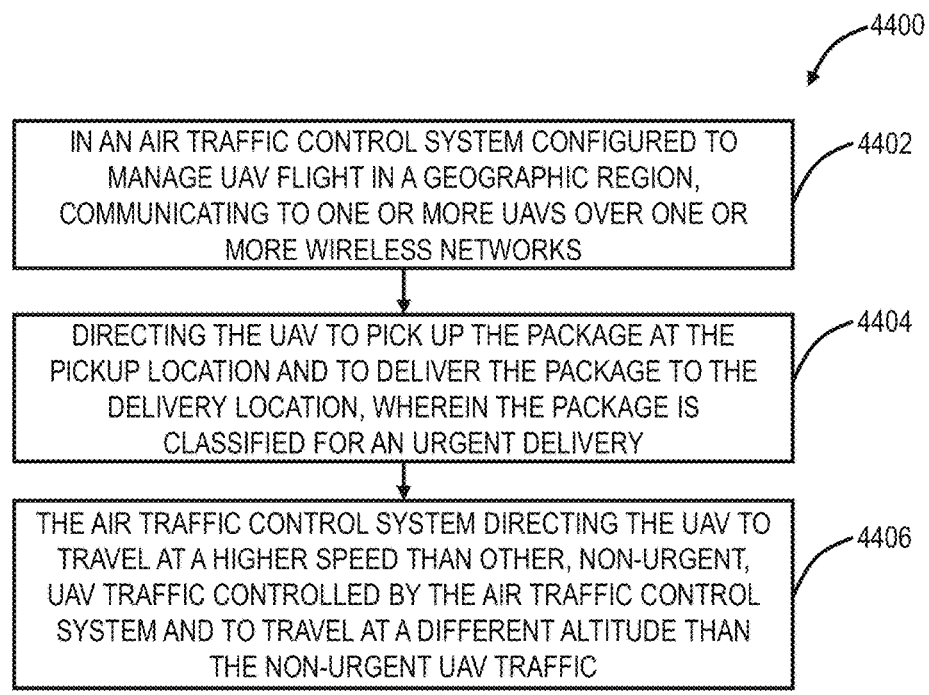
FIG. 44 is a flowchart of an urgent package delivery method.

FIG. 44 is a flowchart of an urgent package delivery method 4400. The method can be combined with any of the methods disclosed herein. The urgent package delivery method 4400 can include, in an air traffic control system 300 configured to manage UAV flight in a geographic region, communicating to one or more UAVs 50 over one or more wireless networks (step 4402). The urgent package delivery method 4400 can also include directing the UAV 50 to pick up the package at the pickup location and to deliver the package to the delivery location, wherein the package is classified for an urgent delivery (step 4404). The urgent package delivery method 4400 can further include the air traffic control system 300 directing the UAV 50 to travel at a higher speed than other, non-urgent, UAV traffic controlled by the air traffic control system 300 and to travel at a different altitude than the non-urgent UAV traffic (step 4406).

§ 28.0 Drone Loading

Again, UAVs 50 can be instructed to travel to a pickup location where the UAVs are loaded with one or more items for delivery to a delivery location. The distribution of the weight of the items can negatively affect the flight and control of the UAVs 50, such as unexpected rotation, a pull in one or more lateral directions, and can make elevation changes difficult. Further, the UAV 50 may require constant corrections to maintain flight that can reduce the ability of the UAV 50 to stay on course. The items can be stand-alone or contained within packages to be delivered or otherwise transported by the UAV 50.

Figure 45:
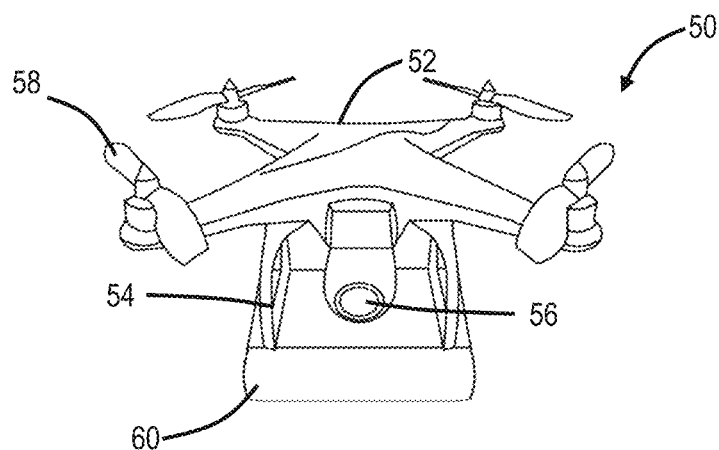
FIG. 45 is a perspective view of a UAV loaded with an item for use with the systems and methods described herein.
Figure 46:
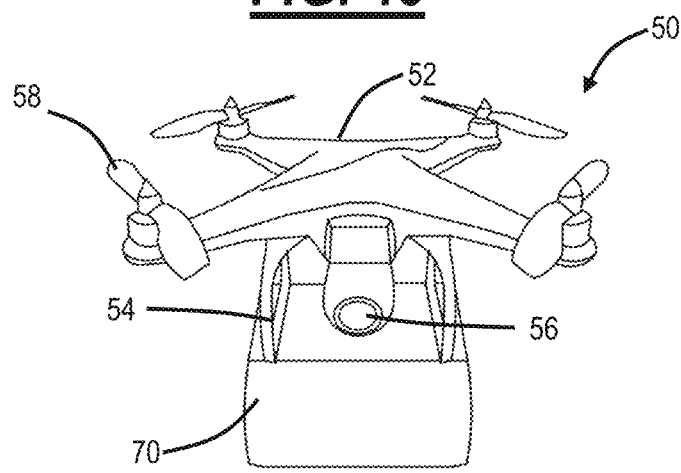
FIG. 46 is a perspective view of a UAV loaded with a container for use with the systems and methods described herein.
Figure 47:
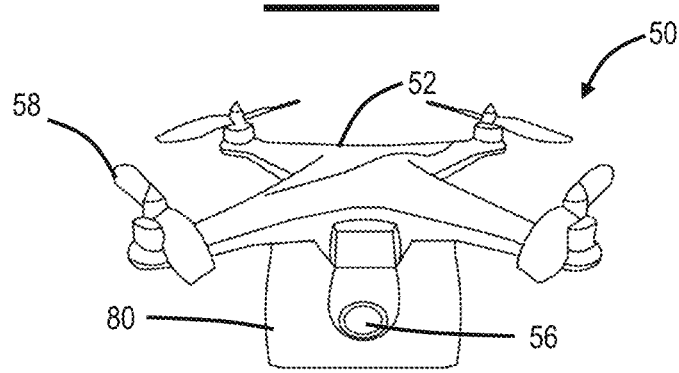
FIG. 47 is a perspective view of a UAV including a cargo bay for use with the systems and methods described herein.

UAVs 50 can be loaded in many different ways. FIGS. 45-47 are perspective views of a UAV 50 loaded with one or more items for use with the systems and methods described herein. As can be seen in FIG. 45, an item 60 can be secured directly to the UAV 50, such as to a lower frame 54 of the UAV 50. The item 60 can be positioned under the lower frame 54, between legs of the lower frame 54, can be secured to a body 52 of the UAV 50, and the like.

As can be seen in FIG. 46, a removable container 70 can be secured directly to the UAV 50. The container 70 can be configured to hold one or more items. Like the item 60, the container 70 can be secured to a lower frame 54 of the UAV 50, the body 52 of the UAV 50, and the like. The container 70 can be positioned below the lower frame 54, between the lower frame 54, and within the body 52 of the UAV 50.

As can be seen in FIG. 47, the body 52 of the UAV 50 can include a cargo bay 80 that is integral to the body 52. The cargo bay 80 can be configured to hold one or more items, can include one or more compartments, and can include shelving for holding the one or more items.

Figure 48:
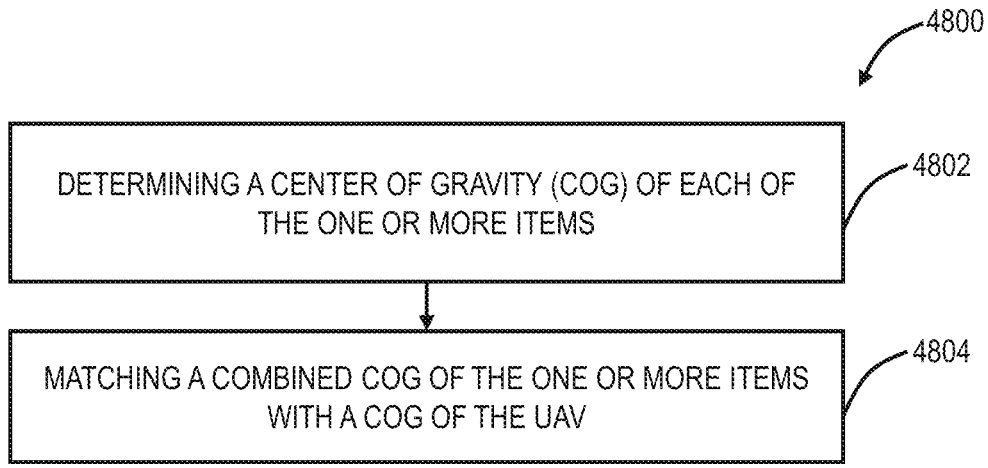
FIG. 48 is a flowchart of a method for loading a UAV with one or more items.

FIG. 48 is a flowchart of a method 4800 for loading a UAV 50 with one or more items. The method includes determining a COG of each of the one or more items at step 4802. The COG can be determined separately for each item or can be determined for multiple items combined together. The multiple items can be secured together in a separate box, in a reusable container, such as container 70, by wrapping the multiple items in thin plastic film, by strapping the multiple items together with cords, by strapping the multiple items together with bands, by wrapping a parachute around multiple items, by attaching a parachute to the multiple items, and the like. When separate centers of gravity are determined, a combined COG can then be determined using the separate centers of gravity and the separate weights of each of the multiple items. When multiple items are secured together, the securing medium can also be included in the combined COG.

In some embodiments, the COG is determined using one or more scales. In one embodiment, a weight distribution of the one or more items is determined with the item in multiple orientations and the resulting distributions are used to determine the COG. For example, each corner of the item can be weighed by a separate scale simultaneously with the item lying flat, and then can be weighed by one or more of the scales simultaneously with the item positioned at an angle.

In some embodiments, the COG is determined using the UAV 50. In these embodiments, the UAV 50 temporarily lifts the item. The flight data, such as the flight corrections, speeds of each rotor 58, accelerometer data recorded during the flight, drift of the UAV 50, and the like, during the temporary lift can then be used to estimate the COG of the one or more items or of the loaded UAV 50. Flight data for lifting items with a known COGs can be recorded and used in comparison to estimate a COG of the one or more items. In some embodiments, the one or more items are weighed prior to be lifted by the UAV 50 and the weight is used in the estimation. In other embodiments, the weight is also estimated based on the lifting of the one or more items by the UAV by comparison to the flight data for lifting items with known weights and known COGs.

The method also includes matching a combined COG of the one or more items with a COG of the UAV 50 at step 4804. In embodiments, matching the COG of the one or more items with the COG of the UAV 50 is defined as positioning the combined COG within a predetermined region around the COG of the UAV 50. In some embodiments, the size of the predetermined region varies based on a combined weight of the one or more items. In embodiments, step 4804 includes determining a combined COG of the one or more items and the UAV 50 and determining whether the combined COG falls within a predetermined region around the original COG of the UAV 50.

In embodiments, the one or more items includes a container 70 and one or more packages, and matching the combined COG of the one or more items with the COG of the UAV includes positioning the one or more packages within the container 70 such that the combined COG of the container and the one or more packages matches the COG of the UAV. The COG of any type of securing medium can also be included in the combined COG that is matched with the COG of the UAV.

Figure 49:
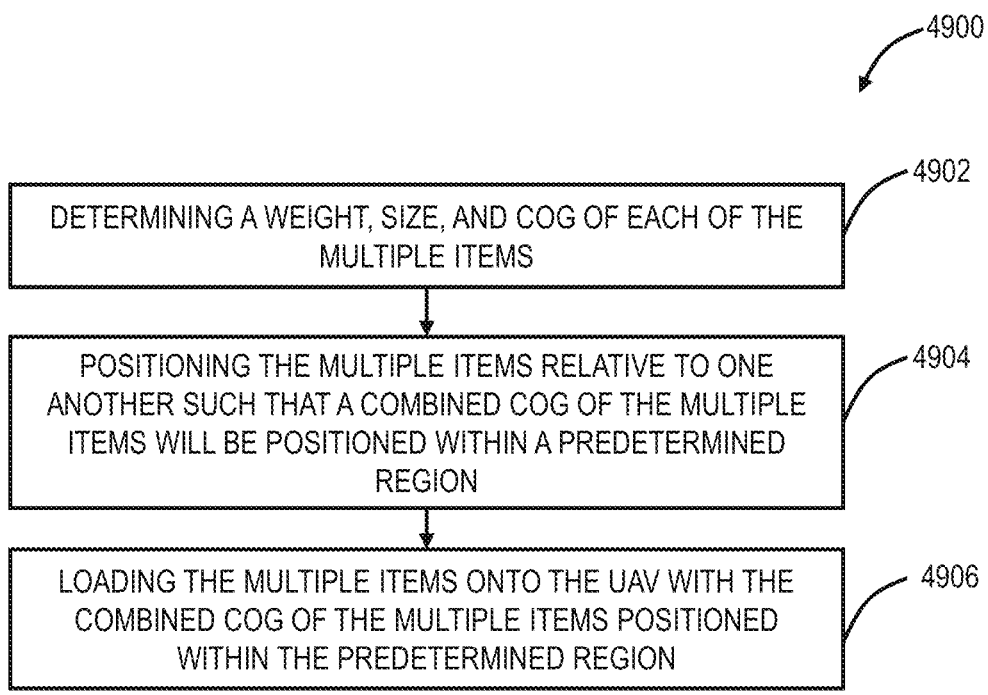
FIG. 49 is a flowchart of a method for loading a UAV with multiple items.

FIG. 49 is a flowchart of a method 4900 for loading a UAV 50 with multiple items. The method 4900 can be combined and used with the method 4800 discussed above. The method 4900 includes determining a weight, size, and COG of each of the multiple items at step 4902.

The method 4900 also includes positioning the multiple items relative to one another such that a combined COG of the multiple items will be positioned within a predetermined region at step 4904. In embodiments, the predetermined region is defined relative to one of a COG of the UAV 50, the COG of the container 70 to be transported by the UAV 50, the COG of the cargo bay 80 of the UAV 50, combinations thereof, and the like. The size and dimensions of the predetermined region may be determined based on the capabilities of the UAV 50, the size of the UAV 50, the size and weight of the container 70, a combined weight of the multiple items, and the like.

In embodiments, positioning the multiple items relative to one another includes one or more of securing the multiple items to walls, shelves, and the like of a cardboard box, a container 70, or a cargo bay 80. In some embodiments, positioning the multiple items relative to one another includes using spacers and fillers to position the multiple items within a cardboard box, a container 70, or a cargo bay 80. In some embodiments, multiple items are positioned relative to one another using spacers and then wrapped together using plastic wrap, straps, cords, and the like. The spacers and fillers can include lightweight materials such as cardboard, polystyrene foam, air pillows, inflated cushioning, paper, and the like. The spacers and fillers can include various shapes, such as cuboids, wedges, cylinders, and the like. The spacers and fillers can also include loose-fill and other void filling packaging. The density of the spacers and fillers is such that shifting of the multiple items is prevented during flight of the UAV 50.

The method 4900 further includes loading the multiple items onto the UAV 50 with the combined COG of the multiple items positioned within the predetermined region at step 4906. In some embodiments, steps 4904 and 4906 are performed simultaneously, such as when the multiple items are directly loaded into the cargo bay 80 of the UAV 50.

Figure 50:
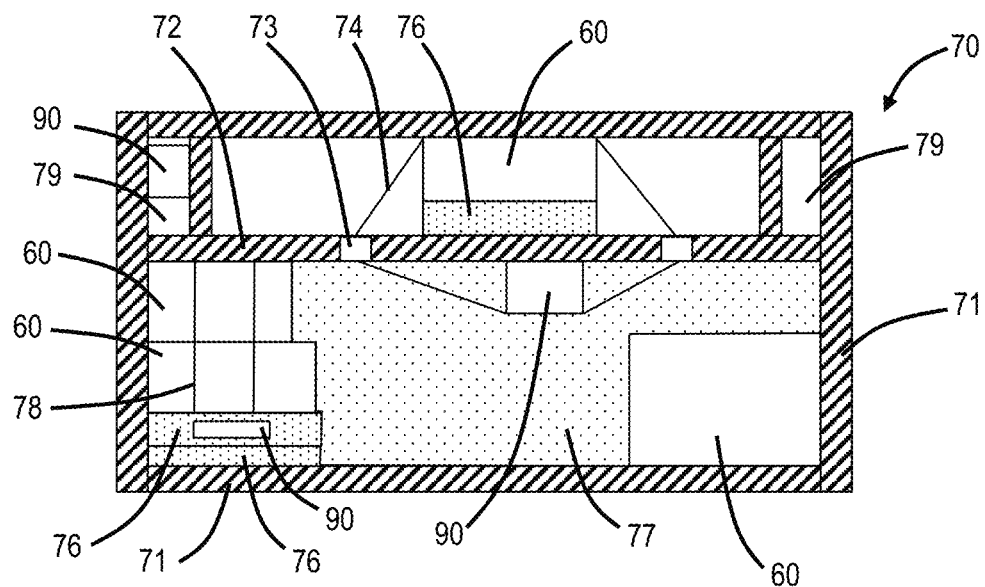
FIG. 50 is a schematic illustration of a container with multiple items positioned therein.

FIG. 50 is a schematic illustration of a container 70 with multiple items 60 positioned therein. In embodiments, the items 60 are secured to one or more of the walls 71 and shelves 72, positioned using one or more spacers 76, such as the spacers discussed above, and held in place using filler 77, such as the filler discussed above. In the embodiment illustrated, one item 60 is positioned at an upper center location of the container 70 with a spacer 76 locating the item 60 relative to a shelf 72. In embodiments, the heaviest item 60 is positioned in this location. This item 60 is also held in place using straps 74, which secure the item 60 to the shelf 72 using a fastening device 73, such as a hook, perforation in the shelf, hook and loop fasteners, and the like. The straps 74 can be woven material, tape, rubber bands, string, and the like. The item 60 can similarly be secured to one or more of the walls 71 of the container 70. In the embodiment illustrated, two items 60 are secured together using a wrapping material 78, such as the materials disclosed above, woven material, tape, rubber bands, string, and the like, and the two items 60 are positioned within the container 70 using multiple spacers 76. The two joined items 60 and another item 60 are then held in position by filling a remainder of the surrounding area with a filler material 77, such as the filler materials disclosed above. While a particular orientation of items 60 is illustrated above, any combination of the methods for positioned items 60 within the container 70 can be used. Similar methods can be used for positioned items 60 within the cargo bay 80 or within a cardboard box, and the like.

In some embodiments, weights 90 are positioned within the container 70 (or similarly positioned within a cardboard box and cargo bay 80) for balancing the combined COG of the UAV 50 with the loaded container 70, cardboard box, cargo bay 80, and the like. The weight 90 can be fastened to the walls 71 and to a shelf 72, can be positioned using spacers 76 and filler 77, can be secured using straps 74, can be secured using hook and loop fasteners, and the like. In some embodiments, the spacers 76 are configured to receive one or more weights 90 for positioning the weight 90 within the container 70. In some embodiments, the weights 90 are positioned within compartments 79 of the container 70 or cargo bay 80, which are dedicated compartments for receiving weights 90 therein. In embodiments, the compartments 79 are positioned around a perimeter, such as at the corners, of the container 70 or cargo bay 80. Similarly, the compartments 79 can be positioned around a perimeter of the body 52 of the UAV 50. The compartments 79 are accessible from at least one of an exterior and interior of the container 70, cargo bay 80, or UAV 50. In some embodiments, the compartments 79 are configured to receive further shelves 72 with fastening devices 73 for securing the weights 90 within the compartments 79.

Figure 51:
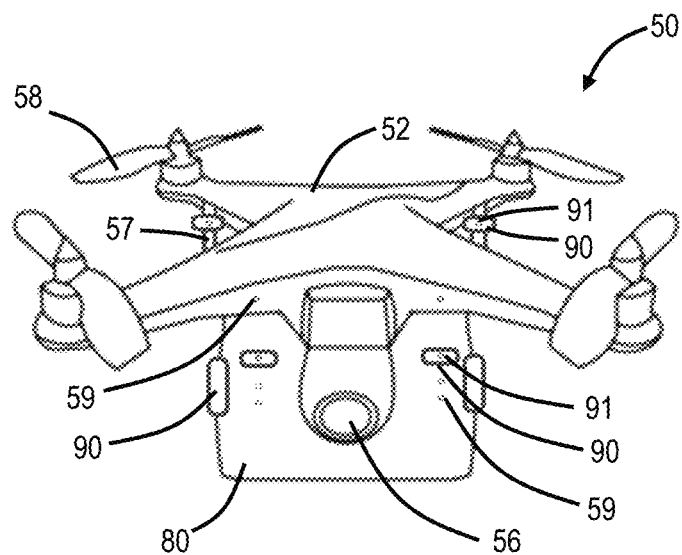
FIG. 51 is a perspective view of a UAV for use with the systems and methods described herein.

FIG. 51 is a perspective view of a UAV 50 for use with the systems and methods described herein. In embodiments, the UAV 50 includes weights 90 for balancing the COG of the UAV 50, and in particular, for balancing a combined COG of the UAV 50 and a load carried thereby. The weights 90 can be positioned around the exterior of the UAV 50, as shown in FIG. 51 and can be positioned within the interior of the UAV 50 as disclosed above. In embodiments, the UAV 50 includes fastening positions 59 configured to receive fasteners 91 for securing the weights 90 to the UAV 50. In some embodiments, the UAV 50 includes one or more rods 57 which slidably receive one or more weights 90. The weights 90 received thereon being configured to slide along the rod 57 and to be securable in multiple positions thereto, such as by a fastener 91. The fasteners 91 can be bolts, pins, spring loaded pins, clamps, and the like. While the slidable weights 90 are shown on an exterior of the UAV 50, in some embodiments, the slidable weights 90 are positioned within an interior of the UAV 50.

Figure 52:
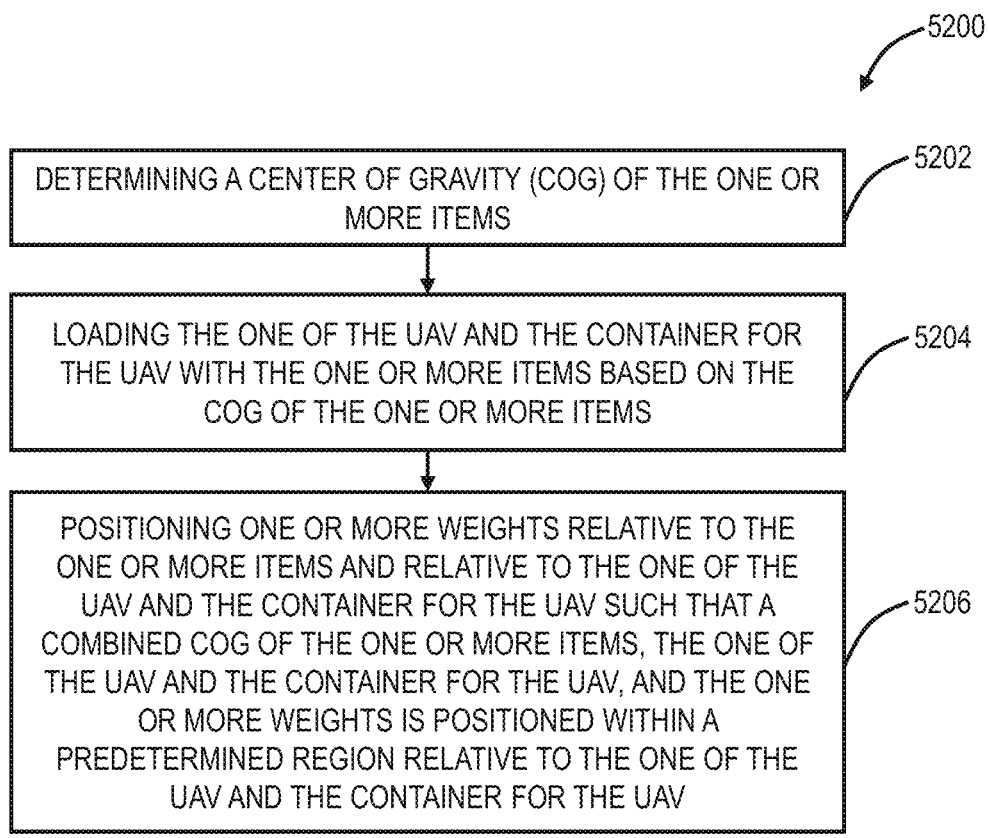
FIG. 52 is a flowchart of a method for loading a UAV with one or more items.

FIG. 52 is a flowchart of a method 5200 for loading one of a UAV 50 and a container 70 for the UAV 50 with one or more items. The method includes determining a COG of the one or more items at step 5202. The method 5200 also includes loading the one of the UAV 50 and the container 70 for the UAV 50 with the one or more items based on the COG of the one or more items at step 5204. The method 5200 further includes positioning one or more weights relative to the one or more items and relative to the one of the UAV 50 and the container 70 for the UAV 50 such that a combined COG of the one or more items, the one of the UAV 50 and the container 70 for the UAV 50, and the one or more weights is positioned within a predetermined region relative to the one of the UAV 50 and the container 70 for the UAV 50 at step 5206. In embodiments, the predetermined region is defined relative a COG of the one of the UAV 50 and the container 70 for the UAV 50. In some embodiments, various combinations of the weights 90 disclosed above are used in step 5206.

In some embodiments, steps 5204 and 5206 are performed simultaneously. In further embodiments, the method 5200 is combined with other methods, such as methods 4800 and 4900, disclosed herein. In embodiments, the one of the UAV and the container for the UAV include fastening positions on an exterior thereof, and the method includes determining which of the fastening positions to secure the one or more weights 90 to. In some embodiments, the loading the one or more items and positioning the one or more weights 90 includes securing the one or more items and the one or more weights 90 to one of walls and shelves of the one of the UAV and the container for the UAV.

Figure 53:
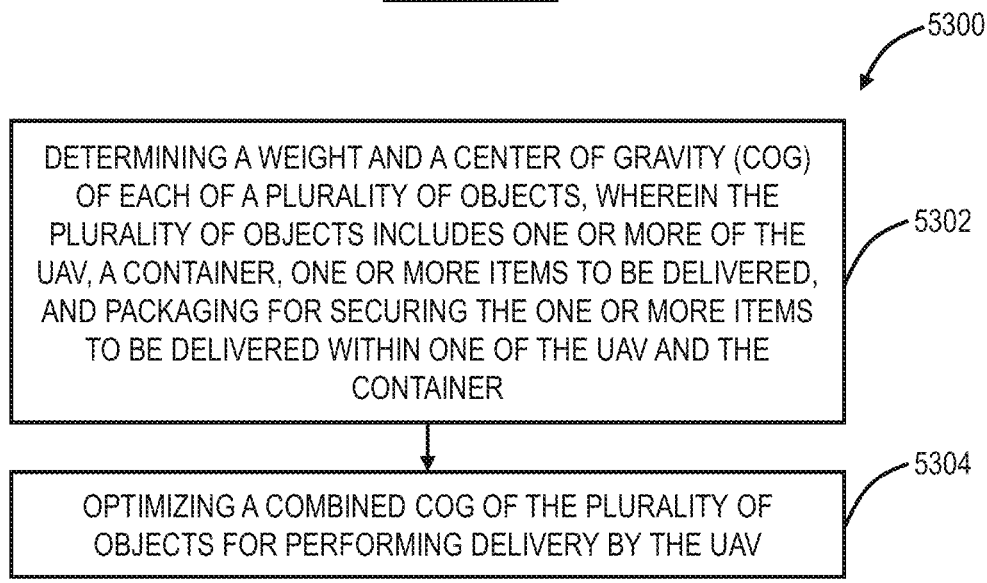
FIG. 53 is a flowchart of a method for loading a UAV with one or more items.

FIG. 53 is a flowchart of a method 5300 for loading a UAV 50 with one or more items. The method 5300 includes determining a weight and a COG of each of a plurality of objects at step 5302. The plurality of objects includes one or more of a UAV 50, a container 70, one or more items to be delivered, and packaging for securing the one or more items to be delivered within one of the UAV 50 and the container 70. In embodiments where one of the objects is the UAV 50, the weight and the COG of the UAV 50 can be obtained from a database storing the information from previously performed measurements of the weight and COG of the UAV 50. Similarly, the weight and COG of the container 70 can be obtained from a database storing the information from previously performed measurements of the weight and COG of the container 70.

The method 5300 also includes optimizing a combined COG of the plurality of objects for performing delivery by the UAV 50 at step 5304. In embodiments, optimizing the combined COG includes determining an orientation of the plurality of objects relative to one another to minimize a vertical difference between the combined COG of the plurality of objects and a COG of the UAV 50, while laterally matching the combined COG of the plurality of objects with the COG of the UAV 50 in at least one direction. In some embodiments, the combined COG is laterally matched in a side to side direction, while the offset is maintained within a predetermined distance in a forward direction. The predetermined distance may be based on a combined weight of the plurality of objects.

In other embodiments, the lateral matching of the combined COG with the COG of the UAV 50 is in both the side to side and the front to back direction. In such an optimization, the combined COG is positioned directly below the COG of the UAV 50 at a minimal distance based on the sizes, weights, and center of gravities of the plurality of objects. In other embodiments, optimizing the combined COG includes determining an orientation of the plurality of objects that minimizes an overall distance between the combined COG of the plurality of objects and a COG of the UAV 50. In some of these embodiments, minimizing the overall distance includes maintaining the side to side and front to back lateral offsets within predetermined distances. These predetermined distances may be based on a combined weight of the plurality of objects.

Figure 54:
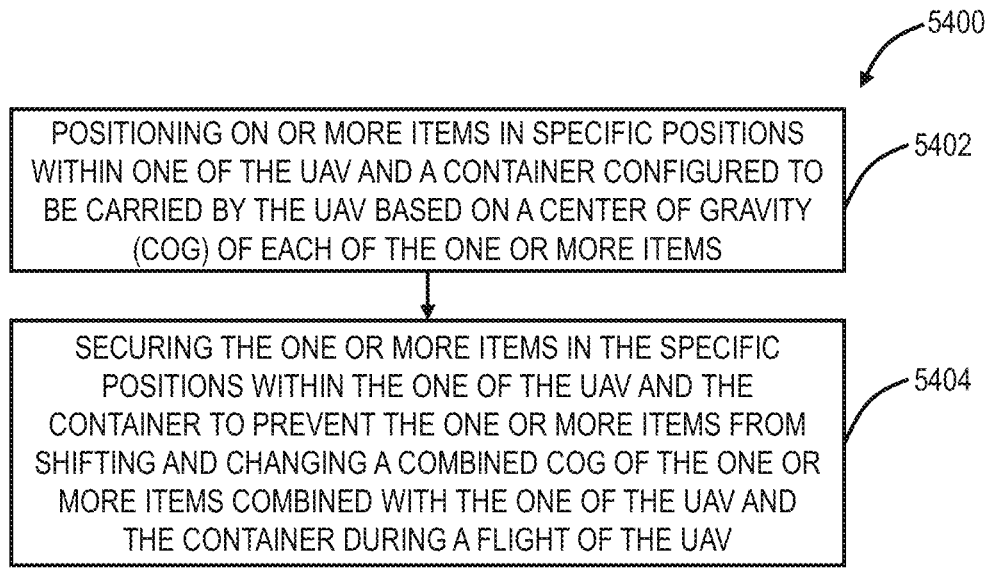
FIG. 54 is a flowchart of a method for loading a UAV with one or more items.

FIG. 54 is a flowchart of a method 5400 for loading a UAV 50 with one or more items. The method 5400 includes positioning on or more items in specific positions within one of a UAV 50 and a container 70 configured to be carried by the UAV 50 based on a COG of each of the one or more items at step 5402. The method 5400 also includes securing the one or more items in the specific positions within the one of the UAV 50 and the container 70, to prevent the one or more items from shifting and changing a combined COG of the one or more items combined with the one of the UAV 50 and the container 70 during a flight of the UAV at step 5404. The one or more items are secured using one or more of straps 74, wrapping material 78, fastening devices 73, spacers 76, filler material 77, adhesive, such as glue and adhesive gel, cardboard, and the like.

In embodiments, the UAV 50 and the container 70 include one or more shelves 72. The shelves can be removable. The shelves 72 include fastening devices 73 and can be configured to receive the straps 74 and the adhesive.

In embodiments, the method further includes determining a specific position for each of the one or more items based on a COG of each of the one or more items and a COG of the one of the UAV 50 and the container 70.

Figure 55:
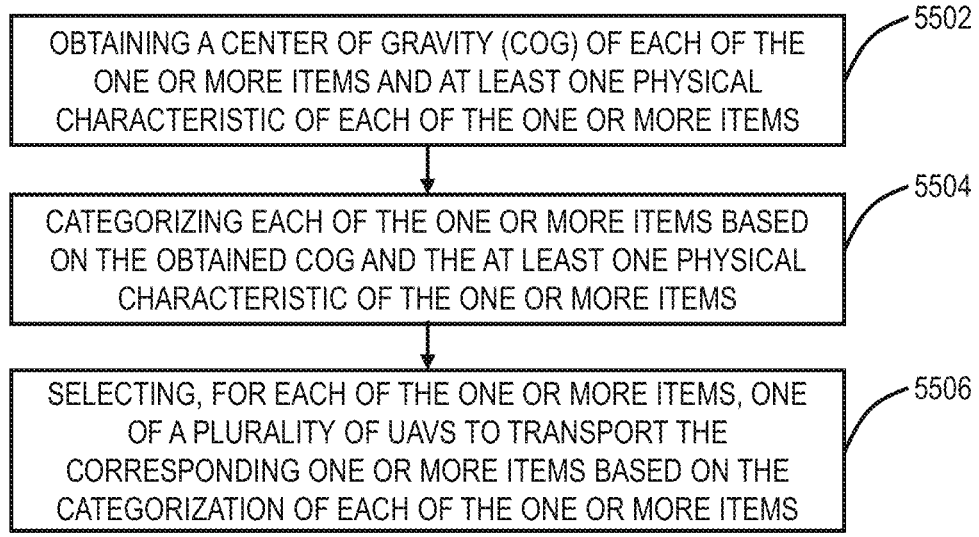
FIG. 55 is a flowchart of a method for loading a UAV with one or more items.

FIG. 55 is a flowchart of a method 5500 for loading a UAV 50 with one or more items. The method 5500 includes obtaining a COG of each of the one or more items and at least one physical characteristic of each of the one or more items at step 5502. In embodiments, the physical characteristics include at least one of dimensions, such as height, width, and length, of the item, a centroid of the item, weight of the item, orientation limitations of an item, fragility of an item, and the like.

The method 5500 also includes categorizing each of the one or more items based on the obtained COG and the at least one physical characteristic of the one or more items at step 5504. In embodiments, the categorizations include at least one of an offset of the COG from the centroid of the item, a position of the COG relative to one or more of the dimensions of the item, a position of the COG and the weight of the item, and a position of the COG and an overall size of the item. In some embodiments, each item is labeled with each of the categorizations made for the item. The labels can be alphanumeric, scannable codes, such as barcodes and matrix barcodes, color codes, and the like.

The method 5500 further includes selecting, for each of the one or more items, a UAV 50 to transport the corresponding one or more items based on the categorization of each of the one or more items at step 5506. A different UAV 50 can be selected for each of the items. In embodiments, smaller, lighter, and more balanced items (i.e. items with a small offset between the COG and the centroid of the item) are assigned to smaller and less powerful UAVs 50, while larger, bulkier, and imbalanced items (with a large offset between the COG and the centroid of the item) are assigned to larger and more powerful UAVs 50. Assignments can also be made based on further available spaces in containers 70 and cargo bays 80, as well as for balancing purposes, such as assigning two items to a same UAV 50 that have similar properties for counterbalancing such properties during the balancing methods disclosed herein. The method 5500 can be used in combination with other methods disclosed herein including the methods 4800, 4900, 5200, 5300, and 5400.

The methods 4800, 4900, 5200, 5300, 5400, and 5500 can also be used in conjunction with the other methods disclosed herein. For example, during flying lane management by the air traffic control system 300, one or more of the size of the load, the positioning of the COG of the load/combined COG of the load and UAV 50, and the overall weight of the UAV 50 combined with the load can be provided to the air traffic control system 300, such as during the preflight communication of step 752 of the flying lane management method 750. The air traffic control system 300 can use this information when determining a flying lane 700 for the UAV 50. Similarly, this information can be used during the flying lane management method 1850 to select a flying lane of a plurality of flying lanes for the UAV 40. For example, a heavier UAV 50 may need to travel at slower speeds, while a UAV 50 with an imbalanced load may require a larger flying lane and increased spacing from other UAVs. Thus, the air traffic control system 300 can use the details of how the UAV 50 is loaded in order to better manage the flight thereof.

The methods 4800, 4900, 5200, 5300, 5400, and 5500 can also be used during the UAV selection step 2016 of method 2010. Furthermore, the methods 4800, 4900, 5200, 5300, 5400, and 5500 can also be used during the method 3700 to determine whether a second item can be picked up from a second location and can be used during the method 3800 for determining a delivery order, such as what affect the delivery and removal of a first item or item will have on the combined COG of the remaining items.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for loading an Unmanned Aerial Vehicle (UAV) with one or more items, comprising:
    positioning one or more items in specific positions within one of the UAV and a container configured to be carried by the UAV based on a Center of Gravity (COG) of each of the one or more items; and
    securing the one or more items in the specific positions within the one of the UAV and the container to prevent the one or more items from shifting and changing a combined COG of the one or more items combined with the one of the UAV and the container during a flight of the UAV, wherein the one or more items are secured in specific positions by inserting one or more shelves into one of the UAV and the container and securing the one or more items to the one or more shelves using at least one of straps, wrapping material, fastening devices, spacers, filler material, adhesive, and cardboard.

2. The method of claim 1, wherein the one or more items are secured in specific positions using straps connected to one or more walls of the one of the UAV and the container.

3. The method of claim 1, wherein the one or more items are positioned in the specific positions using one or more spacers.

4. The method of claim 3, wherein the one or more spacers include a region for holding a weight used to further balance a combined COG including the COG of the UAV and the COG of the one or more items.

5. The method of claim 1, wherein the one or more items are secured in specific positions using an adhesive.

6. The method of claim 5, wherein the adhesive is an adhesive gel.

7. The method of claim 1, further comprising determining the specific positions for each of the one or more items based on a COG of each of the one or more items and a COG of the one of the UAV and the container.

8. The method of claim 7, wherein the specific positions for one or more items being placed in the container is also based on the COG of the UAV selected to transport the container.

9. The method of claim 7, wherein positioning each of the one or more items in the specific positions is also based on a weight of each of the one or more items.

10. The method of claim 9, wherein positioning each of the one or more items in the specific positions is further based on a weight of the one of the UAV and the container.

* * * * *